United States Patent
Itonaga

(10) Patent No.: US 6,636,366 B1
(45) Date of Patent: Oct. 21, 2003

(54) OBJECTIVE FOR OPTICAL DISK, OPTICAL PICKUP, OPTICAL DISK WRITER-READER, AND OPTICAL DISK READER

(75) Inventor: Makoto Itonaga, Kanagawa-ken (JP)

(73) Assignee: Victor Company of Japan, Limited, Yokohama (JP)

( * ) Notice: Subject to any disclaimer, the term of this patent is extended or adjusted under 35 U.S.C. 154(b) by 0 days.

(21) Appl. No.: 10/235,916

(22) Filed: Sep. 6, 2002

(30) Foreign Application Priority Data

| Sep. 21, 2001 | (JP) | P2001-289992 |
| Sep. 21, 2001 | (JP) | P2001-290001 |
| Apr. 19, 2002 | (JP) | P2002-118318 |
| Apr. 19, 2002 | (JP) | P2002-118489 |
| Jul. 5, 2002 | (JP) | P2002-197990 |
| Jul. 5, 2002 | (JP) | P2002-197996 |

(51) Int. Cl.$^7$ ............ G02B 13/18; G11B 7/00

(52) U.S. Cl. .............. 359/719; 369/112.23

(58) Field of Search ............. 359/718, 179; 369/112.23

(56) References Cited

U.S. PATENT DOCUMENTS

| 5,162,949 A | * 11/1992 | Kubota .......... 359/719 |
| 6,388,822 B1 | * 5/2002 | Kitamura et al. ...... 359/793 |
| 2002/0186476 A1 | * 12/2002 | Sasano et al. ........ 359/719 |

FOREIGN PATENT DOCUMENTS

| JP | 04-163510 | 6/1992 |
| JP | 05-241069 | 9/1993 |

OTHER PUBLICATIONS

Itonaga, Makoto, et al., "Optical Disk System Using a High–Numerical Aperture Single Objective Lens and a Blue LD". Jpn. J. Appl. Phys., vol. 39, pp. 978–979, (2000).

Ichimura, Isao, et al., "Optical Disk Recording Using a GaN Blue–Violet Laser Diode". Jpn. J. Appl. Phys., vol. 39, pp. 937–942, (2000).

Yoshida, Shotaro, "Calculations Concerning Aspheric Aplanatic Lens with Exceptionally Large Aperture Ratio III", Chapter 5 and 6. Mar. 1958, (with English language abstracts.).

* cited by examiner

Primary Examiner—Scott J. Sugarman
(74) Attorney, Agent, or Firm—Nath & Associates PLLC; Gary M. Nath; Harold L. Novick

(57) ABSTRACT

An objective for an optical disk is made of a single double-sided aspherical lens having a numerical aperture (NA) equal to or greater than 0.75 and capable of minimizing axial aberration, off-axis aberration, surface-to-surface eccentricity aberration, and chromatic aberration.

The objective (11) has a first aspherical surface (1). The vertex of the first surface has a radius of curvature R1 defined as follows:

$$0.95 \cdot A < R1 < 1.05 \cdot A$$

$$A = B/C$$

$$B = 0.85 f(n-1)$$

$$C = n \, (0.60866 - 0.11 \cdot t/f - 0.1272 \cdot d/f)(0.83 + 0.2 \cdot NA)$$

where n is a refractive index of the lens, f is a focal length of the lens, t is a thickness along optical axis through the center of the lens and d is the thickness of a transmission layer of the optical disk.

32 Claims, 40 Drawing Sheets

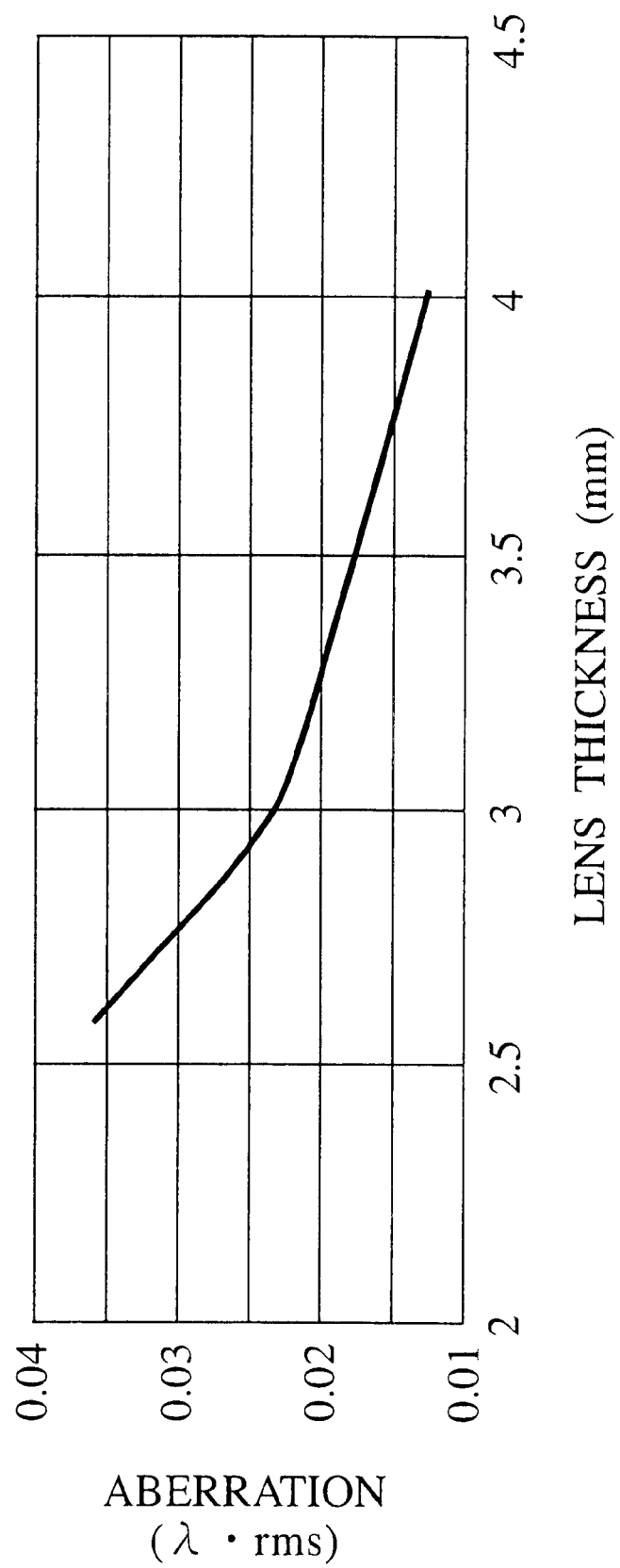

OFFENSE AGAINST SINE CONDITION
NA = 0.85

OFFENSE AGAINST SINE CONDITION

OFFENSE AGAINST SINE CONDITION
NA = 0.85

OBJECTIVE FOR OPTICAL DISK, OPTICAL PICKUP, OPTICAL DISK WRITER-READER, AND OPTICAL DISK READER

BACKGROUND OF THE INVENTION

1. Field of the Invention

The present invention relates to an objective having a high numerical aperture (NA) to realize a large-capacity optical disk, an optical pickup with the objective, an optical disk writer-reader with the objective, and an optical disk reader with the objective.

2. Description of the Related Art

Conventional objectives for compact disks (CDs) have numerical apertures (NAs) of 0.45 to 0.5 and employ laser beams of about 780 nm in wavelength to read and write the CDs. Objectives for digital versatile disks (DVDs) have NAs of about 0.6 and employ laser beams of about 650 nm in wavelength to read and write the DVDs.

To handle high-capacity optical disks, now being developed are next-generation pickups with objectives that have high NAs and operate on short-wavelength beams.

The short wavelength beams may include a blue laser beam of about 400 nm in wavelength.

Examples of objectives having high NAs are reported in the following papers:

(A) Jpn. J. Appl. Phys. Vol. 39 (2000) pp. 978–979, M. Itonaga et al. "Optical Disk System Using High-Numerical Aperture Single Objective and Blue LD"

(B) Jpn. J. Appl. Phys. Vol. 39 (2000) pp. 937–942, I. Ichimura et al. "Optical Disk Recording Using a GaN Blue-Violet Laser Diode"

The paper (A) reports a system employing a single lens having a numerical aperture of 0.7 and the paper (B) a system employing two lens groups having a numerical aperture of 0.85.

Higher numerical apertures result in lowering system margins. To cope with this problem, the systems reported in the above papers further thin a CD transmission layer of 1.2 mm and a DVD transmission layer of 0.6 mm. The paper (A) mentions a thickness of 0.12 mm and the paper (B) a thickness of 0.1 mm. Although the thickness of a transmission layer of an optical disk depends on system margins, it is preferable to be about 0.3 mm or thinner.

The two-lens-group system reported in the paper (B) realizes a greater numerical aperture than the system of the paper (A). The system of the paper (B), however, needs an assembling process of two lens groups, and therefore, is disadvantageous to mass production and increases costs.

According to the paper (B), the two-lens-group system involves a working distance of about 0.13 mm, which is shorter than about 1 mm of a single-lens system in a conventional DVD system. The short working distance increases a risk of colliding with an optical disk, thereby deteriorating the reliability of the system.

Next-generation optical disk systems are required to have single objectives having numerical apertures of 0.7 or above.

It is possible to design lenses having high numerical apertures. Shotaro Yoshida details a method of designing a double-sided aspherical lens having a high numerical aperture in "Study in Aspherical Aplanatic Lens with Particularly Large Aperture Ratio" in Tohoku University Institute of Scientific Measurements Report, March, 1958.

Also, Japanese Patent Laid Open Publication 4-163510 discloses a single objective having a numerical aperture of about 0.6 to 0.8.

A lens having a high numerical aperture can be designed but is not always manufacturable. For actual manufacturing, a designed lens must secure a manufacturing tolerance. In addition, the designed lens must be less affected by wavelength variations or wavelength width of source light, to decrease chromatic aberration.

A critical manufacturing tolerance for a double-sided aspherical lens for an optical disk is a surface-to-surface eccentricity tolerance. In addition to keeping the eccentricity tolerance, the lens must simultaneously satisfy requirements for axial aberration related to perpendicular incident light and off-axis aberration related to oblique incident light.

It is nearly impossible for a lens having a numerical aperture of 0.75 or higher to simultaneously satisfy these requirements.

In a double-sided aspherical lens, off-axis aberration worsens in proportion to an increase in the numerical aperture of the lens even if no consideration is made on the manufacturing tolerance of the lens. If the manufacturing tolerance is considered, the off-axis aberration worsens because the manufacturing tolerance, i.e., the eccentricity tolerance of the lens is securable only by sacrificing the axial aberration and off-axis aberration of the lens.

Although the axial aberration of the lens does not greatly worsen with the consideration of the eccentricity tolerance, the off-axis aberration of the lens greatly worsens when the numerical aperture of the lens is higher than 0.6 and when the eccentricity tolerance is of the micrometer order.

Chromatic aberration is usually put behind the manufacturing tolerance. Namely, the manufacturing tolerance of a lens is considered at first, and then, the shape of the lens is improved as high as possible to minimize the chromatic aberration of the lens.

Many studies have been made on the shapes of double-sided aspherical lenses to improve lens performance. Some of the studies are disclosed in Japanese Patent Laid Open Publications 5-241069 and 4-163510.

The publication 4–163510 discloses a range of lens shapes to ensure good performance. This disclosure mentions nothing about the securing of eccentricity tolerance. A second embodiment of the disclosure explains a lens whose numerical aperture is greater than 0.75 (0.8 for a wavelength of 532 nm). This lens causes a large aberration even on a slight eccentricity. The disclosure mentions nothing about chromatic aberration.

The disclosures cover a wide range of specifications, and therefore, are insufficient to actually design a good lens.

The two-lens-group system mentioned above involves a short working distance, and therefore, greatly increases a risk of colliding with an optical disk when the lens groups employ a higher numerical aperture. Optical disks are generally made of plastic, which unavoidably involves warp. A CD involves a warp of about 0.6 mm and a DVD involves a warp of about 0.3 mm, which is a double improvement from the CD. No further improvement is expected in optical disk warp because the warp depends on disk material. The two-lens-group system has a working distance of 0.13 mm as mentioned above. This working distance may differ depending on lens design but must not be increased greater than 0.2 mm, to make a pickup that employs the two-lens-group system compact. With such a short working distance, the lens system will collide with an optical disk if focus servo runs off due to disturbance, vibration, or defects during a disk write or read operation.

There is another paper (C) Jpn. J. Appl. Phys. Vol. 41 (2002) pp. 1804–1807, G. Hashimoto et al. "Miniature Two-Axis Actuator for High-Data-Transfer-Rate Optical Storage System." The paper (C) discloses a compact system of two lens groups having a numerical aperture of 0.85 and a focal distance of 0.88 mm. This system may realize a compact actuator or pickup operating at high speed. The system, however, involves a very short working distance of 0.1 mm to increase a risk of collision.

SUMMARY OF THE INVENTION

An object of the present invention is to provide an objective (objective lens or lens) for an optical disk, made of a double-sided aspherical single lens (singlet) having a numerical aperture equal to or greater than 0.75 and capable of minimizing axial aberration, off-axis aberration, surface-to-surface eccentricity aberration, and chromatic aberration. Also provided are an optical pickup, an optical disk writer-reader, and an optical disk reader each employing the objective.

An aspect of the present invention provides an objective for an optical disk, herein the objective has first and second aspherical surfaces, a numerical aperture NA) of the objective is equal to or greater than 0.75 and a radius of curvature R1 of he vertex of the first surface is defined as follows:

$(1-D)A < R1 < (1+D)A,$ $A = B/C,$ $B = 0.85 f(n-1)$ and $C = n (0.60866-0.11 \, t/f - 0.1272 \, d/f)(0.83+0.2 \, NA)$ where n is a refractive index of the lens, f is a focal length of the lens, t is a thickness along optical axis through the center of the lens, d is the thickness of a transmission layer of the optical disk, and D is a positive number of 0.05, desirably 0.04, more desirably 0.03.

Desirably, another aspect of the present invention provides an objective for an optical disk, wherein the objective has first and second aspherical surfaces, a numerical aperture (NA) of the objective is equal to or greater than 0.75 and an angle u1' between a highest ray passing through the lens and an optical axis satisfies the following condition:

$(1-D)K < \sin(u1') < (1+D)K$ and $K = (0.60866 - 0.11 \cdot t/f - 0.1272 \cdot d/f)(0.83+0.2 \cdot NA) \cdot NA/0.85$ where f is a focal length of the lens, t is a thickness along optical axis through the center of the lens, d is the thickness of a transmission layer of the optical disk, and D is a positive number of 0.06, desirably 0.05, more desirably 0.04.

Desirably, the highest ray entering the first surface of the lens is parallel to the optical axis.

Desirably, the objective of any one of the above aspects has a manufacturable eccentricity tolerance between the first and second surfaces and minimizes off-axis aberration.

Desirably, still another aspect of the present invention provides an objective for an optical disk, wherein the objective has first and second aspherical surfaces, a numerical aperture (NA) of the objective is equal to or greater than 0.75 and an angle between a normal to the first surface at a point where a highest ray enters and an optical axis is smaller than a predetermined angle. Desirably, the predetermined angle is, for example, 57 degrees, desirably 56 degrees, more desirably 55 degrees.

Desirably, still another aspect of the present invention provides an objective for an optical disk, wherein the objective has first and second aspherical surfaces, numerical aperture (NA) of the objective is equal to or greater than 0.75 and an angle θ between a normal to the first surface at a point where a highest ray enters and an optical axis satisfies the following condition:

$\theta < \alpha - 47.3 \, (0.85 - NA)(\text{degrees})$ where α is an angle of 57 degrees, desirably 56 degrees, more desirably 55 degrees.

Desirably, in the objective of any one of the above aspects, the thickness t along optical axis through center of the objective and focal length f satisfy the following condition:

$t > (1+E)f$ where E is a number equal to or greater than 0, desirably 0.1, more desirably 0.2.

Desirably, the objective of any one of the above aspects may have an image magnification of 0. Namely, the lens desirably focuses parallel rays if the lens involves no manufacturing errors and if a wavelength of source light agrees with a reference wavelength.

Desirably, the objective of any one of the above aspects may be designed for source light of 450 nm or shorter in wavelength.

Desirably, the objective of any one of the above aspects properly operates on an optical disk having a transmission layer thinner than 0.4 mm, i.e., thinner than a DVD's or CD's transmission layer.

Desirably, the focal length f of the objective of any one of the above aspects may be 10 mm or shorter, desirably 3.5 mm or shorter.

The size (diameter) φ of a light flux that enters the objective of any one of the above aspects depends on the numerical aperture NA and focal length f of the lens and is expressed as follows:

$\phi = 2 \times NA \times f$

If the focal length is 10 mm and NA is 0.75, φ=15 mm. This diameter is large relative to a light flux of about 5 mm or smaller employed by many optical pickups. It is desirable, therefore, that the focal length is shorter than 10 mm. If φ<=5 mm and NA=0.75, then f=3.33 mm. It is more desirable that the focal length is shorter than 3.5 mm.

The focal length of the objective of any one of the above aspects is desirably 0 or greater, more desirably 0.2 mm or greater.

Desirably, a working distance of the objective depends on the thickness of an optical disk. Desirably, the thinner the optical disk, the larger the working distance. Desirably, if there is a very thin optical disk, a very small lens having a short focal length will sufficiently work on the disk with a very short working distance. Desirably, to work on a front-read optical disk, an objective with a focal length of 0.1 mm may be designed. In this case, a minimum focal length of the objective is desirably defined as f>0. However, there is no means at present to manufacture such a very small lens. Desirably, a practical minimum for the focal length of an objective is f>0.2 mm.

Desirably, an upper limit of the thickness t of the objective of any one of the above aspects is determined to make a working distance "dw" of the lens positive. Desirably, the working distance dw is defined as follows:

$dw = fb - d/n'$ where d is the thickness of an optical disk, n' is a refractive index of the optical disk, and fb is defined as follows:

$$fb = f(1 - t(n-1)/n/R1)$$

where R1 is the radius of curvature of the first surface mentioned above.

Desirably, as the lens thickness increases, the working distance becomes shorter. Desirably, to provide a proper lens, a finite working distance must be secured. Namely, an upper limit of lens thickness desirably must be in a range where a finite working distance is securable. Desirably, this range is determined by the focal length and thickness of a lens and the thickness of an optical disk.

Desirably, the lens thickness may be in the range of 1.5 mm to 3.5 mm.

Desirably, the objective of any one of the above aspects is applicable to an optical pickup. The optical pickup employing the objective irradiates a track on an optical disk with a light flux focused by the objective, to write and read information signals to and from the optical disk. Desirably, the optical pickup may have an image magnification of 0.

Desirably, still another aspect of the present invention provides an optical pickup including the objective of any one of the above aspects, a laser source, and a photodetector.

Desirably, a working distance of the objective of the optical pickup dependens on the diameter of an optical disk irradiated with a laser beam emitted from the laser source and is defined as follows:

$$(\text{working distance}) > 0.005 \times (\text{optical disk radius})$$

Desirably, still another aspect of the present invention provides an optical disk writer-reader including the optical pickup of the above aspect and a write-read unit to write and read information to and from an optical disk through the pickup.

Desirably, still another aspect of the present invention provides an optical disk reader including the optical pickup of the above aspect and a read unit to read information from an optical disk through the optical pickup.

BRIEF DESCRIPTION OF THE DRAWINGS

FIG. 7 is a graph showing a relationship between lens thickness along optical axis through the center of a lens and residual aberration due to a wavelength error of 5 nm;

DETAILED DESCRIPTION OF EMBODIMENTS

Figure 1:
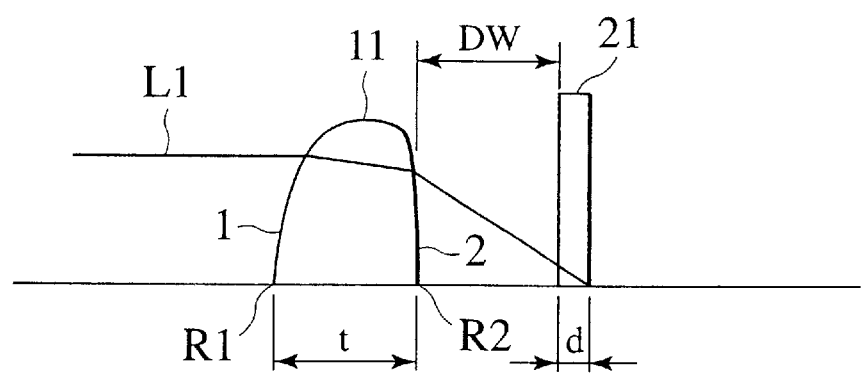
FIG. 1 shows the structure of an objective.

Objectives for optical disks, an optical pickup, an optical disk writer-reader, and an optical disk reader according to embodiments of the present invention will be described with reference to the accompanying drawings.

Balancing axial aberration, off-axis aberration, and eccentricity tolerance in designing an objective will be explained first, and then, conditional formulas that define the objectives of the present invention will be explained. The "eccentricity tolerance" of a lens is definable based on a wavefront aberration increase caused by eccentricity of the lens.

According to the present invention, the axial aberration, off-axis aberration, and eccentricity tolerance of a lens are secured by balancing the following three conditions:

(1) A spherical aberration of the lens must be corrected in order to minimize the axial aberration;

(2) The lens must satisfy the sine condition in order to minimize the off-axis aberration;

(3) The second surface of the lens must solely satisfy the sine condition in order to secure a given eccentricity tolerance.

In addition, chromatic aberration of the lens must be secured by satisfying the following conditions:

(4) An aberration increase at the best focus of the lens for each wavelength with respect to a wavelength error must be small, wherein the aberration is referred to as spherical aberration caused by a wavelength error;

(5) A focusing position change of the lens caused by a wavelength error must be small in order to suppress an aberration increase caused by wavelength spread of a light source.

The wavelength spread occurs when a semiconductor laser is driven in a multimode by superimposing high frequencies to reduce noise. Suppressing a focusing position change corresponds to securing an axial chromatic aberration.

Basics of securing the axial aberration and off-axis aberration of a lens will be explained, and then, the structure of a lens capable of securing chromatic aberration will be explained.

A double-sided aspherical lens is capable of simultaneously satisfying the conditions (1) and (2) to secure axial and off-axis aberrations. Any lens capable of simultaneously satisfying the conditions (1) and (2) is called an aplanat.

A lens satisfying the conditions (1) and (2) is generally incapable of satisfying the condition (3) to secure an eccentricity tolerance.

If a lens satisfies the condition (2) and substantially satisfies the condition (3), the lens as a whole satisfies the sine condition and the second surface of the lens substantially satisfies the sine condition. As a result, the first surface of the lens substantially satisfies the sine condition in connection with a ray height and a refraction angle.

An embodiment of the present invention balances the conditions (1) and (2) to secure axial and off-axis aberrations and the condition (3) to secure an eccentricity tolerance and properly adjusts the degree of satisfaction of the condition (3), thereby realizing a lens that involves suppressed axial and off-axis aberrations and secures an eccentricity tolerance to actually manufacture the lens.

The above-mentioned paper "Study in Aspherical Aplanatic Lens with Particularly Large Aperture Ratio" (Shotaro Yoshida, Tohoku University Institute of Scientific Measurements Report, March, 1958) clarifies that a double-sided aspherical lens that simultaneously satisfies the conditions (1) and (2) is obtainable in a relatively wide range of vertex radiuses with a fixed focal length and a lens radius changed by bending.

According to Yasuhiro Tanaka's "Aplanatic Single Lens Designing and Application to Disk Optical System," Optics, 27, 12 (1998), p. 720, a lens that causes little surface-to-surface eccentricity satisfies the condition (3).

It can be said that an aspherical lens that satisfies the conditions (1) and (2) and conforms to the condition (3) has a proper eccentricity tolerance. As mentioned above, it is unable to simultaneously completely satisfy the conditions (1) to (3) because a double-sided aspherical lens has design freedom only in two aspherical surfaces in dealing with the three conditions (1) to (3).

According to an analysis by the present inventor, the higher the numerical aperture of a lens, the more the conditions (1) to (3) become unsatisfied by the lens.

Conventional lenses for DVDs have a numerical aperture of 0.6 and those for CDs have a numerical aperture of 0.45. These lenses having low numerical apertures cause only a little aberration increase even when a vertex radius is widely changed, and therefore, it is easy for such lenses to balance axial and off-axis aberrations. Namely, the lenses may achieve a large eccentricity tolerance for any vertex radius only by slightly sacrificing the axial or off-axis aberration of the lenses.

On the other hand, a lens having a high numerical aperture and operating on a short wavelength causes larger aberration because aberration increases in inverse proportion to wavelength. Such a lens, therefore, has a smaller design margin and must have a strictly controlled shape (paraxial shape).

The present inventor found that a ray entering a lens at a given height forms a given angle in the lens relative to an optical axis irrespective of the refractive index of the lens, if the lens has a predetermined focal length and a predetermined thickness and works on an optical disk having a predetermined thickness. The present inventor also found that the given angle mentioned above depends on the thicknesses of the optical disk and lens.

Based on these lens characteristics found by the inventor, lenses according to embodiments of the present invention properly balance and secure the conditions (1) to (3).

FIG. 1 shows the structure of an objective for an optical disk.

The objective 11 receives a light flux L1 from a light source (not shown), refracts the light flux L1, and focuses the light flux L1 on a recording plane of the optical disk 21. The vertex of a first surface 1 of the lens 11 has a radius of curvature R1, and the vertex of a second surface 2 of the lens 11 has a radius of curvature R2. The lens 11 has a thickness t along optical axis through the center of the lens. The optical disk 21 has a transmission layer whose thickness is d. The lens 11 has a working distance DW.

Figure 2:
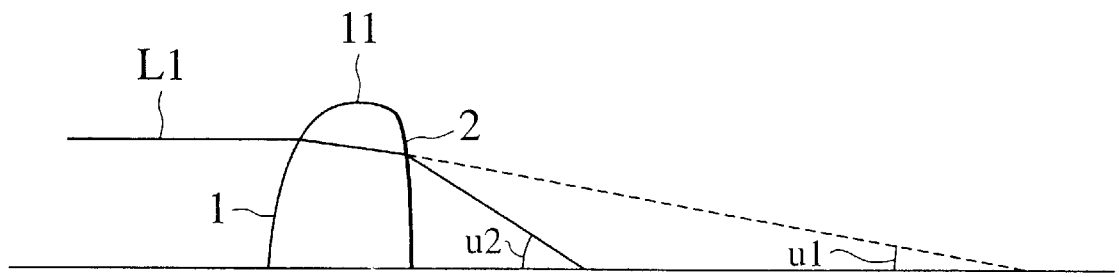
FIG. 2 shows an angle of a ray in the lens of FIG. 1 and an image magnification of a second surface of the lens.

FIG. 2 shows a ray angle in the lens 11 and an image magnification of the second surface 2.

In the light flux L1 that enters the lens 11 in parallel, a highest ray is refracted by the first surface 1 of the lens 11 and forms an angle u1 relative to an optical axis. The ray is further refracted by the second surface 2 of the lens 11, to form an angle u2 relative to the optical axis.

If the lens 11 has a numerical aperture of 0.85, the angle u1 is expressed as follows:

$$\sin(u1) = 0.60866 - 0.11\, t/f - 0.1272\, d/f \ldots (6)$$

The angle u1 in the formula (6) formed between the highest ray refracted by the first surface 1 and the optical axis is also formed by an aspheric aplanat having a numerical aperture of 0.85 and satisfying the conditions (1) and (2). This angle is determined by the focal length f and thickness t along optical axis through the center of the lens and the optical disk thickness d and is irrelevant to the refractive index of the lens, if the lens has proper characteristics.

Figure 3:
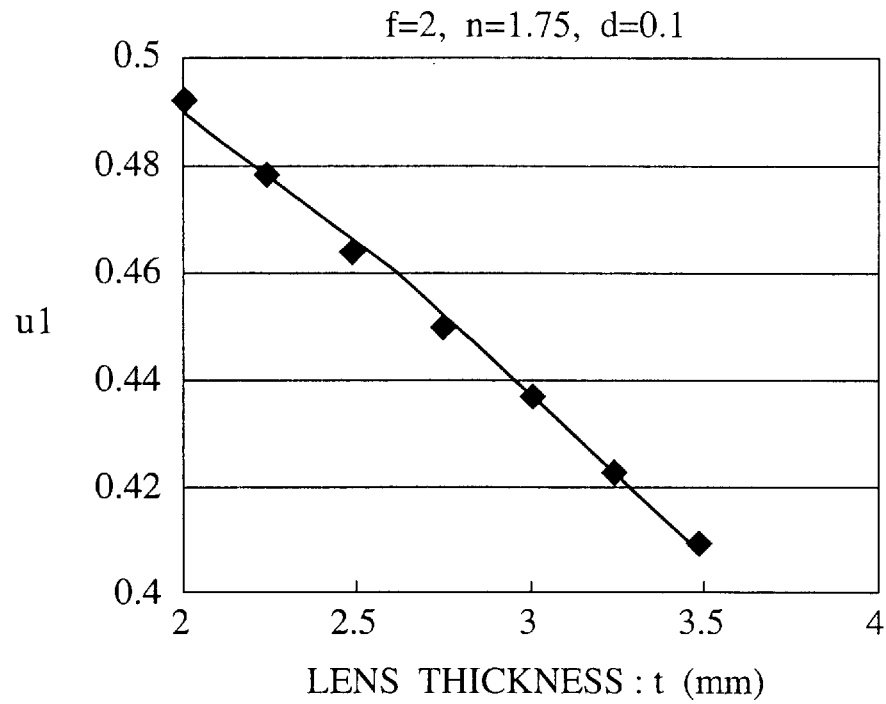
FIG. 3 is a graph showing relationships between lens thickness and angle u1 obtained from a regression formula and design values.

FIG. 3 is a graph showing relationships between lens thickness and angle u1 obtained from a regression formula and design values. In FIG. 3, a black rhombus indicates a design value and a straight line represents the regression formula.

The design values are calculated based on a focal length f of 2 mm, a lens material refractive index n of 1.75, an optical disk transmission layer thickness d of 0.1 mm, and different lens thicknesses t. The design values well agree with the regression formula, to show the correctness of the regression formula.

Figure 4:
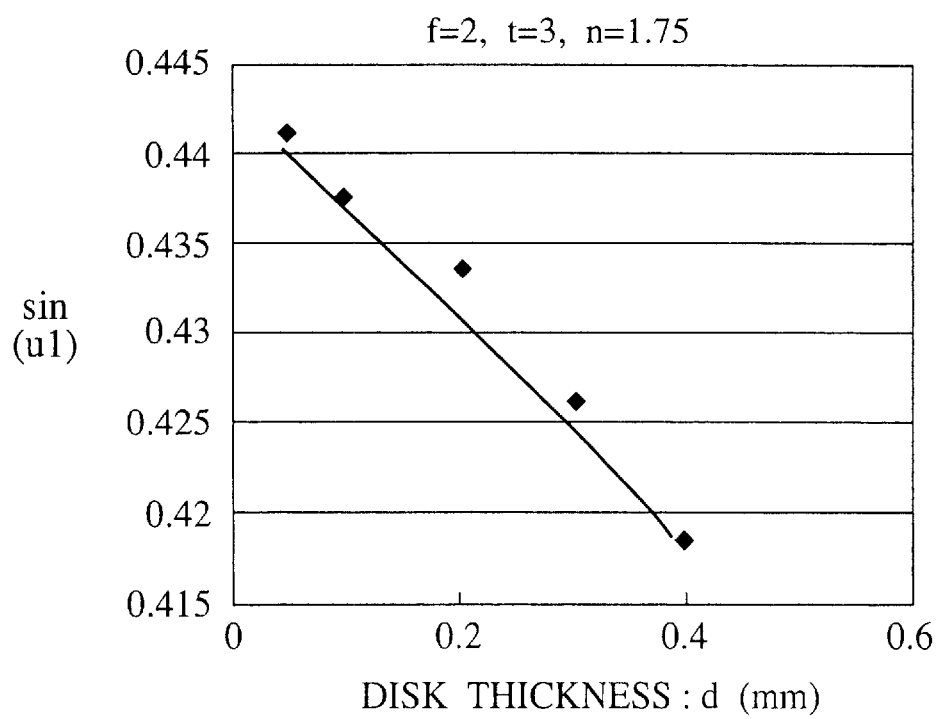
FIG. 4 is a graph showing relationships between disk thickness and angle u1 obtained from a regression formula and design values.

FIG. 4 is a graph showing relationships between disk thickness and angle u1 obtained from a regression formula and design values. In FIG. 4, a black rhombus indicates a design value and a straight line represents the regression formula.

The design values are based on a focal length f of 2 mm, a lens material refractive index n of 1.75, a lens thickness t of 3 mm, and different optical disk transmission layer thicknesses d. The design values well agree with the regression formula, to show the correctness of the regression formula.

To determine various constants for a lens according to the formula (6), a paraxial formula will be employed.

In FIG. 2, each of the first and second surfaces of the lens substantially satisfies the sine condition. A relationship between the angles u1 and u2 is determined by an image forming operation on the second surface. When a lens surface alone satisfies the sine condition, an image magnification of actual rays on the lens surface is constant and is equal to a paraxial magnification irrespective of ray heights.

In this case, a paraxial image magnification on the second surface of the lens is expressed as follows:

$$=n \cdot up1/up2 = n \cdot \sin(u1)/\sin(u2)$$

where up1 and up2 are the inclinations of a paraxial ray and u1 and u2 are the inclinations of an actual ray. A numerical aperture for a highest ray, i.e., sin(u2) is 0.85, and therefore, the following is obtained:

$$\beta = n \sin(u1)/0.85$$

The present inventor found that u1 (up1 and β) changes according to numerical apertures.

This is because a lens that satisfies the conditions (1) and (2) may involve a slight error in the condition (3). In this case, the lens may be designed to satisfy the condition (3) at the periphery of the lens where an angle of refraction becomes a maximum. This will minimize the eccentricity of the lens. In this way, the paraxial image magnification β on the second surface depends on numerical apertures.

The paraxial image magnification β on the second surface can be generalized by considering numerical apertures. A generalized paraxial image magnification β on the second surface of a lens with a numerical aperture of NA is expressed as follows:

$$\beta = \beta(0.83 + 0.2 \cdot NA)$$

Figure 5:
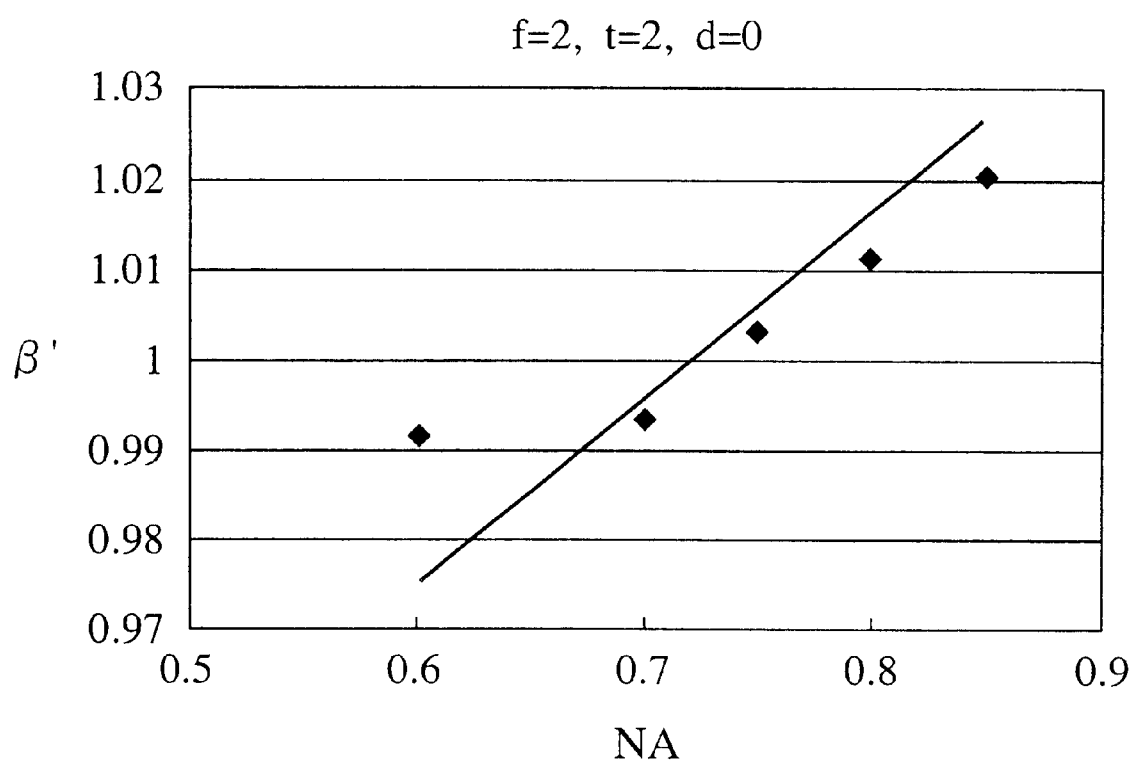
FIG. 5 is a graph showing relationships between numerical aperture (NA) and image magnification β' obtained from a regression formula and design values.

FIG. 5 is a graph showing relationships between numerical aperture (NA) and image magnification β obtained from a regression formula and design values. In FIG. 5, a black rhombus indicates a design value and a straight line represents the regression formula.

The design values are based on a focal length f of 2 mm, a lens material refractive index n of 1.75, a lens thickness t of 2 mm, and different numerical apertures. The design values well agree with the regression formula, to show the correctness of the regression formula.

A radius of curvature R1 of the first surface of a lens and a generalized paraxial image magnification β on the second surface of the lens have the following relationship:

$$R1 = f(n-1)/\beta'$$

Figure 6A:
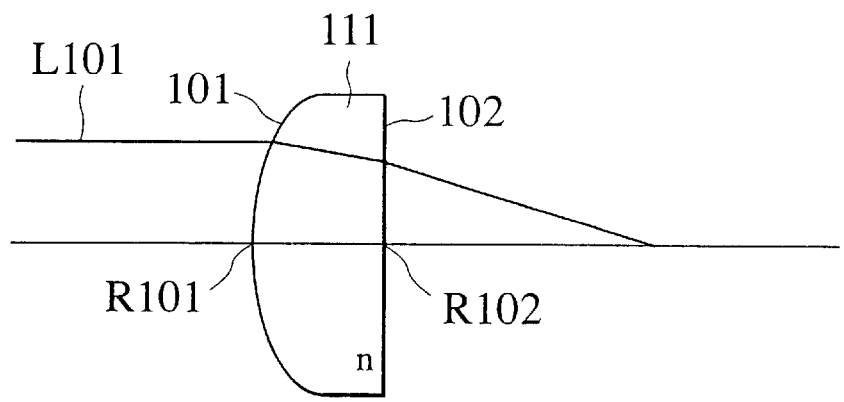
FIGS. 6A to 6C show the finding of a relational formula of R1 and β'.
Figure 6B:
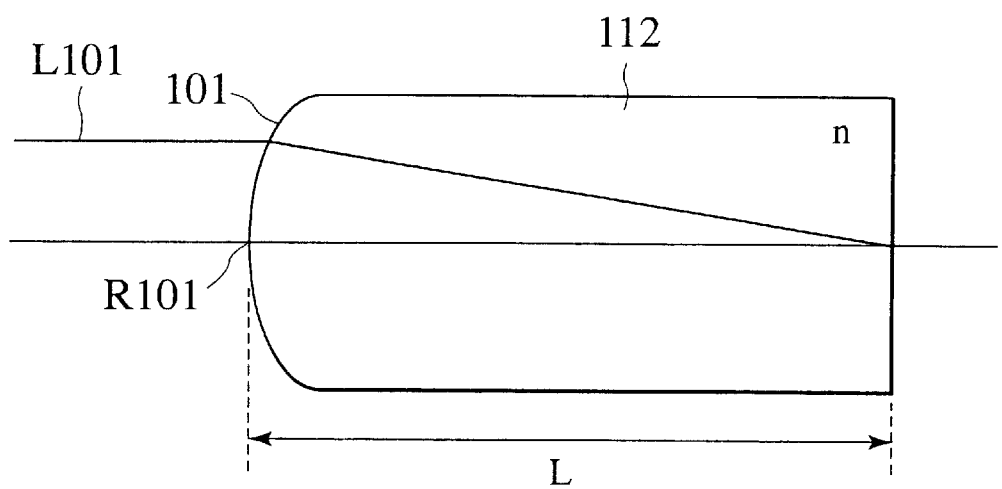
Figure 6C:
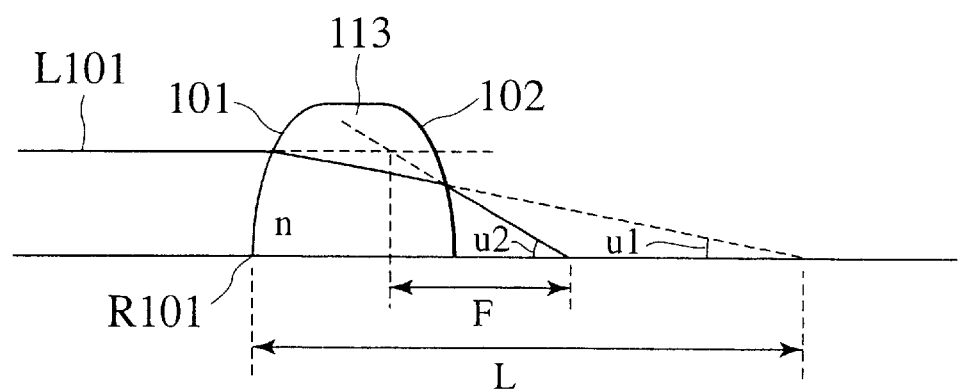

FIGS. 6A to 6C show the finding of this formula.

In FIG. 6A, a lens 111 has a refractive index n. A first surface 101 of the lens 111 has a radius of curvature R101, and a second surface 102 thereof has an infinite radius of curvature R102. A ray L101 entering the lens 111 is in parallel with an optical axis. The second surface 102 is flat because the radius of curvature R102 is infinite. A focal length f of the lens 111, the radius of curvature R101, and the refractive index n are expressed as follows:

$$f = R/(n-1)$$

In FIG. 6B, an image plane (image space) 112 has a refractive index n. A ray L101 is in parallel with an optical axis and enters a first surface 101 having a radius of curvature R 101. The ray L101 intersects the optical axis at a distance L from the vertex of the first surface 101. In this case, the following relationship is established:

$$f = L/n$$

Accordingly, the radius of curvature R101 of the first surface 101 is expressed as follows:

$$R101 = (n-1)f(n-1)/n \cdot L$$

FIG. 6C is an expansion to a double convex lens. The double convex lens 113 receives a ray having a maximum height h in parallel with an optical axis. A length L in FIG. 6C corresponds to the length L in FIG. 6B. According to the definition of a magnification, the following is obtained:

$$n \cdot u1/u2 = n \cdot f/L$$

This can be written as follows:

$$L = n \cdot f/\beta$$

Based on this, the radius of curvature R101 of the first surface 101 can be expressed with the refractive index n, focal length f, and image magnification β as follows:

$$R101 = (n-1) \cdot f/\beta$$

Consequently, the before-mentioned formula for R1 and β' is obtained. Based on the formula, R1 is obtained as follows:

$$R1 = B/C$$

$$B = 0.85 f(n-1)$$

$$C = n(0.60866 - 0.11 \cdot t/f - 0.1272 \ d/f)(0.83 + 0.2 \cdot NA)$$

A lens having a numerical aperture equal to of greater than 0.75 and a sufficient eccentricity tolerance may be designed with the radius R1 of curvature involving a deviation ratio of 0.05, preferably 0.04, more preferably 0.03 or smaller from the value R1 in the above formula.

Sin(u1) is in inverse proportion to R1. Due to the characteristics of the sin function, a change in sin(u1) is relatively small compared to a change in u1, and therefore, a change in R1 results in a large change in u1. Namely, a tolerance for u1 is greater than a tolerance for R1.

According to these facts, conditions for a radius of curvature R1 of the first surface of a lens are summarized as follows:

$(1-D)A < R1 < (1+D)A$ (7)

$A = B/C$ $B = 0.85f(n-1)$ $C = n(0.60866 - 0.11t/f - 0.1272d/f)(0.83 + 0.2NA)$ where D is a positive number, which is 0.05, preferably 0.04, more preferably 0.03. The value D may be any number in the range of 0.03 to 0.05.

The influence of the optical disk transmission layer is relatively small if the refractive index of the transmission layer is in the range of 1.45 to 1.65.

The range of 0.03 to 0.05 for the positive number D is set to cover variations in the refractive index of the optical disk, more precisely, variations in the refractive index of the lens.

If the refractive index of the lens is low and if the numerical aperture of the lens is smaller than 0.75, the margin will increase. In this case, the range for the positive number D may be increased by 5%, to design a proper lens.

A lens satisfying the condition (7) relating to the radius of curvature R1 of the first surface of the lens simultaneously satisfies the requirements for the axial aberration, off-axis aberration, and eccentricity tolerance of the lens.

An aspherical lens according to an embodiment of the present invention may be a lens having a rotational symmetry shape around an optical axis (coaxial optical system), or a toric lens having slightly different aspherical shapes in different directions. The radius of curvature R1 in each direction of the first surface of the toric lens must be within the above-mentioned range.

Once a radius of curvature R1 of the first surface of a lens is set according to the condition (7), a radius of curvature R2 of the second surface of the lens is automatically determined from a focal length f of the lens as follows:

$R2 = G/H$ $G = f(n-1)(t(n-1)/n - R1)$ $H = (R1 - f(n-1))$

This formula is easily obtained from a basic formula to calculate a paraxial focal length of a single lens according to the radiuses of both surfaces and thickness of the lens.

In this way, the radius of curvature R1 at the vertex of the first surface of a lens, and the radius of curvature R2 at the vertex of the second surface of the lens are determined. According to the radiuses of curvature R1 and R2 and the conditions (1) and (2), the shapes of the aspherical surfaces of the lens are uniquely determined. At this time, the lens well satisfies the sine condition of the condition (3), to provide a large eccentricity tolerance.

As explained above, it is impossible to satisfy the condition (3) while completely satisfying the conditions (1) and (2). This is because an aspherical lens has design freedom only on two aspherical surfaces with respect to the three conditions. Namely, an aspherical lens has a design freedom of 2. However it is possible to increase an eccentricity tolerance by slightly changing the aspherical shapes completely satisfying the conditions (1) and (2) as mentioned above. This unavoidably results in deteriorating the axial aberration and off-axis aberration of the lens, but can secure or allow a manufacturing tolerance greater than order of micrometer for example that is important to practically produce the lens.

In other words, the present invention properly deteriorates the axial aberration and off-axis aberration of a lens, thereby balancing the characteristics of the lens and securing an eccentricity tolerance for the lens. Namely, the present invention properly adjusts the satisfaction levels of the conditions (1) to (3) when designing a lens. In the present embodiment, the conditions (1) to (3) are simultaneously satisfied to some extent by deteriorating the conditions (1) and (2) while securing condition (3). This balancing secures the eccentricity tolerance greater than the order of micrometers for example.

To find proper aspherical shapes for a lens, the spherical radiuses of the lens must meet the conditions (6) and (7). Otherwise, the lens is unable to secure a proper eccentricity tolerance and may involve imbalanced axial aberration and off-axis aberration.

The above mentioned lens securing an eccentricity tolerance dose not satisfy a sufficient condition securing a chromatic aberration because the conditions (4) and (5) are not considered. The chromatic aberration will be explained in detail hereafter.

To improve the satisfaction levels of the conditions (4) and (5) for a lens, the thickness t along optical axis through the center of a lens and focal length f of the lens must satisfy the following condition:

$t > (1+E)f$ where E is a number equal to or larger than 0, preferably 0, more preferably 0.1, still more preferably 0.2.

According to the condition (4), an aberration increase at the best focus of a lens at each wavelength must be small with respect to a wavelength error. As the thickness along optical axis through the center of a lens becomes thicker, the radius of the first surface (incident surface) of the lens becomes larger. More precisely, as the radius of curvature of the first surface of a lens increases, a ray entering the periphery of the lens makes a smaller incident angle θ (an angle between a normal to the first surface and the ray). This results in reducing a refraction effect, which is a nonlinear phenomenon, and reducing spherical aberration with respect to a wavelength change.

FIG. 7 is a graph showing a relationship between lens thickness along optical axis through the center of a lens and residual aberration due to a wavelength error of 5 nm. The residual aberration is spherical aberration. This graph was prepared on many designed lenses having an NA of 0.85, a focal length of 2.5 mm, and lens material of Ohara LAM70. The lenses were designed with a relatively large eccentricity tolerance.

According to the graph of FIG. 7, an aberration of 0.04 λ or greater occurs when the lens thickness becomes thinner than the focal length. The aberration greatly increases when the lens thickness is thinner than 3 mm, which is 1.2 times the focal length.

According to the condition (5), an aberration increase caused by wavelength spread of a light source must be small. If there is a light source having wavelength spread, wavelengths around a center wavelength produce focusing errors in addition to the spherical aberration mentioned above, when an observation plane is set on a best image plane of the center wavelength. In practice, the influence of the focusing errors is greater than that of spherical aberration. For wavelengths shorter than 450 nm (0.45 µm), the refractive index of glass greatly disperses to increase the influence of the focusing errors.

A focusing error occurs due to a change in the back focal length of a lens when a wavelength changes. The back focal length fb of a lens is obtained from a ray tracing formula based on a paraxial approximation as follows:

$$fb=f(1-t(n-1)/n/R1)$$

A change in the refractive index n of the lens due to glass dispersion causes a change in the back focal length fb, and this back focal length change is a focusing error.

Figure 8:
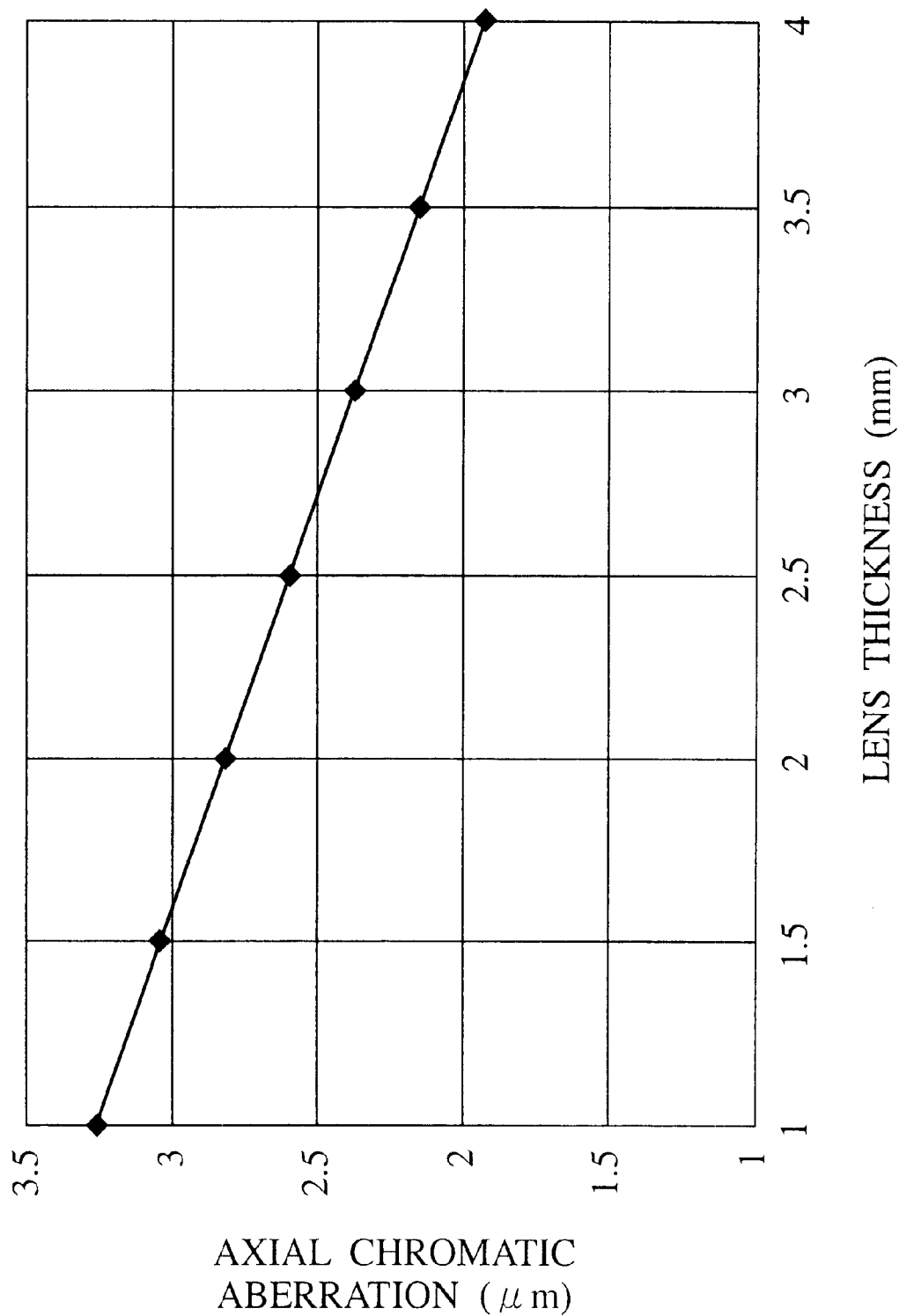
FIG. 8 is a graph showing a relationship between lens thickness and axial chromatic aberration (or back focal length fb) with a lens having a focal length of 2 mm and a refractive index of 1.75 that is changed to 1.7486.

FIG. 8 is a graph showing a relationship between lens thickness and axial chromatic aberration (or back focal length fb) measured in lenses having a focal length of 2 mm and a refractive index changed from 1.75 to 1.7486. A change in the back focal length fb of each lens corresponds to an axial chromatic aberration. The refractive index change from 1.75 to 1.7486 corresponds to a refractive index change due to a wavelength change of about 5 nm when glass having an Abbe number of about 45 is used with a wavelength of around 400 nm. The lenses are each a plano-convex lens having a radius of curvature R1 of 1.5 mm. Lenses according to the present invention are not plano-convex lenses but are double-sided spherical lenses, more precisely, double-sided aspherical lenses. Paraxial values including f and fb of a lens are determined by the radius of the vertex of the lens, and therefore, a spherical lens and an aspherical lens make no difference between them. A change in the back focal length fb of a spherical lens is substantially free from the influence of bending of the lens, which changes the radiuses of curvature R1 and R2 of the lens while keeping the focal length of the lens, and is substantially equal to that of a piano-convex lens. Accordingly, FIG. 8 is effective to consider spherical lenses. According to the graph of FIG. 8, the axial chromatic aberration becomes smaller in proportion to the lens thickness. In this regard, the lens thickness must be as thick as possible.

According to the formulas described in this specification, a perfect aplanat has a first surface radius that minimizes an eccentricity aberration increase. When balancing aberration conditions as mentioned above, it is not always necessary to employ a radius that realizes a minimum eccentricity aberration. Within the conditional ranges specified by the formulas, a radius close to the eccentricity aberration minimizing radius is employed as a radius of the vertex of an aspheric shape of a given lens, to balance the axial aberration and off-axis aberration of the lens.

Balancing these aberration conditions is to consider design freedom levels and is equal to introduce imperfection into a perfect aplanat. According to an embodiment of the present invention, the radiuses of a lens can be balanced by adding a degree of freedom thereto.

If a radius of curvature of a lens is out of the conditions specified by the present invention, aberrations of the lens will be imbalanced. It is necessary, therefore, to keep the conditions.

In the above, a change in the characteristics of a lens due to a numerical aperture change has been explained in connection with a change in an image magnification β of the lens. A change in an angle u1 between a highest ray in a lens and an optical axis will be explained in connection with a change in the numerical aperture of the lens.

When the numerical aperture of a lens changes, the angle u1 changes substantially proportionally. Due to the reasons mentioned in connection with a change in the image magnification β, a change in the angle u1 is not strictly a proportional change. A change in the angle u1 causes a change in the image magnification β.

A lens having a numerical aperture including 0.85 forms an angle u1' between a highest ray in the lens and an optical axis, wherein the highest ray enters the first surface of the lens parallel to the optical axis. The angle u1' is expressed as follows:

$$\sin(u1')=(0.60866-0.11 \cdot t/f-0.1272 \cdot d/f)(0.83+0.2 \cdot NA)NA/0.85$$

where f is a focal length of the lens, t is a thickness along optical axis through the center of the lens, d is the thickness of a transmission layer of an optical disk on which the lens works, and NA is a numerical aperture of the lens.

To design a lens having a numerical aperture equal to or greater than 0.75 and a sufficient eccentricity tolerance, the sine of an angle u1' of the lens must keep a deviation ratio of 0.06, preferably 0.05, more preferably 0.04 from K mentioned above.

This condition on the angle u1' is expressed as follows:

$$(1-D)K<\sin(u1')<(1+D)K \tag{8}$$

$$K=(0.60866-0.11 \cdot t/f-0.1272 \cdot d/f)(0.83+0.2 \cdot NA) \cdot NA/0.85$$

where D is a positive number of 0.06, preferably 0.05, more preferably 0.04. The number D may be any number in the range of 0.04 to 0.06.

The influence of a transmission layer of an optical disk is relatively small if the refractive index of the transmission layer is in the range of 1.45 to 1.65.

The range of 0.04 to 0.06 for the positive number D is to cover different disk refractive indexes, more precisely, different lens refractive indexes.

Lenses having numerical apertures of less than 0.75 have greater margins, and therefore, the range for the positive number D for such lenses may be expanded by 6%.

The thickness t along optical axis through the center of the lens and focal length f of the lens satisfying the above condition must satisfy the following condition:

$$t>(1+E)f$$

where E is a number equal to or greater than 0, preferably 0.1, more preferably 0.2.

In consequence, a lens that satisfies the condition (4) for an angle u1' between a highest ray in the lens and an optical axis can simultaneously satisfy requirements for axial aberration, off-axis aberration, and an eccentricity tolerance.

An aspherical lens according to an embodiment of the present invention may be a lens having a rotational symmetry shape around an optical axis (coaxial optical system), or a toric lens having slightly different aspherical shapes in different directions. A radius of curvature in each direction of the first surface of the toric lens and the thickness of the toric lens must be within the above-mentioned ranges.

An optical pickup, an optical disk writer-reader, and an optical disk reader each employing the lens of the present invention will be explained.

A working distance of the lens must be greater than a maximum face runout of an optical disk on which the lens works.

This is to prevent the lens from colliding with the disk even if focus serve errs due to, for example, disk defects, disturbance, or vibration. If no focus serve operates, a collision avoiding measure such as moving the lens away from the disk will be taken. Accordingly, a risk of collision is high when trouble occurs during the focus serve.

If an optical disk warps in a simple bowl shape at a warp angle of α, a face runout quantity L of the disk at a radius R is as follows:

$$L = R \cdot \tan(\alpha)$$

Disk warp angles are specified in disk standards and are 0.6 degrees for CDs and 0.3 degrees for DVDs. A maximum face runout of a disk occurs at the periphery thereof. Namely, a CD of 120 mm diameter may have a face runout of 0.6 mm, and a DVD of 120 mm diameter may have a face runout of 0.3 mm.

Even a high-density disk is made of plastic, and therefore, it is difficult to reduce a warp of the disk. A maximum face runout of a disk is proportional to a radius of the disk. Namely, a face runout L of a disk having a maximum radius R on which an optical pickup or an optical disk writer-reader operates is expressed as follows:

$$L = 0.005 \cdot R$$

A working distance dw of a lens is as follows:

$$dw = fb - d/nd$$

where d is the thickness of an optical disk, nd is the refractive index of the optical disk, and fb is defined as follows:

$$fb = f(1 - t(n-1)/n/R1)$$

where R1 a radius of curvature of the lens.

As the thickness of a lens increases, the working distance thereof becomes shorter. To provide a proper lens, the working distance thereof must be finite. Namely, an upper limit of the thickness of a lens must be in a range where the working distance of the lens is finite. This range is determined by the focal length and thickness of the lens and the thickness of an optical disk.

The lens thickness may be in the range of 2 mm to 3.5 mm.

It is preferable to make the working distance dw greater than the maximum warp L of an optical disk as follows:

$$dw > L (= 0.005 \cdot R)$$

If the maximum radius of a disk handled by an optical disk writer-reader is 60 mm, the working distance is 0.3 mm or over. If the maximum disk radius is 25 mm, the working distance is 0.125 mm or over. If the maximum disk radius is 40 mm, the working distance is 0.1 mm or over.

It is apparent from the above formula that the focal length of a lens must be increased to allow the large working distance of the lens. Elongating the focal length, however, increases the size of the lens, thereby increasing the size of an optical pickup or an optical disk writer-reader. A large lens is disadvantageous for the frequency characteristics of a lens actuator and is unable to realize a high transmission rate.

Namely, there is a preferable focal length range for a lens. According to an embodiment of the present invention, the focal length of a lens is preferably 10 mm or smaller, more preferably 3.5 mm or smaller.

The size (diameter) ϕ of a light flux entering a lens depends on the numerical aperture (NA) and focal length f of the lens and is expressed as follows:

$$\phi = 2 \times NA \times f$$

If the focal length is 10 mm and NA is 0.75, ϕ=15 mm. This light flux diameter is large compared with many optical pickups that use a light flux diameter of 5 mm or smaller. It is required, therefore, that the focal length of a lens be 10 mm or smaller. If ϕ=5 mm and NA=0.75, f=3.33 mm. Namely, the focal length of a lens is preferably 3.5 mm or below.

An optical pickup according to an embodiment of the present invention employs the objective of any one of the embodiments of the present invention. The optical pickup employing the objective emits a focused light flux toward a track on an optical disk to write and read information signals to and from the optical disk. The optical pickup preferably has an image magnification of 0.

An optical disk writer-reader or an optical disk reader according to an embodiment of the present invention employs the objective of any one of the embodiments of the present invention. The optical disk writer-reader or optical disk reader employing the objective emits a focused light flux toward a track on an optical disk to write and read information signals to and from the optical disk. The optical disk writer-reader or optical disk reader preferably has an image magnification of 0.

Objectives for optical disks according to embodiments of the present invention will be explained.

In the following embodiments, an aspherical surface of a lens is expressed with the following polynomial:

$$Z = CR/(1 + (1 - (1+K)C^2R^2)^{0.5}) + AR^4 + BR^6 + CR^8 + DR^{10} + ER^{12} + FR^{14}$$

where Z is a distance from the vertex of the surface, R is a height from an optical axis, K is a conic constant, and A to F are aspherical coefficients of degrees 4 to 14. For example, A is a coefficient for $R^4$.

Embodiment 1

Figure 9:
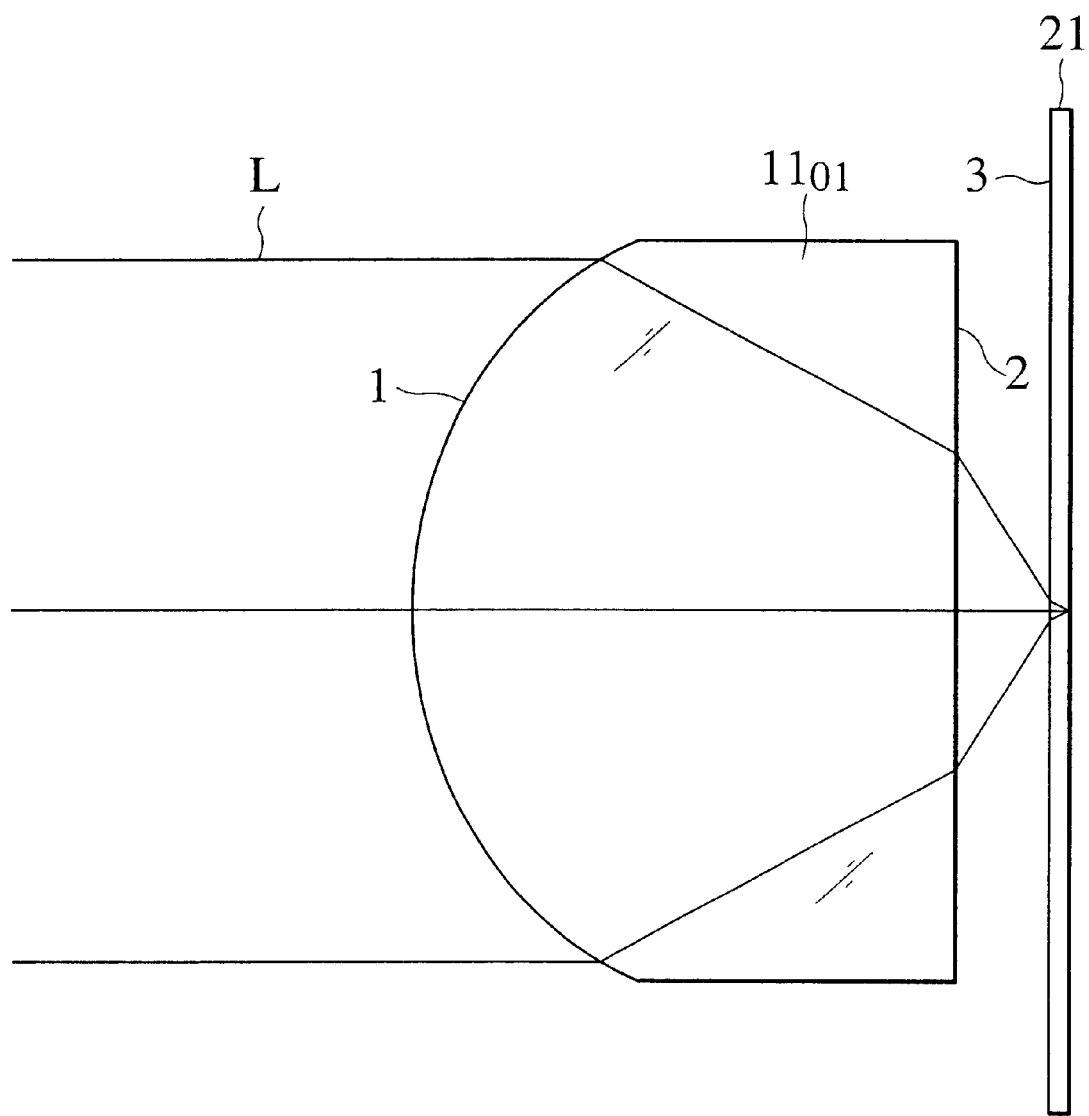
FIG. 9 is a sectional view showing an objective according to an embodiment 1 of the present invention.

FIG. 9 is a sectional view showing an objective according to the embodiment 1 of the present invention. This lens is referred to as the lens $11_{01}$.

A light flux L enters the lens $11_{01}$, is refracted by a first surface 1 and a second surface 2 of the lens $11_{01}$, is transmitted through a third surface 3 and transmission layer of an optical disk 21, and is focused on a signal recording plane of the optical disk 21.

Table 1 shows specifications of the lens $11_{01}$.

TABLE 1

| | |
|---|---|
| Design wavelength | 405 nm |
| Numerical aperture | 0.85 |
| Focal length | 2 mm |
| Entrance pupil diameter | 3.4 mm |
| Disk thickness | 0.1 mm |
| Image magnification | 0 |

Table 2 shows design values for the lens $11_{01}$. Units for radiuses and thicknesses are mm in Table 2 and in other tables that follow.

TABLE 2

| Surface No. | Surface shape | Radius | Thickness | Refractive Index | Conic constant |
|---|---|---|---|---|---|
| 1 | Aspheric | 1.71 | 2.75 | 1.85 | −0.9168291 |
| 2 | Aspheric | −75.9027 | 0.4605 | — | 2518.06 |
| 3 | — | Infinite | 0.1 | 1.62230752 | — |
| Image surface | — | — | — | — | — |

Table 3 shows aspherical coefficients for the first surface of the lens $11_{01}$.

TABLE 3

| Coefficient for $R^4$ | 0.013687371 |
|---|---|
| Coefficient for $R^6$ | 0.00087533585 |
| Coefficient for $R^8$ | 0.00087533585 |
| Coefficient for $R^{10}$ | −0.00077467164 |
| Coefficient for $R^{12}$ | 0.00030433925 |
| Coefficient for $R^{14}$ | −5.3502493 × $10^{-5}$ |

Table 4 shows aspherical coefficients for the second surface of the lens $11_{01}$.

TABLE 4

| Coefficient for $R^4$ | 0.22363727 |
|---|---|
| Coefficient for $R^6$ | −0.58889528 |
| Coefficient for $R^8$ | 0.72567392 |
| Coefficient for $R^{10}$ | −0.47382503 |
| Coefficient for $R^{12}$ | 0.12985027 |

According to the lens specifications, a recommended value for R1, or a value for A of the formula (7) is calculated as 1.731695 mm. From this recommended value, the design value for R1 deviates by 1.25%.

The lens $11_{01}$ is an aplanat that substantially satisfies the conditions (1) and (2) and leaves little error in the condition (3).

The lens $11_{01}$ involves an axial wavefront aberration of 0.002 λ, which is very small and is substantially zero in practical use. The lens shows a wavefront aberration of 0.023 λ for an incident ray of 0.5 degrees in off-axis angle. This value is satisfactory. With respect to a surface-to-surface eccentricity of 3 μm, the lens shows a wavefront aberration of 0.036 λ. This aberration concerning the surface-to-surface eccentricity is critical when manufacturing the lens, and the aberration demonstrated by the lens $11_{01}$ is satisfactorily small.

A working distance of the lens $11_{01}$ is 0.4605 mm, which is larger than a preferable working distance of 0.3 mm for a disk of 60 mm radius.

A highest ray to the lens $11_{01}$ forms an angle u1' in the lens, and this angle provides sin(u1')=0.46. A recommended value for sin(u1') calculated from the lens specifications, i.e., K of the formula (8) is 0.4511. From this recommended value, the design value deviates by 1.97%.

Figure 10:
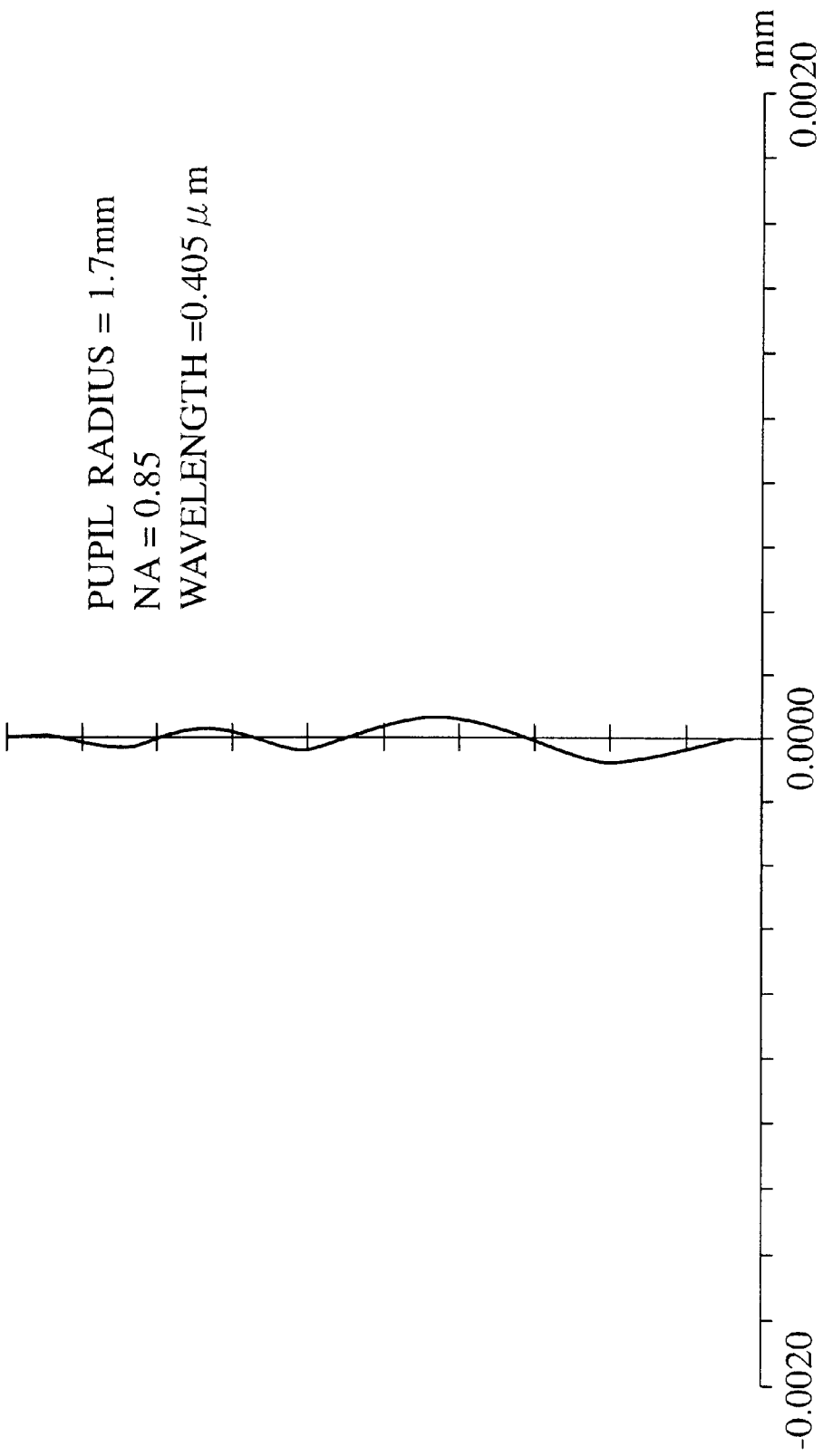
FIG. 10 is a graph showing a longitudinal aberration of the objective of the embodiment 1.
Figure 11:
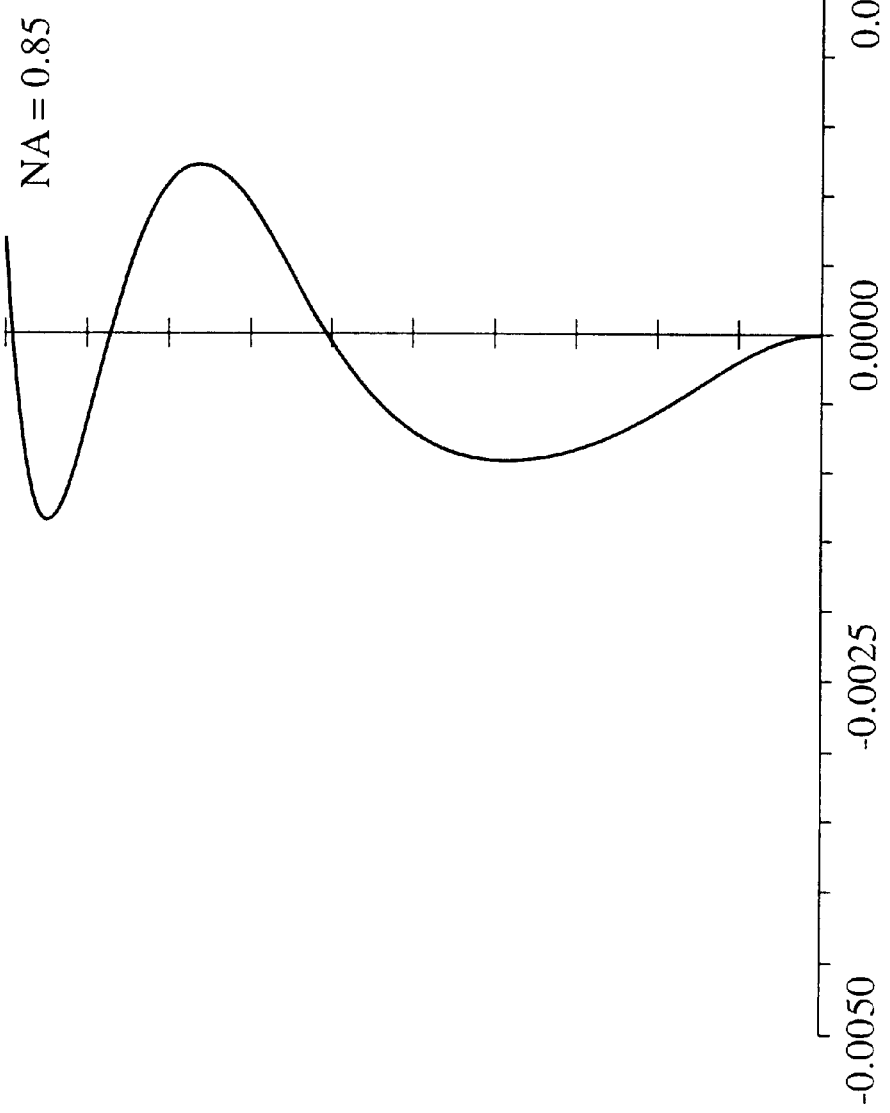
FIG. 11 is a graph showing an offense against the sine condition of the objective of the embodiment 1.
Figure 12:
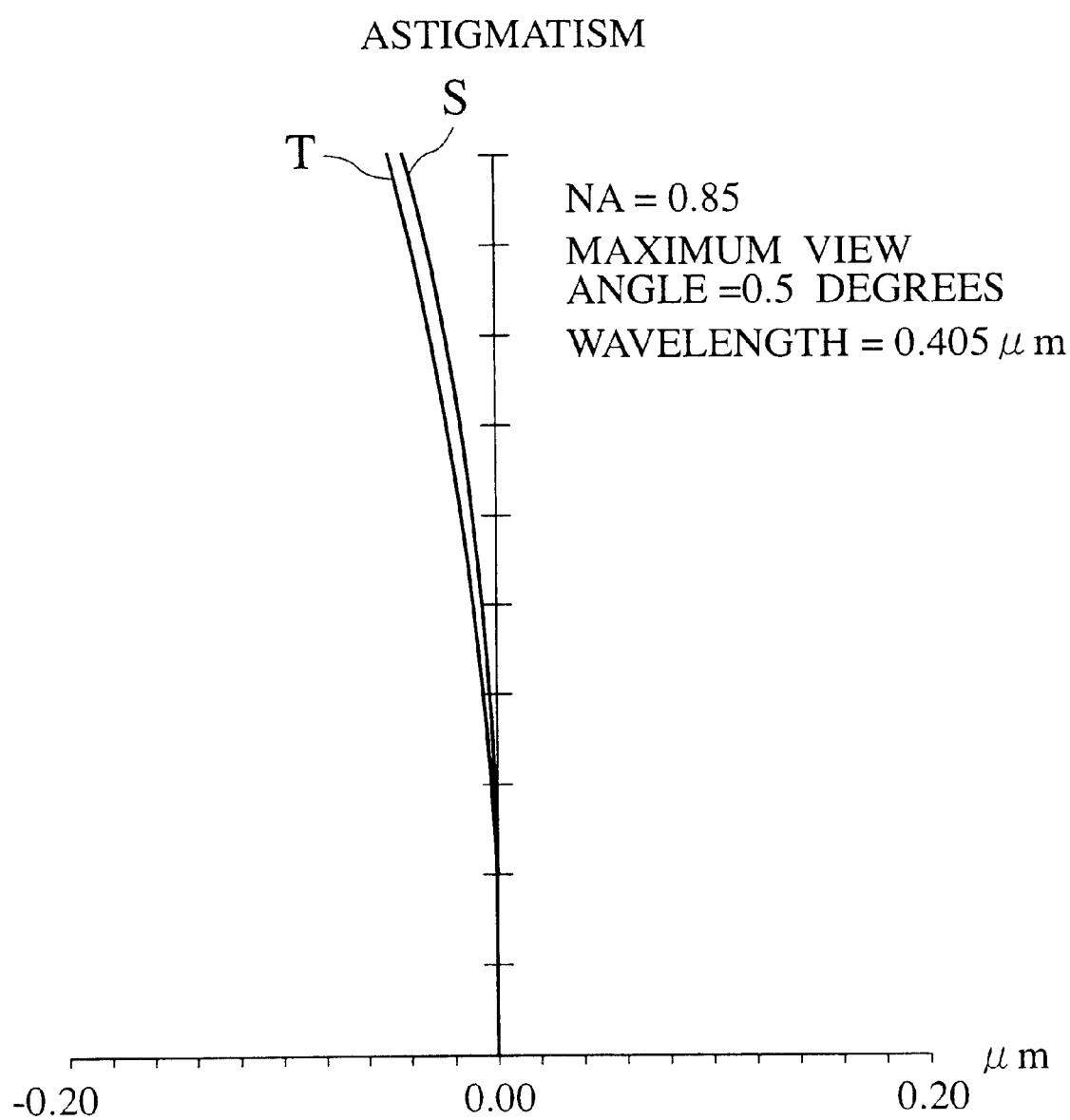
FIG. 12 is a graph showing an astigmatism of the objective of the embodiment 1.

FIG. 10 is a graph showing a longitudinal aberration of the lens $11_{01}$, FIG. 11 is a graph showing an offense against the sine condition of the lens $11_{01}$, and FIG. 12 is a graph showing an astigmatism of the lens $11_{01}$.

Figure 13:
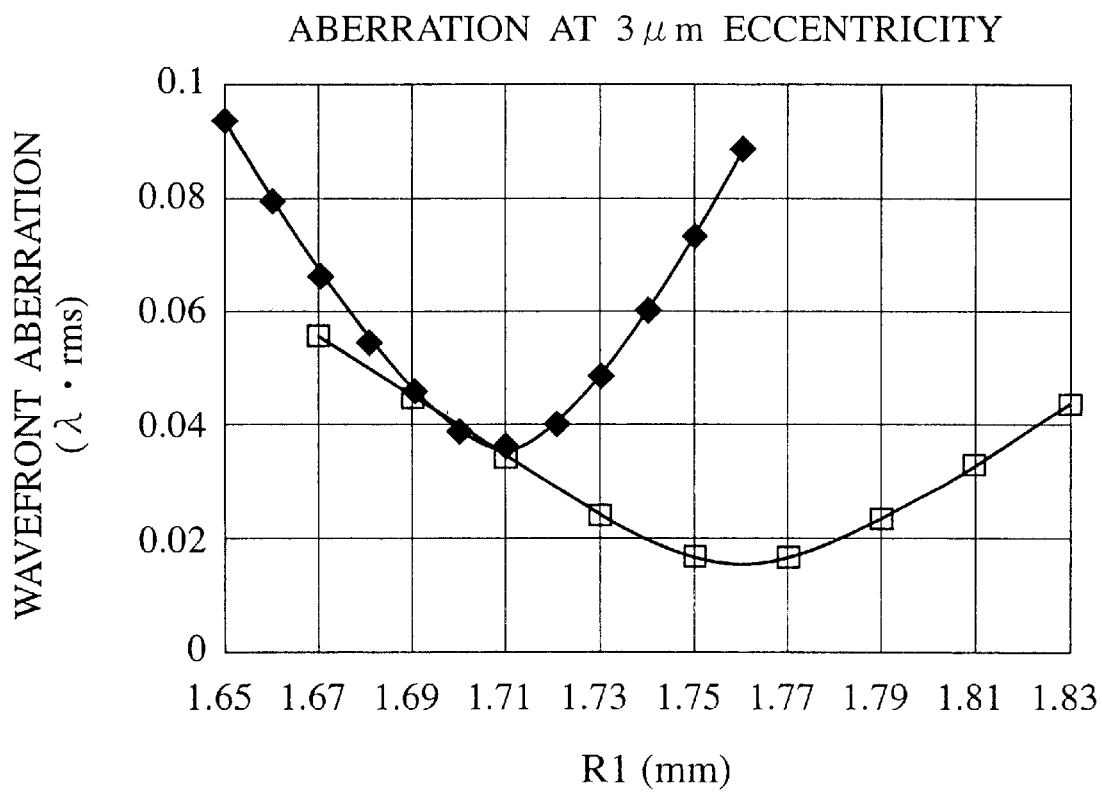
FIG. 13 is a graph showing relationships between R1 (radius of curvature) and wavefront aberration of a lens having the same refractive index and thickness as those of the lens of the embodiment 1 and a slightly different R1.

FIG. 13 is a graph showing relationships between R1 (radius of curvature) and wavefront aberration of lenses having the same refractive index and thickness as those of the lens $11_{01}$ and slightly different radiuses of curvature R1. The lenses involve an eccentricity of 3 μm.

In FIG. 13, white squares represent lenses having a numerical aperture of 0.75, and black rhombuses represent lenses having a numerical aperture of 0.85. Curves plotting these marks show aberration increases.

The value A of the formula (7) is 1.767 mm for the lenses having a numerical aperture of 0.75, and 1.732 mm for the lenses having a numerical aperture of 0.85.

From FIG. 13, it is understood that, if an eccentricity aberration limit is set as 0.04, the radius of curvature R1 of the first surface of a lens must be set within 5% of the recommended value A. Preferably, it must be set within 4% of the recommended value, to secure an eccentricity aberration of 0.04 λ or below.

As the numerical aperture of a lens increases, aberration relative to a change in R1 rises. In consideration of this, it is preferable to set the radius of curvature R1 within 3% of the recommended value A.

In the lenses having a numerical aperture of 0.85, the radius of curvature R1 at a best aberration point deviates from the theoretical value A by about 1%. This is because of an error in the regression formula. The range mentioned above takes this error into account.

According to the lens specifications, an eccentricity of 3 μm causes an aberration of 0.04 λ. Other lens specifications may provide relatively large aberration. Even in such a case, the radius of curvature of a lens must be suppressed within the above-mentioned range.

The thickness of the lens $11_{01}$ is 1.375 times the focal length thereof. The lens $11_{01}$ is made of glass material having a fixed refractive index. A wavelength change of 5 nm may change the refractive index to 1.8486, to cause an aberration of 0.01 λ on a best image plane. This aberration is small. An axial chromatic aberration is 2.17 μm, which is also small.

Embodiment 2

Figure 14:
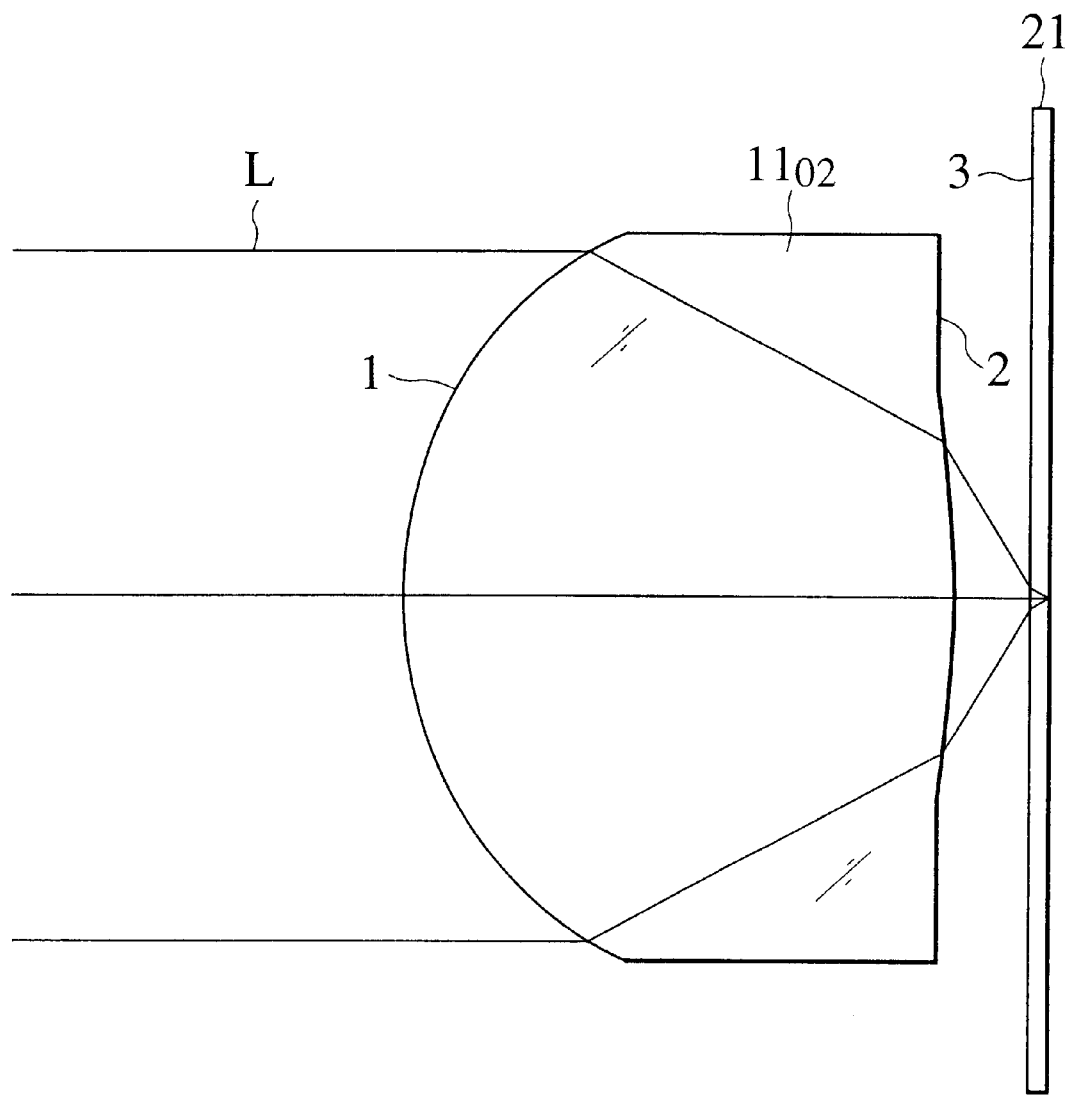
FIG. 14 is a sectional view showing an objective according to an embodiment 2 of the present invention.

FIG. 14 is a sectional view showing an objective according to the embodiment 2 of the present invention. This lens is referred to as the lens $11_{02}$.

A light flux L enters the lens $11_{02}$, is refracted by a first surface 1 and a second surface 2 of the lens $11_{02}$, is transmitted through a third surface 3 and transmission layer of an optical disk 21, and is focused on a signal recording plane of the optical disk 21.

Table 5 shows specifications of the lens $11_{02}$.

TABLE 5

| Design wavelength | 405 nm |
|---|---|
| Numerical aperture | 0.8 |
| Focal length | 1.750 mm |
| Entrance pupil diameter | 2.8 mm |
| Image magnification | 0 |

Table 6 shows design values for the lens $11_{02}$.

TABLE 6

| Surface No. | Surface shape | Radius | Thickness | Refractive Index | Conic constant |
|---|---|---|---|---|---|
| 1 | Aspheric | 1.45 | 2.5 | 1.75 | −0.9753354 |
| 2 | Aspheric | −3.613636 | 0.395 | — | — |
| 3 | — | Infinite | 0.1 | 1.62230752 | −188.2991 |
| Image surface | — | — | — | — | — |

Table 7 shows aspherical coefficients for the first surface of the lens $11_{02}$.

TABLE 7

| Coefficient for $R^4$ | 0.023305393 |
|---|---|
| Coefficient for $R^6$ | 0.017039056 |
| Coefficient for $R^8$ | 0.0023431785 |
| Coefficient for $R^{10}$ | −0.0023798936 |
| Coefficient for $R^{12}$ | 0.0013373117 |
| Coefficient for $R^{14}$ | −0.00035090993 |

Table 8 shows aspherical coefficients for the second surface of the lens $11_{02}$.

TABLE 8

| Coefficient for $R^4$ | 0.17601287 |
|---|---|
| Coefficient for $R^6$ | −0.54949768 |
| Coefficient for $R^8$ | 0.50420582 |
| Coefficient for $R^{10}$ | 0.12942116 |
| Coefficient for $R^{12}$ | −0.37309714 |

According to the lens specifications, a recommended value for R1, or a value for A of the formula (7) is calculated as 1.4495 mm. From this recommended value, the design value deviates by 0.3%. The lens $11_{02}$ is an aplanat that substantially satisfies the conditions (1) and (2) and leaves little error in the condition (3).

The lens $11_{02}$ involves an axial wavefront aberration of 0.001 λ, which is very small and is substantially zero in practical use. The lens shows a wavefront aberration of 0.013 λ for an incident ray of 0.5 degrees in off-axis angle. This value is satisfactory. With respect to a surface-to-surface eccentricity of 3 μm, the lens shows a wavefront aberration of 0.023 λ. This aberration concerning the surface-to-surface eccentricity is critical when manufacturing the lens, and the aberration demonstrated by the lens $11_{02}$ is satisfactorily small.

A working distance of the lens $11_{02}$ is 0.395 mm, which is larger than a preferable working distance of 0.3 mm for a disk of 60 mm radius.

A highest ray to the lens $11_{02}$ forms an angle u1' in the lens, and this angle provides sin(u1')=0.421. A recommended value for sin(u1') calculated from the lens specifications, i.e., K of the formula (8) is 0.44. From this recommended value, the design value deviates by 1.7%.

Figure 15:
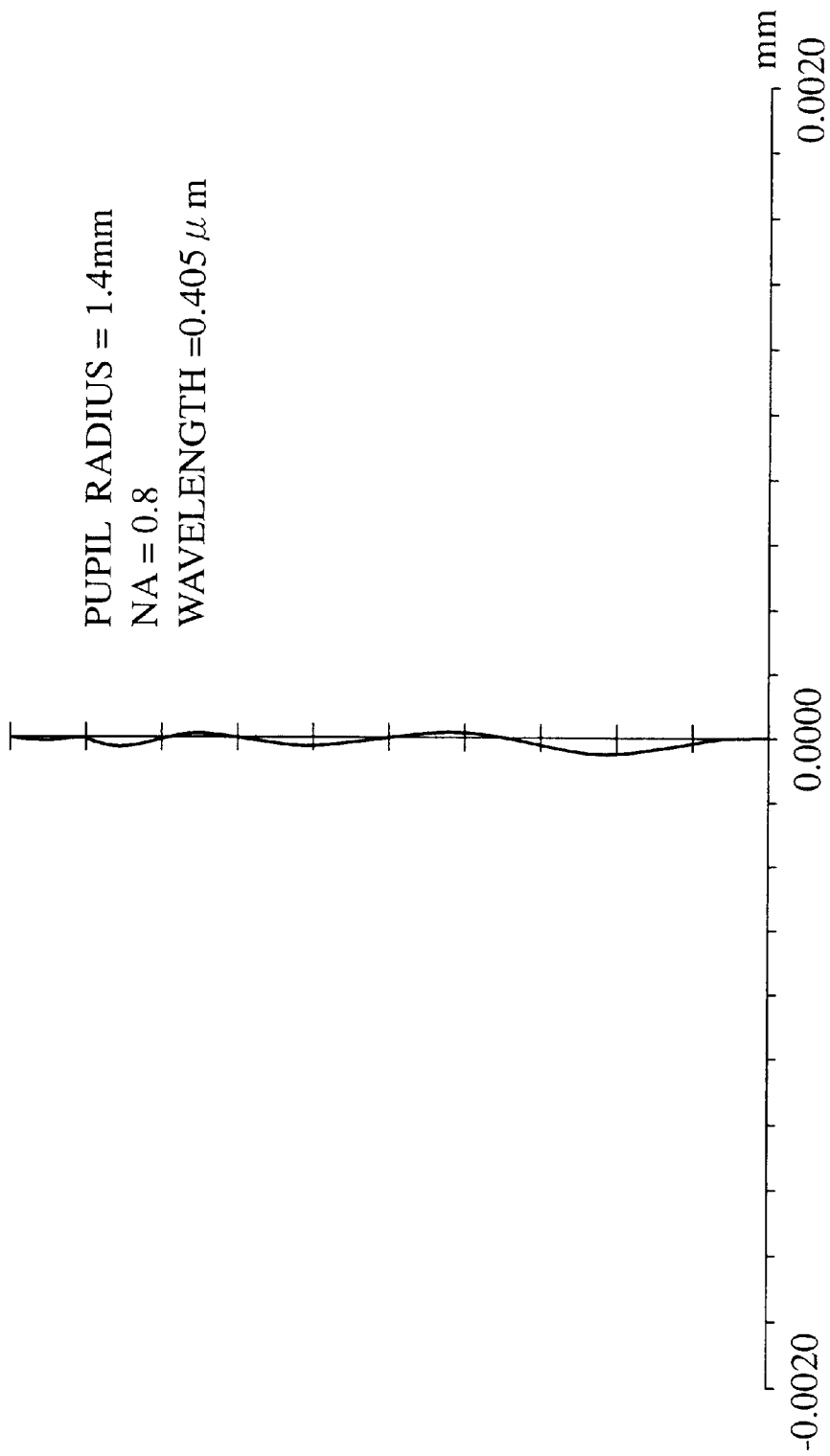
FIG. 15 is a graph showing a longitudinal aberration of the objective of the embodiment 2.
Figure 16:
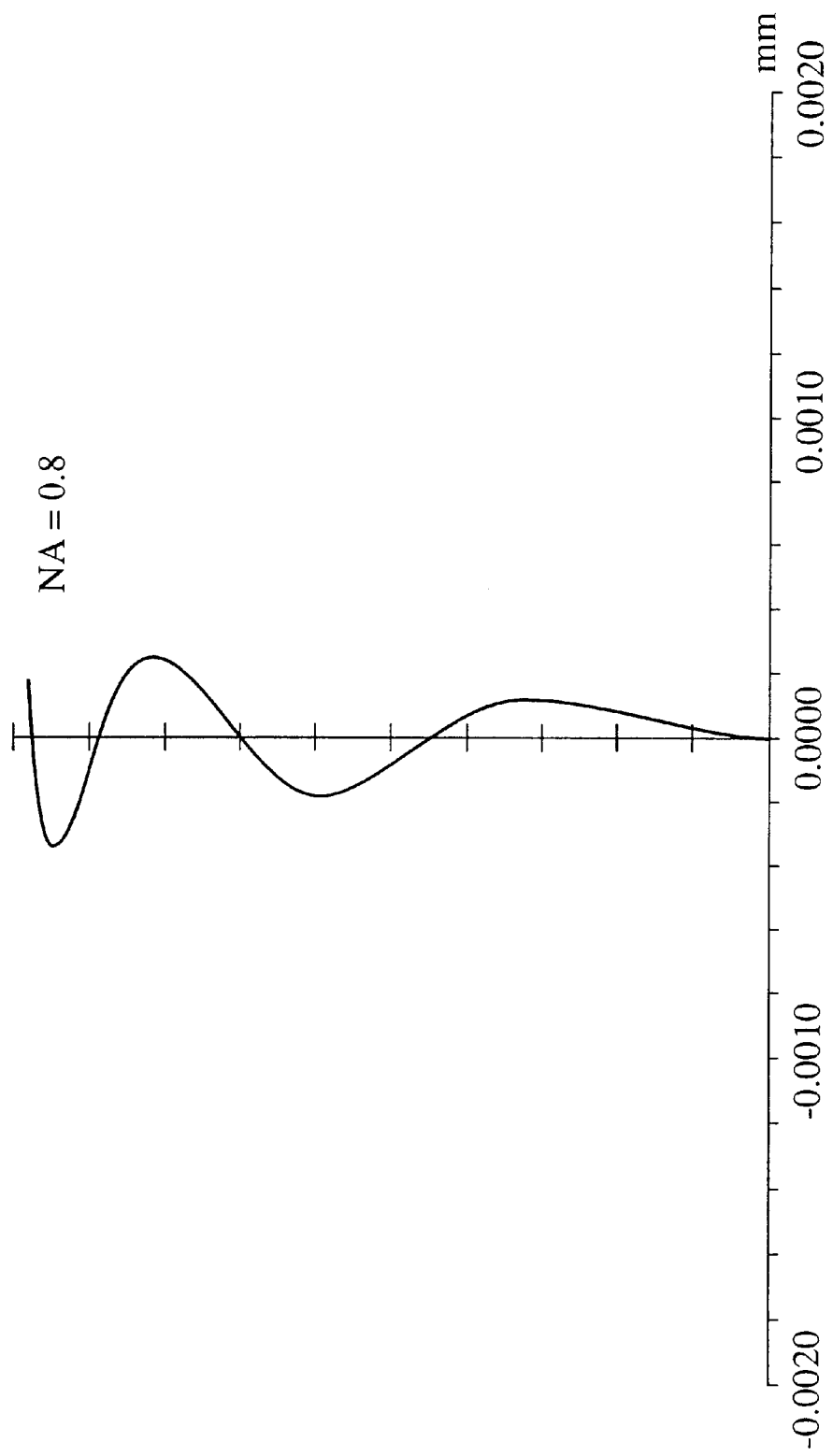
FIG. 16 is a graph showing an offense against the sine condition of the objective of the embodiment 2.
Figure 17:
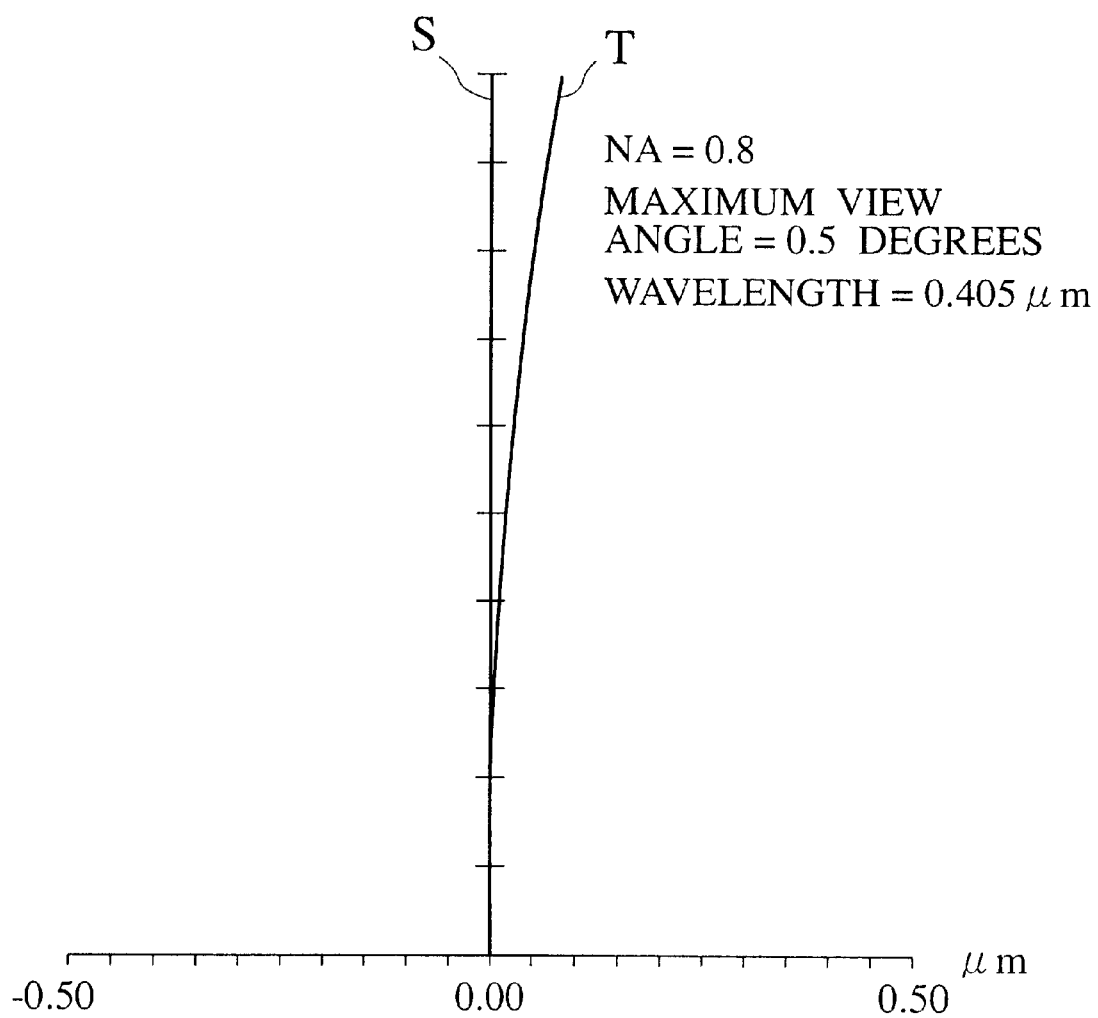
FIG. 17 is a graph showing an astigmatism of the objective of the embodiment 2.

FIG. 15 is a graph showing a longitudinal aberration of the lens $11_{02}$, FIG. 16 is a graph showing an offense against the sine condition of the lens $11_{02}$, and FIG. 17 is a graph showing an astigmatism of the lens $11_{02}$.

The thickness of the lens $11_{02}$ is 1.429 times the focal length thereof. The lens $11_{02}$ is made of glass material having a fixed refractive index. A wavelength change of 5 nm may change the refractive index to 1.7486, to cause an aberration of 0.01 λ on a best image plane. This aberration is small. An axial chromatic aberration is 2.10 μm, which is also small.

Embodiment 3

Figure 18:
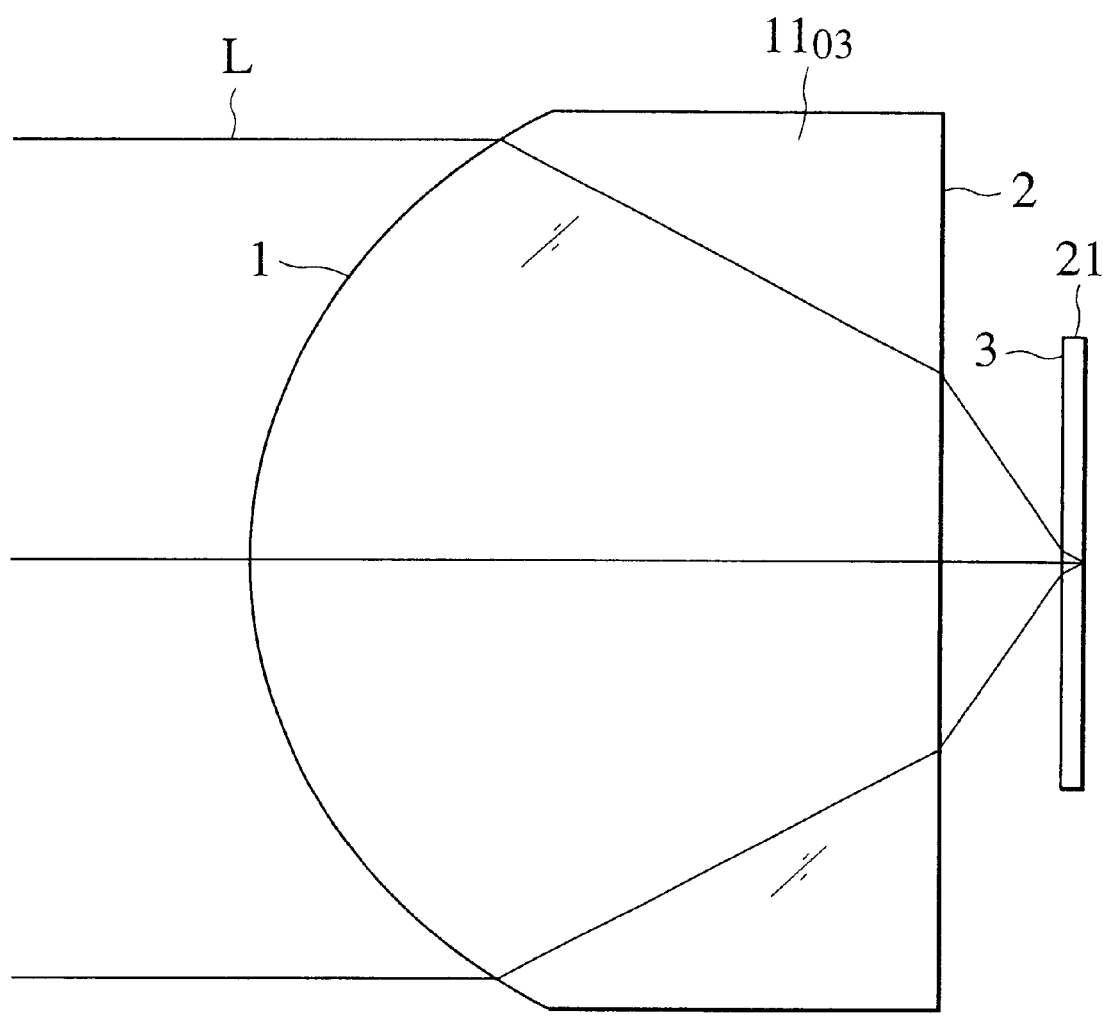
FIG. 18 is a sectional view showing an objective according to an embodiment 3 of the present invention.

FIG. 18 is a sectional view showing an objective according to the embodiment 3 of the present invention. This lens is referred to as the lens $11_{03}$.

A light flux L enters the lens $11_{03}$, is refracted by a first surface 1 and a second surface 2 of the lens $11_{03}$, is transmitted through a third surface 3 and transmission layer of an optical disk 21, and is focused on a signal recording plane of the optical disk 21.

Table 9 shows specifications of the lens $11_{03}$.

TABLE 9

| Design wavelength | 405 nm |
|---|---|
| Numerical aperture | 0.85 |
| Focal length | 2.2 mm |
| Entrance pupil diameter | 3.74 mm |
| Disk thickness | 0.1 mm |
| Image magnification | 0 |

Table 10 shows design values for the lens $11_{03}$.

TABLE 10

| Surface No. | Surface shape | Radius | Thickness | Glass material | Conic constant |
|---|---|---|---|---|---|
| 1 | Aspheric | 1.812171 | 3.104 | NBF1 | −0.3371789 |
| 2 | Aspheric | −6.507584 | 0.500289 | — | −845.6516 |
| 3 | — | Infinite | 0.1 | Polycarbonate | — |
| 4 | Image surface | — | — | — | — |

Table 11 shows aspherical coefficients for the first surface of the lens $11_{03}$.

TABLE 11

| Coefficient for $R^4$ | −0.00092006967 |
|---|---|
| Coefficient for $R^6$ | −0.00025706693 |
| Coefficient for $R^8$ | −0.00057872391 |
| Coefficient for $R^{10}$ | 0.0002222827 |
| Coefficient for $R^{12}$ | −5.6787923 × $10^{-5}$ |

Table 12 shows aspherical coefficients for the second surface of the lens $11_{03}$.

TABLE 12

| Coefficient for $R^4$ | 0.061448774 |
|---|---|
| Coefficient for $R^6$ | −0.13995629 |
| Coefficient for $R^8$ | 0.12867014 |
| Coefficient for $R^{10}$ | −0.043733069 |

Table 13 shows refractive indexes of the glass materials.

TABLE 13

| NBF1 | 1.76775590 |
|---|---|
| Polycarbonate | 1.62031432 |

According to the lens specifications, a recommended value for R1, or a value for A of the formula (7) is calculated as 1.81581 mm. From this recommended value, the design value deviates by 0.2%. The lens $11_{03}$ is approximately an aplanat that substantially satisfies the condition (1), is slightly unsatisfactory for the condition (2) so that the lens $11_{03}$ may suppress eccentricity aberration more than the lens $11_{01}$, and leaves little error in the condition (3).

The lens $11_{03}$ involves an axial wavefront aberration of 0.006 λ, which is very small and is substantially zero in practical use. The lens shows a wavefront aberration of 0.069 λ for an incident ray of 0.5 degrees in off-axis angle. This value is satisfactory. With respect to a surface-to-surface eccentricity of 5 μm, the lens shows a wavefront aberration of 0.034 λ. This aberration concerning the surface-to-surface eccentricity is critical when manufacturing the lens, and the aberration demonstrated by the lens $11_{03}$ is satisfactorily small.

A highest ray to the lens $11_{03}$ forms an angle u1' in the lens, and this angle provides sin(u1')=0.466. A recommended value for sin(u1') calculated from the lens specifications, i.e., K of the formula (8) is 0.464. From this recommended value, the design value deviates by 0.43%.

Figure 19:
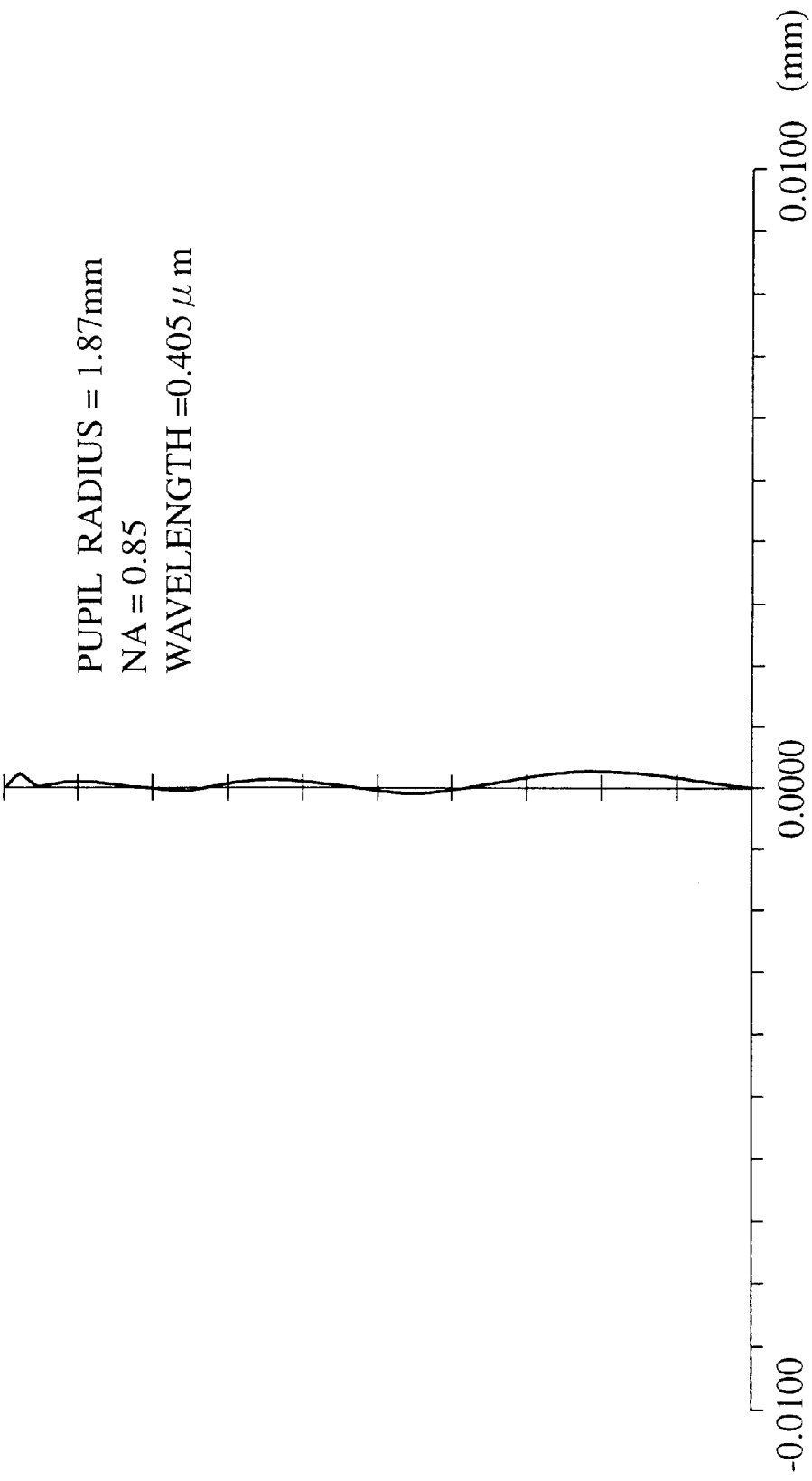
FIG. 19 is a graph showing a longitudinal aberration of the objective of the embodiment 3.
Figure 20:
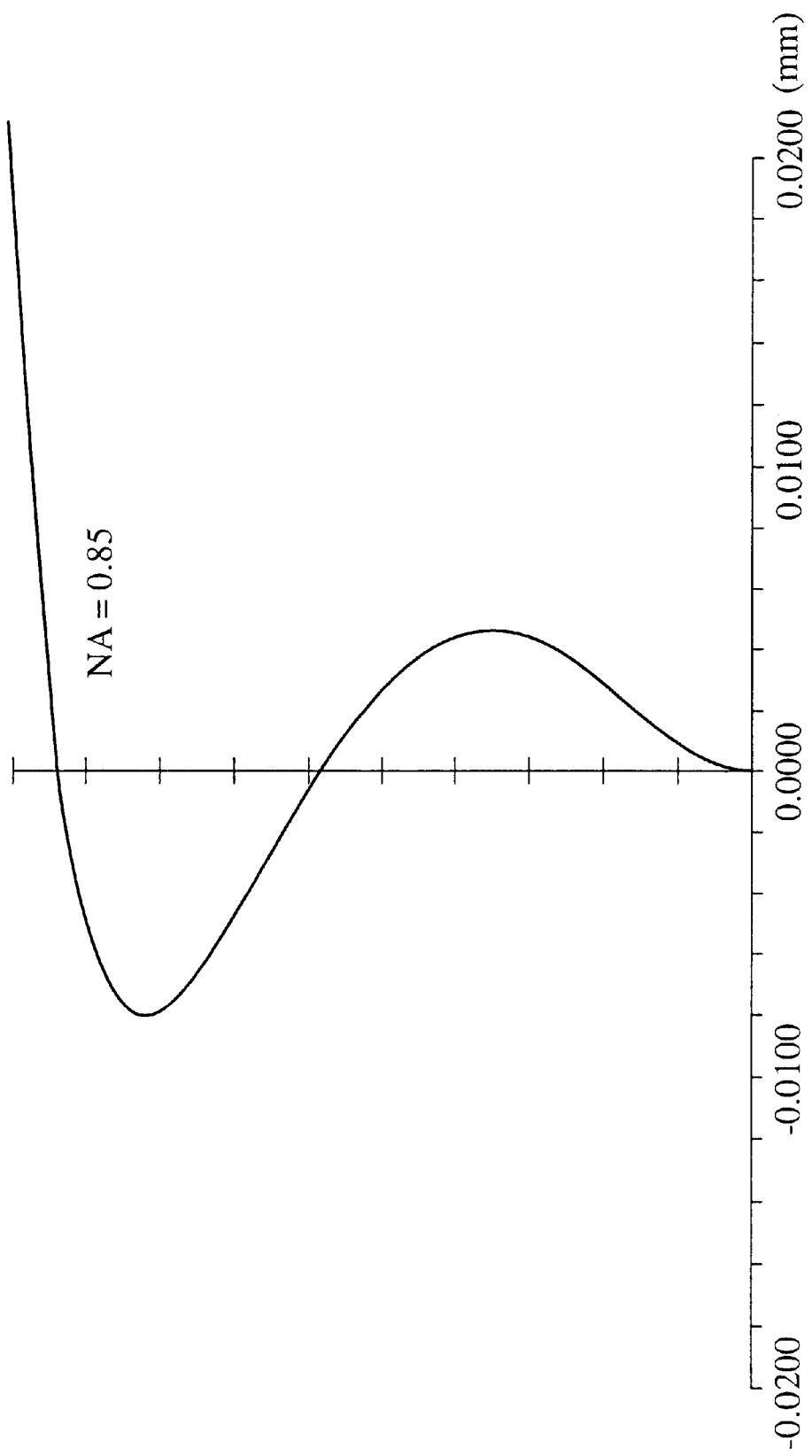
FIG. 20 is a graph showing an offense against the sine condition of the objective of the embodiment 3.
Figure 21:
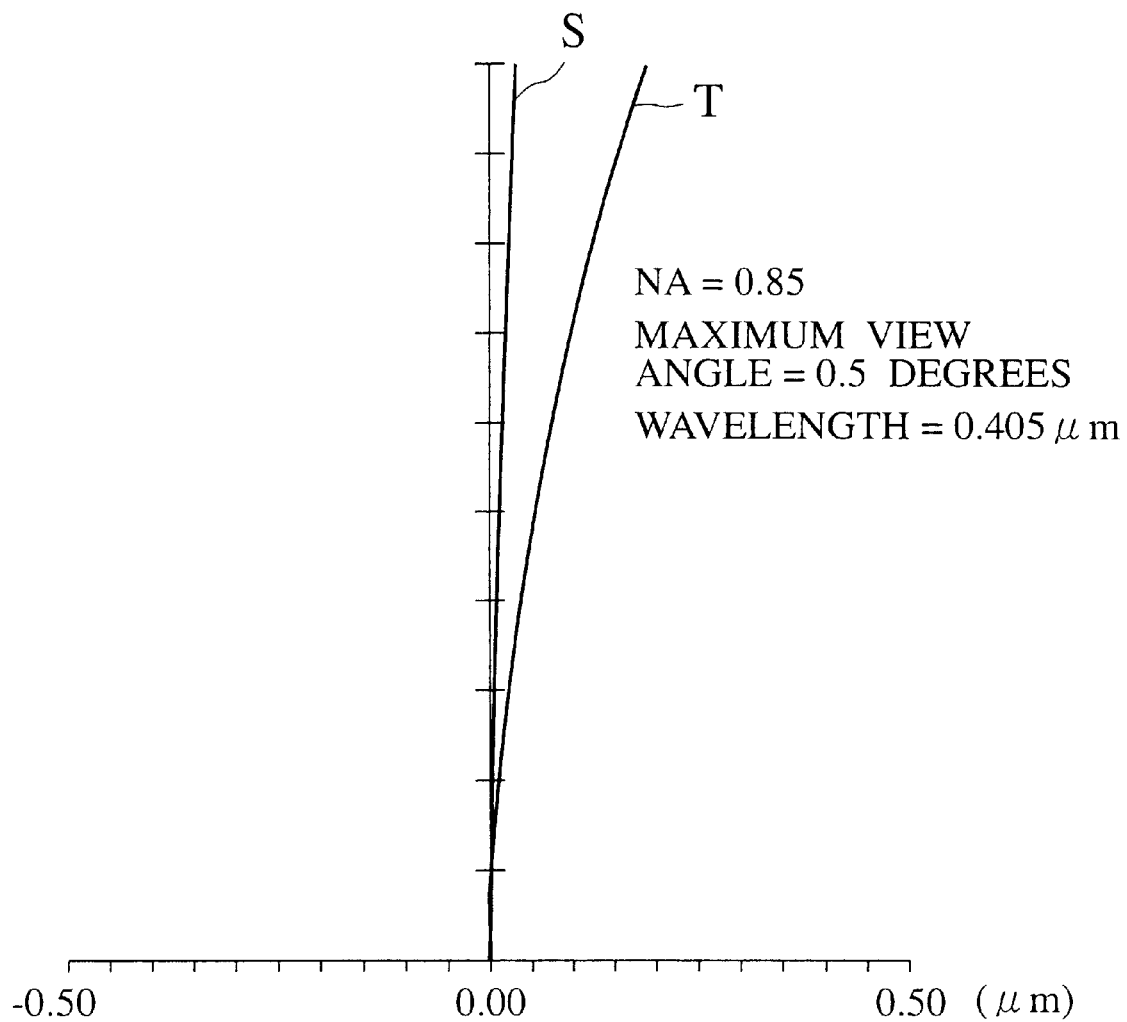
FIG. 21 is a graph showing an astigmatism of the objective of the embodiment 3.

FIG. 19 is a graph showing a longitudinal aberration of the lens $11_{03}$, FIG. 20 is a graph showing an offense against the sine condition of the lens $11_{03}$, and FIG. 21 is a graph showing an astigmatism of the lens $11_{03}$.

The thickness of the lens $11_{03}$ is 1.411 times the focal length thereof. A wavelength change of 5 nm to 410 nm may cause an aberration of 0.029 λ on a best image plane. This aberration is small. An axial chromatic aberration is 2.21 μm, which is also small.

The aspherical shape of the lens may slightly be changed to increase the eccentricity tolerance. In this case, the axial aberration or the off-axis aberration of the lens may deteriorate. Increasing the eccentricity tolerance, i.e., providing a sufficiently large manufacturing tolerance, however, is important when practically design the lens.

Providing a lens with a sufficient eccentricity tolerance and balanced characteristics is achievable by properly deteriorating the axial aberration and off-axis aberration of the lens. This is carried out by properly adjusting the satisfaction levels of the conditions (1) to (3) when designing the lens.

To find a proper aspherical shape for a lens, an angle (an incident angle) between a normal to the first surface of the lens at the height of a highest ray and an optical axis must conform to a conditional formula. Otherwise, the lens may not secure an eccentricity tolerance and increase axial aberration or off-axis aberration, thereby causing an aberration imbalance. This will be explained in detail.

The present inventor designed many aplanats that substantially perfectly satisfy the conditions (1) and (2) and meet the condition (3) as high as possible with different focal lengths, lens thicknesses, and glass materials of different refractive indexes. From studies conducted on these lenses, the present inventor found that the incident angle of a highest ray on the first surface of a lens controls axial aberration, off-axis aberration, and eccentricity aberration. A preferable design wavelength for a lens is 450 nm or below, more precisely, 405 nm.

Figure 22:
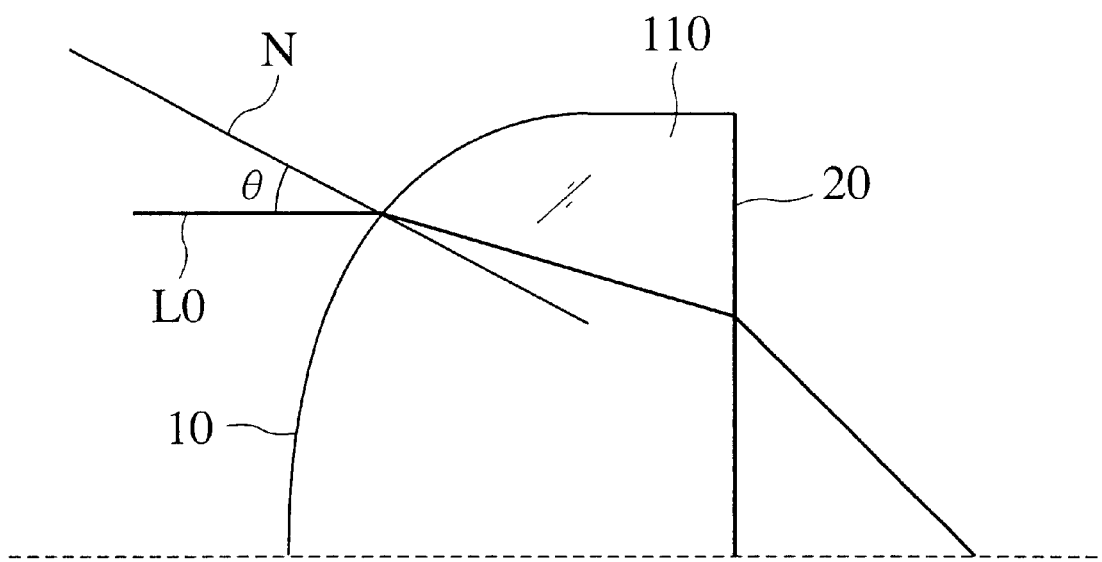
FIG. 22 shows the geometries of a lens.

FIG. 22 shows the geometries of one of the lenses tested by the present inventor.

A highest ray L0 is in parallel with an optical axis and enters a first surface of the objective 110. At an incident point on the first surface 10, the ray L0 forms an incident angle θ relative to a normal N. The lens 110 has a second surface 20.

Figure 23A:
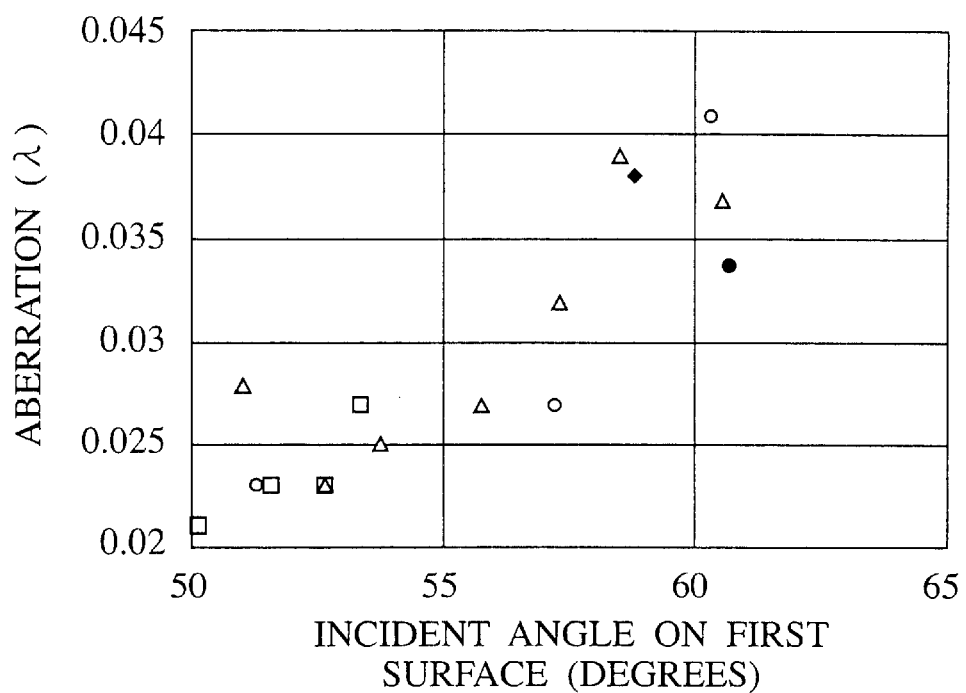
FIGS. 23A and 23B are graphs showing relationships between first-surface incident angle and aberration.
Figure 23B:
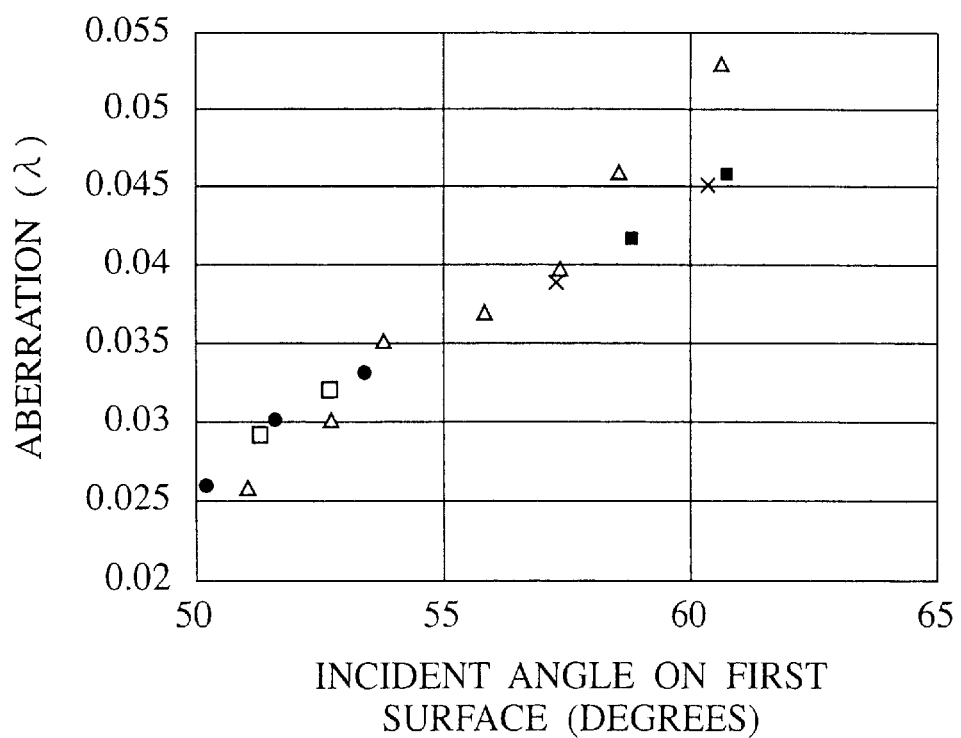

FIGS. 23A and 23B are graphs showing relationships between incident angle on the first surface 10 and aberration. FIG. 23A shows off-axis aberration caused by an oblique ray of 0.5 degrees. This off-axis aberration increases as an incident angle on the first surface 10 increases. A black rhombus represents a lens made of a glass material having a refractive index of 1.55, a white rhombus a lens made of a glass material having a refractive index of 1.65, a white triangle a lens made of a glass material having a refractive index of 1.75, a white circle a lens made of a glass material having a refractive index of 1.8, and a white square a lens made of a glass material having a refractive index of 1.85.

FIG. 23B shows aberration caused by a surface-to-surface eccentricity of 3 μm. A black square indicates a lens made of a glass material having a refractive index of 1.55, a cross a lens made of a glass material having a refractive index of 1.65, a white triangle a lens made of a glass material having a refractive index of 1.75, a white square a lens made of a glass material having a refractive index of 1.8, and a black rhombus a lens made of a glass material having a refractive index of 1.85.

FIGS. 23A and 23B show that aberration increases are substantially linear relative to incident angles on the first surface, although they vary depending on lens design specifications including lens focal lengths, lens thicknesses, and glass material refractive indexes and design techniques including an aspherical coefficient approximation. Axial aberration is properly corrected in each case to 0.006 λ or below.

The relationships shown in FIGS. 23A and 23B are general. Namely, the similar aberration characteristics appear for the same incident angle irrespective of glass material refractive indexes, lens thicknesses, or the radiuses of curvature of the vertexes of the first surfaces.

To design a lens having a proper eccentricity tolerance and off-axis aberration, a lens shape having an aberration of 0.04 λ or below with respect to an eccentricity of 3 μm and an off-axis aberration of 0.03 λ with respect to an oblique incident light of 0.5 degrees is employed. In addition, the conditions (1) to (3) are properly adjusted for the lens.

Adjusting the conditions (1) to (3) is equal to balancing the conditions (1) to (3) by, for example, securing an eccentricity tolerance while slightly sacrificing the axial or off-axis aberration of the lens.

As mentioned above, a lens according to any one of the embodiments of the present invention is an aplanat that substantially satisfies the conditions (1) and (2) to substantially zero the axial aberration and off-axis aberration of the lens and slightly imperfectly satisfy the eccentricity aberration of the lens.

When balancing the conditions (1) to (3) for a lens having a numerical aperture of 0.85, a highest ray to the first surface of the lens must have an incident angle of 57 degrees, preferably 56 degrees, more preferably 55 degrees or smaller. Balancing the conditions (1) to (3) on a lens causes little change in the shape of the lens.

To realize a lens having a numerical aperture of lower than 0.85 and substantially satisfying the conditions (1) to (3), it is necessary to make a highest ray to the first surface of the lens form an incident angle of 57 degrees, preferably 56 degrees, more preferably 55 degrees or below.

When forming a lens according to an embodiment of the present invention with the use of a metal mold, an incident angle directly relates to the difficulty of processing the metal mold. It is preferable to minimize the incident angle.

The shape of a metal mold prepared for a lens may slightly differ from the shape of a product lens formed from the metal mold because a high-temperature forming process on the metal mold shrinks the lens. It is convenient, when manufacturing a lens having a numerical aperture of lower than 0.85, to reduce an incident angle accordingly.

The present inventor designed and studied many lenses and found that an incident angle θ on the first surface of a lens having a numerical aperture lower than 0.85 has the following relationship with respect to an incident angle a of a lens having a numerical aperture of 0.85:

$$\theta = \alpha - 47.3(0.85 - NA)(\text{degrees}) \quad (9)$$

where the incident angle α is a value obtained from an actually designed lens.

Table 14 shows a relationship between numerical aperture and incident angle found on lenses made according to specifications of the below-mentioned embodiment 4. The formula (9) is a regression formula obtained from Table 14.

TABLE 14

| Numerical aperture | Incident angle (degrees) |
|---|---|
| 0.60 | 39.8765 |
| 0.65 | 43.0969 |

TABLE 14-continued

| Numerical aperture | Incident angle (degrees) |
|---|---|
| 0.70 | 46.2232 |
| 0.75 | 49.1485 |
| 0.80 | 51.6474 |
| 0.85 | 53.2516 |

Figure 24:
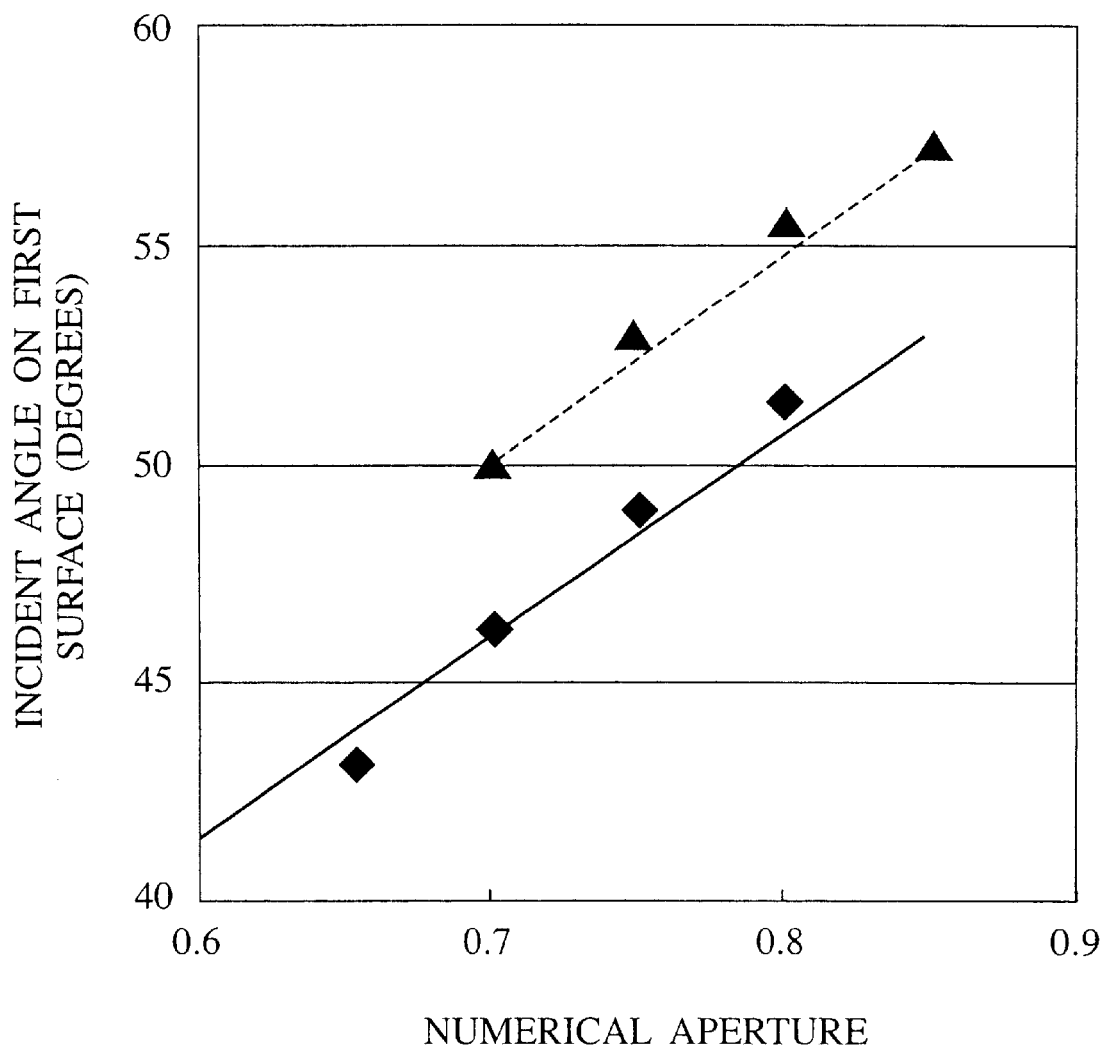
FIG. 24 is a graph showing relationships between numerical aperture and first-surface incident angle according to design values and regression formulas.

FIG. 24 is a graph showing relationships between numerical aperture and incident angle α is 53.2516. In FIG. 24, a black rhombus represents an actual design value, and a continuous line represents values calculated from the regression formula.

FIG. 24 also shows data concerning lenses having a lens thickness of 1.5 mm and a glass material refractive index of 1.75 with a black triangle representing design data and a dotted line representing values calculated from the regression formula.

In each case, the regression formula satisfactorily reflects the design values. The present inventor prepared design data for many other lenses and obtained similar results. Consequently, it is understood that the regression formula (9) has a sufficient accuracy as a general formula.

Incident angle conditions for a lens having a numerical aperture below 0.85 will be considered. As the numerical aperture of a lens decreases, an inclination of the periphery of the lens (an incident angle on the first surface of the lens) becomes gentler, to relieve the conditions (1) to (3) and expand a manufacturing tolerance.

Like the lens having a numerical aperture of 0.85, the lens having a numerical aperture below 0.85 shows an aberration increase as an incident angle on the first surface of the lens increases.

Accordingly, the lens having a numerical aperture below 0.85 may properly be designed by setting an incident angle of 57 degrees, preferably 56 degrees, more preferably 55 degrees or below, like the lens having a numerical aperture of 0.85. The lens having a numerical aperture below 0.85 has the advantages mentioned above. Accordingly, design values for the lens having a numerical aperture below 0.85 may be moderated based on the regression formula, to improve the tolerance and performance of the lens.

Namely, the lens having a numerical aperture below 0.85 may properly be formed by setting an incident angle θ on the first surface of the lens as follows:

$$\theta < \alpha - 47.3\ (0.85 - NA)\text{(degrees)} \quad (10)$$

where the angle α is 57 degrees, preferably 56 degrees, more preferably 55 degrees.

The lenses mentioned above may have a proper eccentricity tolerance but are unsatisfactory in securing chromatic aberration because they give no consideration on the conditions (4) and (5). The chromatic aberration will be explained in detail.

To satisfy the conditions (4) and (5), the thickness t along optical axis through the center of a lens and focal length f of a lens must satisfy the following condition:

$$t > (1+E)f$$

where E is a number equal to or large than 0, preferably 0, more preferably 0.1, still more preferably 0.2.

According to the condition (4), an aberration increase at the best focus of a lens must be minimized with respect to an error in each wavelength. As the thickness along optical axis through the center of a lens becomes thicker, the radius of the first surface (incident surface) of the lens becomes relatively larger. Namely, as the radius of curvature of the first surface becomes greater, a ray entering the periphery of the lens makes a smaller incident angle θ (an angle between a normal to the first surface and the ray). This results in reducing a refraction effect, which is a nonlinear phenomenon, and reducing spherical aberration with respect to a wavelength error.

As explained with reference to FIG. 7, an aberration of 0.04 λ or greater occurs when the thickness of a lens becomes thinner than the focal length of the lens. The aberration greatly increases when the lens thickness becomes thinner than 3 mm, which is 1.2 times the focal length. In addition, FIG. 8 shows that the larger the lens thickness, the better the axial chromatic aberration.

Consequently, a lens that satisfies the above-mentioned lens thickness and highest-ray incident angle on the first surface may simultaneously satisfy the conditions (1) to (3) in connection with axial aberration, off-axis aberration, and eccentricity tolerance, as well as the conditions (4) and (5) concerning wavefront aberration and chromatic aberration caused by wavelength errors.

An aspherical lens according to an embodiment of the present invention may be a lens having a rotational symmetry shape around an optical axis (coaxial optical system), or a toric lens having slightly different aspherical shapes in different directions. An incident angle of a highest ray on the toric lens must be within the above-mentioned range.

Objectives for optical disks according to other embodiments of the present invention will be explained.

In the following embodiments, an aspherical surface of a lens is expressed with the following polynomial:

$$Z = CR^2/(1+(1-(1+K)C^2R^2)^{0.5})+AR^4+BR^6+CR^8+DR^{10}+ER^{12}+FR^{14}$$

where Z is a distance from the vertex of the surface, R is a height from an optical axis, K is a conic constant, and A to F are aspherical coefficients of degrees 4 to 14. For example, A is a coefficient for $R^4$.

Embodiment 4

Figure 25:
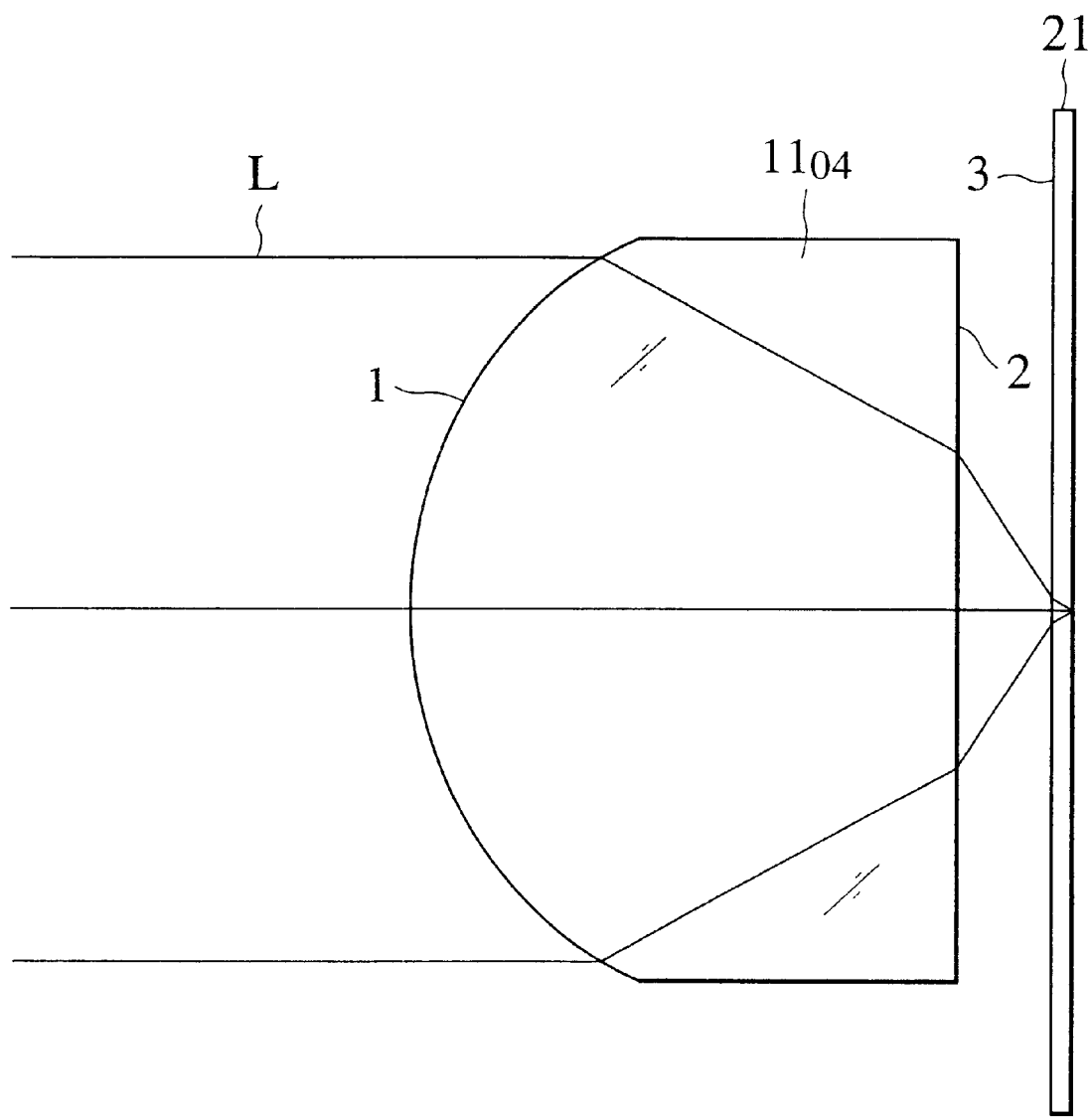
FIG. 25 is a sectional view showing an objective according to an embodiment 4 of the present invention.

FIG. 25 is a sectional view showing an objective according to the embodiment 4 of the present invention. This lens is referred to as the lens $11_{O4}$.

A light flux L enters the lens $11_{O4}$, is refracted by a first surface 1 and a second surface 2 of the lens $11_{O4}$, is transmitted through a third surface 3 and transmission layer of an optical disk 21, and is focused on a signal recording plane of the optical disk 21.

Table 15 shows the specifications of the lens $11_{O4}$.

TABLE 15

| | |
|---|---|
| Design wavelength | 405 nm |
| Numerical aperture | 0.85 |
| Focal length | 2 mm |
| Entrance pupil diameter | 3.4 mm |
| Disk thickness | 0.1 mm |
| Image magnification | 0 |

Table 16 shows design values for the lens $11_{O4}$. Units for radiuses and thicknesses are mm in Table 16 and in other tables that follow.

TABLE 16

| Surface No. | Surface shape | Radius | Thickness | Refractive Index | Conic constant |
|---|---|---|---|---|---|
| 1 | Aspheric | 1.71 | 2.75 | 1.85 | −0.9168291 |
| 2 | Aspheric | −75.9027 | 0.4605 | — | 2518.06 |
| 3 | — | Infinite | 0.1 | 1.62230752 | — |
| Image surface | — | — | — | — | — |

Table 17 shows aspherical coefficients for the first surface of the lens $11_{O4}$.

TABLE 17

| Coefficient for $R^4$ | 0.013687371 |
| Coefficient for $R^6$ | 0.00087533585 |
| Coefficient for $R^8$ | 0.00087533585 |
| Coefficient for $R^{10}$ | −0.00077467164 |
| Coefficient for $R^{12}$ | 0.00030433925 |
| Coefficient for $R^{14}$ | −5.3502493 ×10$^{-5}$ |

Table 18 shows aspherical coefficients for the second surface of the lens $11_{O4}$.

TABLE 18

| Coefficient for $R^4$ | 0.22363727 |
| Coefficient for $R^6$ | −0.58889528 |
| Coefficient for $R^8$ | 0.72567392 |
| Coefficient for $R^{10}$ | −0.47382503 |
| Coefficient for $R^{12}$ | 0.12985027 |

The incident angle of a highest ray on the first surface of the lens $11_{O4}$ is 53.25 degrees. The lens $11_{O4}$ is an aplanat that substantially satisfies the conditions (1) and (2) and leaves little error in the condition (3).

The lens $11_{O4}$ involves an axial wavefront aberration of 0.002 λ, which is very small and is substantially zero in practical use. The lens shows a wavefront aberration of 0.023 λ for an incident ray of 0.5 degrees in off-axis angle. This value is satisfactory. With respect to a surface-to-surface eccentricity of 3 μm, the lens shows a wavefront aberration of 0.036 λ. This aberration concerning the surface-to-surface eccentricity is critical when manufacturing the lens, and the aberration demonstrated by the lens $11_{O4}$ is satisfactorily small.

Figure 26:
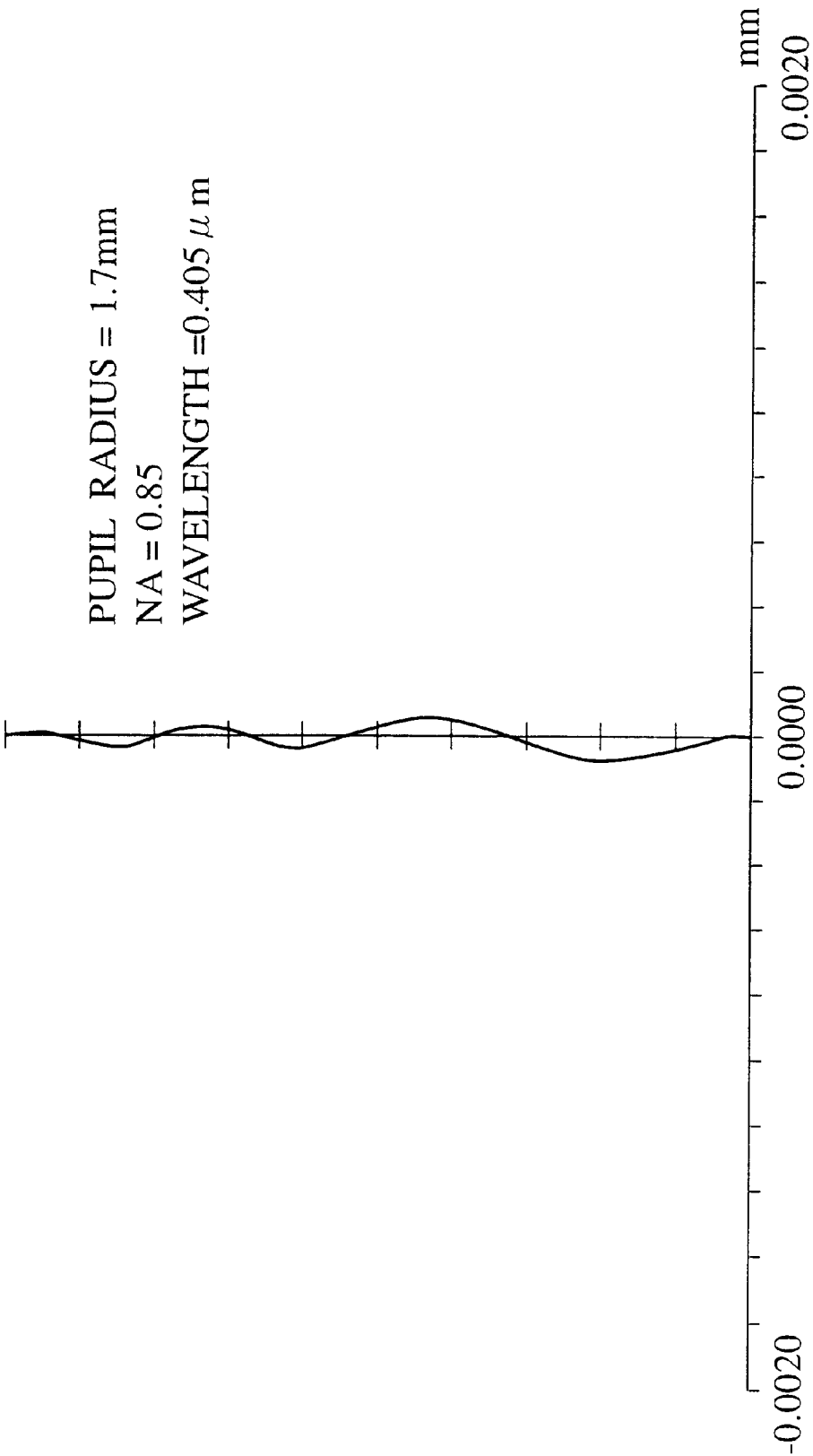
FIG. 26 is a graph showing a longitudinal aberration of the objective of the embodiment 4.
Figure 27:
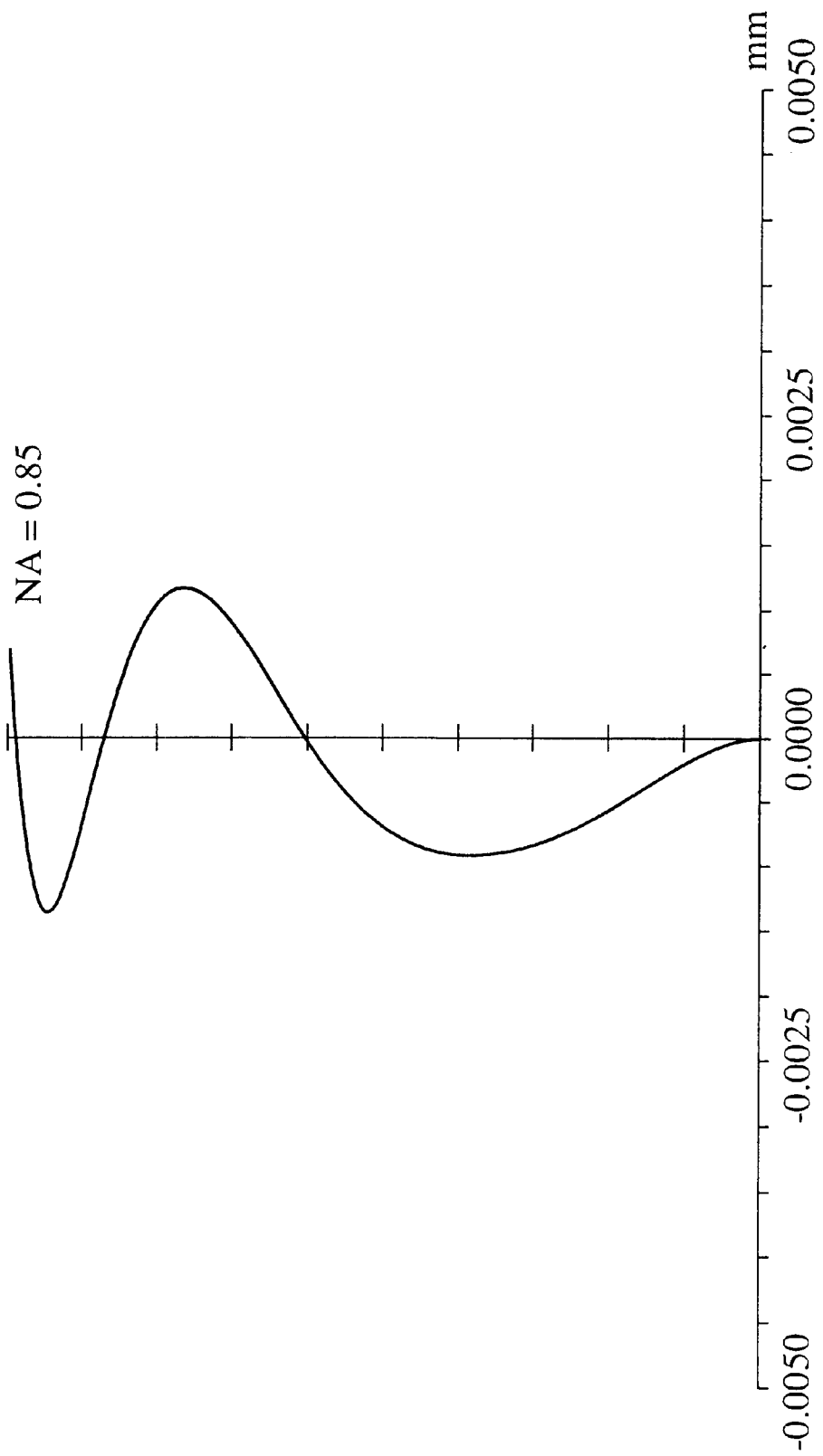
FIG. 27 is a graph showing an offense against the sine condition of the objective of the embodiment 4.
Figure 28:
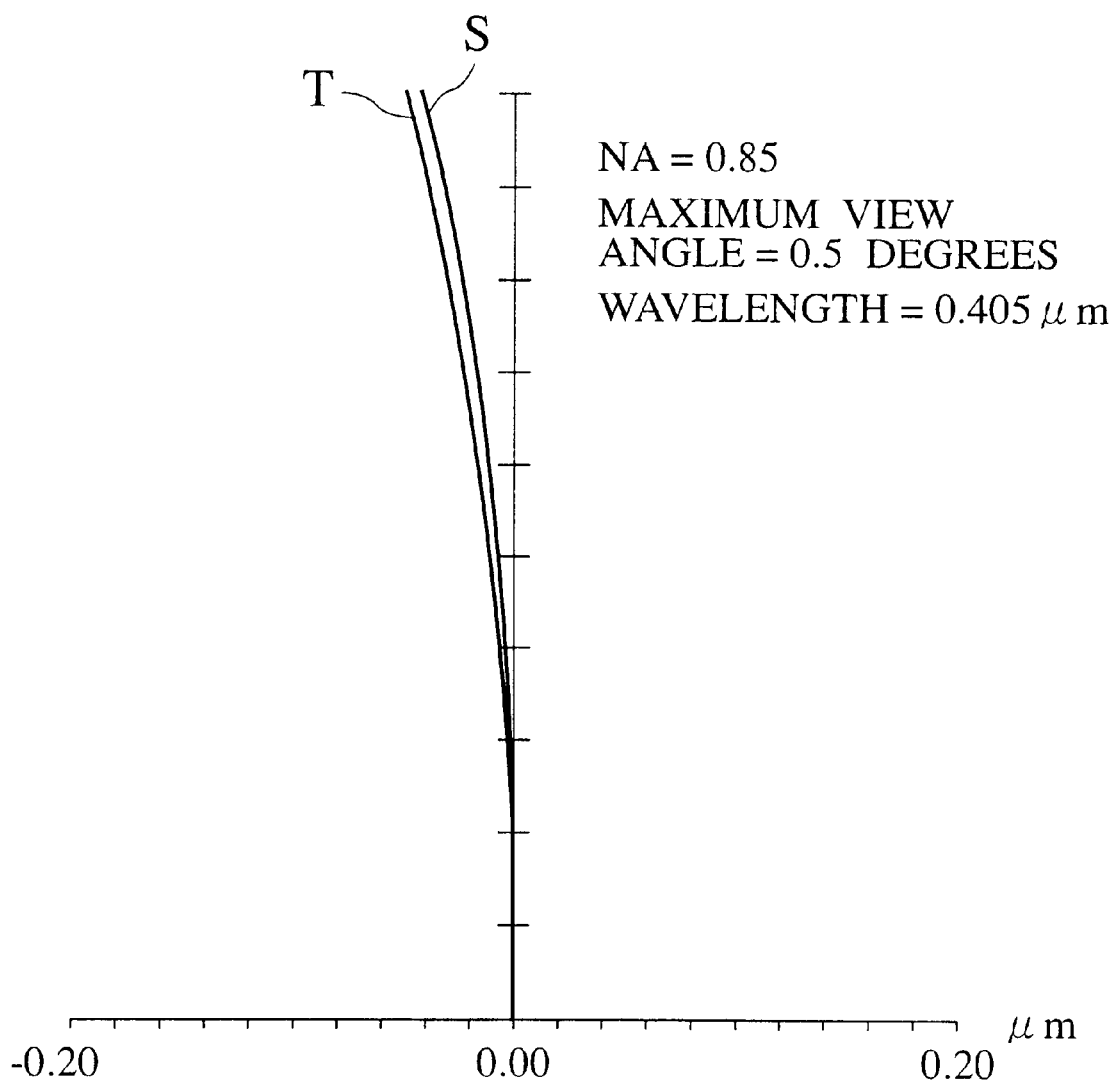
FIG. 28 is a graph showing an astigmatism of the objective of the embodiment 4.

FIG. 26 is a graph showing a longitudinal aberration of the lens $11_{O4}$, FIG. 27 is a graph showing an offense against the sine condition of the lens $11_{O4}$, and FIG. 28 is a graph showing an astigmatism of the lens $11_{O4}$.

The thickness of the lens $11_{O4}$ is 1.375 times the focal length thereof. The lens $11_{O4}$ is made of glass material having a fixed refractive index. A wavelength change of 5 nm may change the refractive index to 1.8486, to cause an aberration of 0.01 λ on a best image plane. This aberration is small. An axial chromatic aberration is 2.17 μm, which is also small.

Embodiment 5

Figure 29:
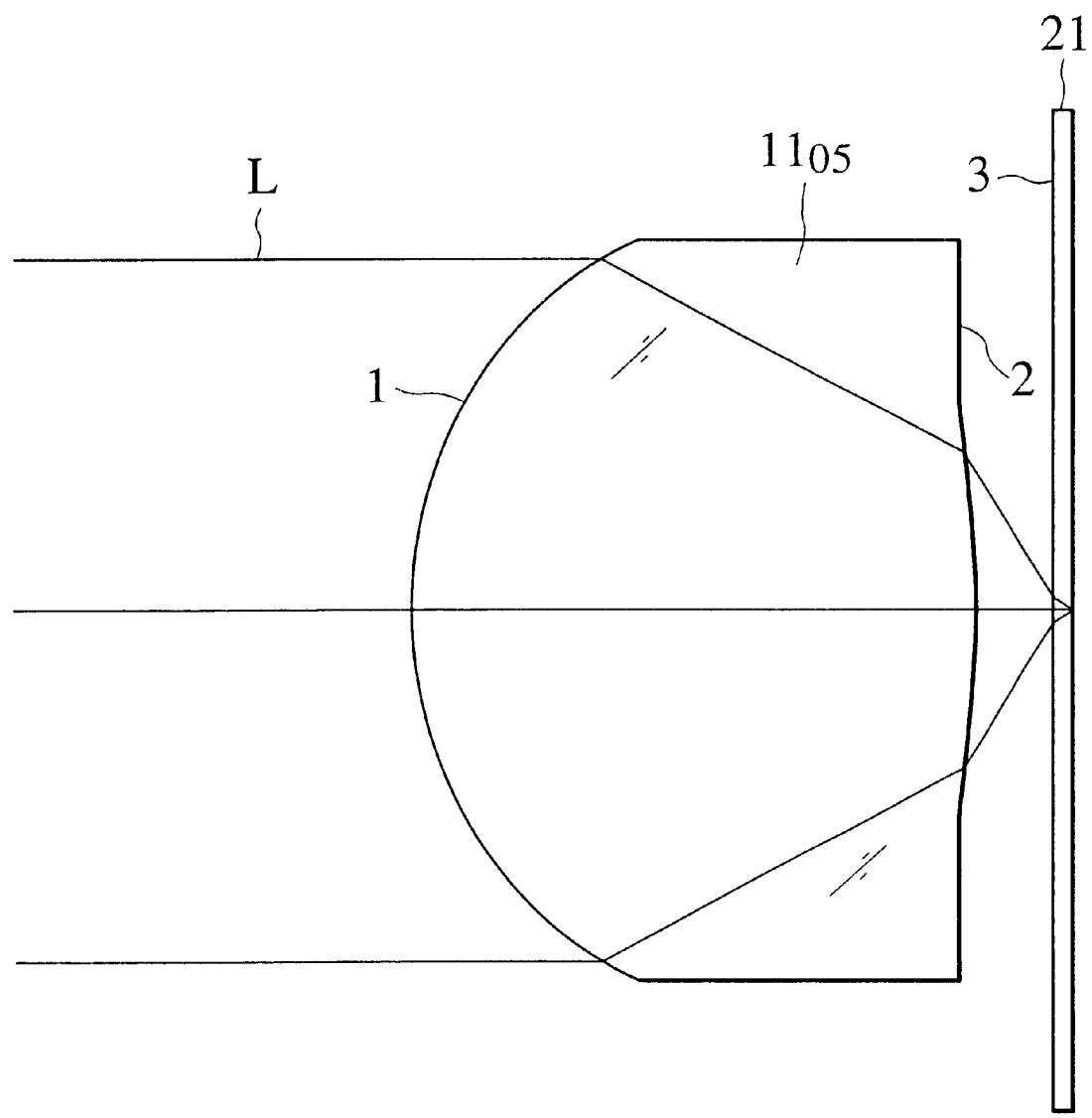
FIG. 29 is a sectional view showing an objective according to an embodiment 5 of the present invention.

FIG. 29 is a sectional view showing an objective according to the embodiment 5 of the present invention. This lens is referred to as the lens $11_{O5}$.

A light flux L enters the lens $11_{O5}$, is refracted by a first surface 1 and a second surface 2 of the lens $11_{O5}$, is transmitted through a third surface 3 and transmission layer of an optical disk 21, and is focused on a signal recording plane of the optical disk 21.

Table 19 shows specifications of the lens $11_{O5}$.

TABLE 19

| Design wavelength | 405 nm |
| Numerical aperture | 0.8 |
| Focal length | 1.750 mm |
| Entrance pupil diameter | 2.8 mm |
| Image magnification | 0 |

Table 20 shows design values for the lens $11_{O5}$.

TABLE 20

| Surface No. | Surface shape | Radius | Thickness | Refractive Index | Conic constant |
|---|---|---|---|---|---|
| 1 | Aspheric | 1.45 | 2.5 | 1.75 | −0.9753354 |
| 2 | Aspheric | −3.613636 | 0.395 | — | — |
| 3 | — | Infinite | 0.1 | 1.62230752 | −188.2991 |
| Image surface | — | — | — | — | — |

Table 21 shows aspherical coefficients for the first surface of the lens $11_{O5}$.

TABLE 21

| Coefficient for $R^4$ | 0.023305393 |
| Coefficient for $R^6$ | 0.017039056 |
| Coefficient for $R^8$ | 0.0023431785 |
| Coefficient for $R^{10}$ | −0.0023798936 |
| Coefficient for $R^{12}$ | 0.0013373117 |
| Coefficient for $R^{14}$ | −0.00035090993 |

Table 22 shows aspherical coefficients for the second surface of the lens $11_{O5}$.

TABLE 22

| Coefficient for $R^4$ | 0.17601287 |
| Coefficient for $R^6$ | −0.54949768 |
| Coefficient for $R^8$ | 0.50420582 |
| Coefficient for $R^{10}$ | 0.12942116 |
| Coefficient for $R^{12}$ | −0.37309714 |

The incident angle of a highest ray on the first surface of the lens $11_{O5}$ is 51.41 degrees. This angle satisfies the condition (9) that specifies 52.63 degrees for a numerical aperture of 0.8.

The lens $11_{O5}$ is an aplanat that substantially satisfies the conditions (1) and (2) and leaves little error in the condition (3). The lens $11_{O5}$ involves an axial wavefront aberration of 0.001 λ, which is very small and is substantially zero in practical use.

The lens $11_{O5}$ shows a wavefront aberration of 0.013 λ for an incident ray of 0.5 degrees in off-axis angle. This value is satisfactory. With respect to a surface-to-surface eccentricity of 3 μm, the lens shows a wavefront aberration of 0.023 λ. This aberration concerning the surface-to-surface eccentricity is critical when manufacturing the lens, and the aberration demonstrated by the lens $11_{O2}$ is satisfactorily small.

Figure 30:
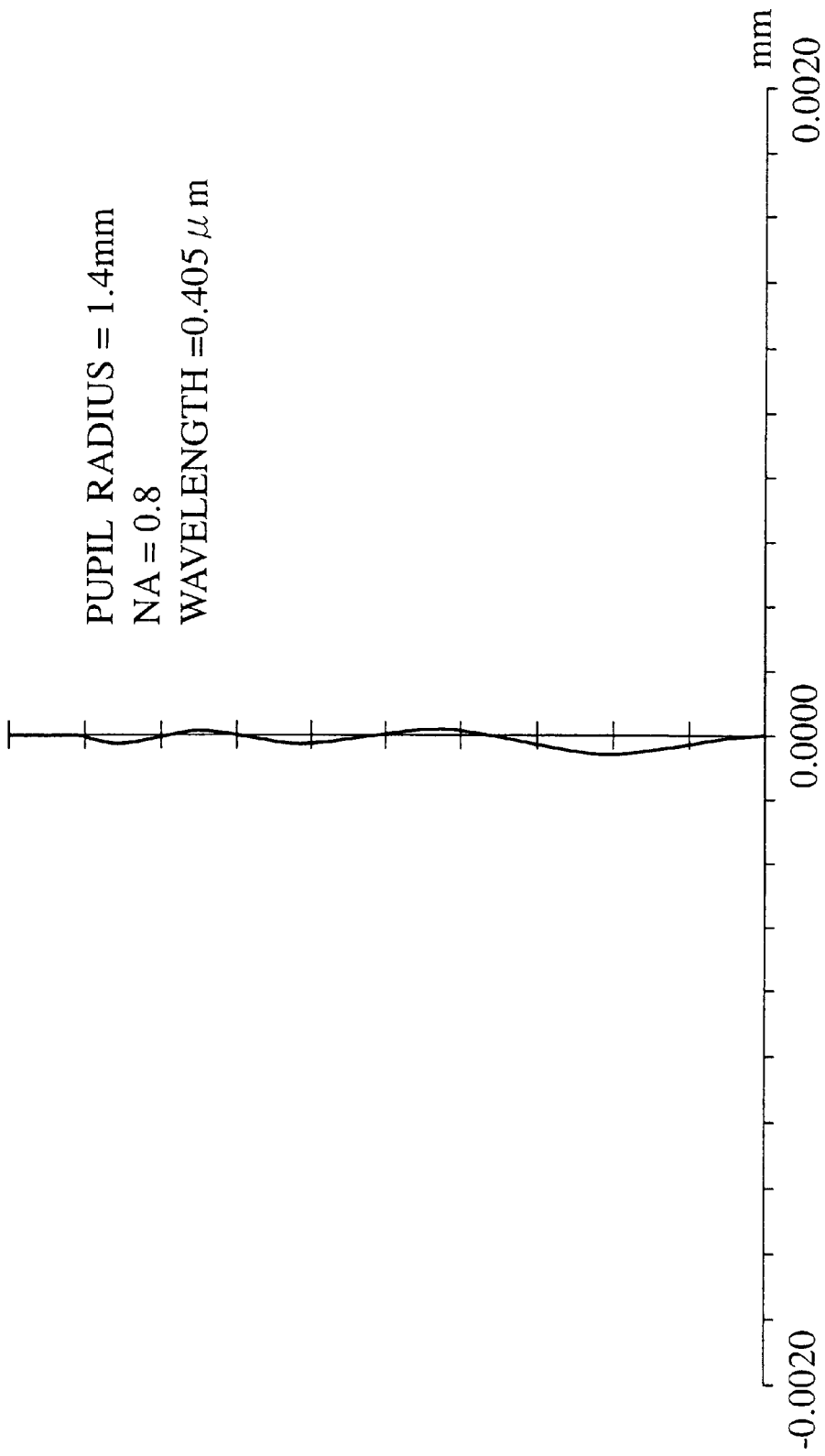
FIG. 30 is a graph showing a longitudinal aberration of the objective of the embodiment 5.
Figure 31:
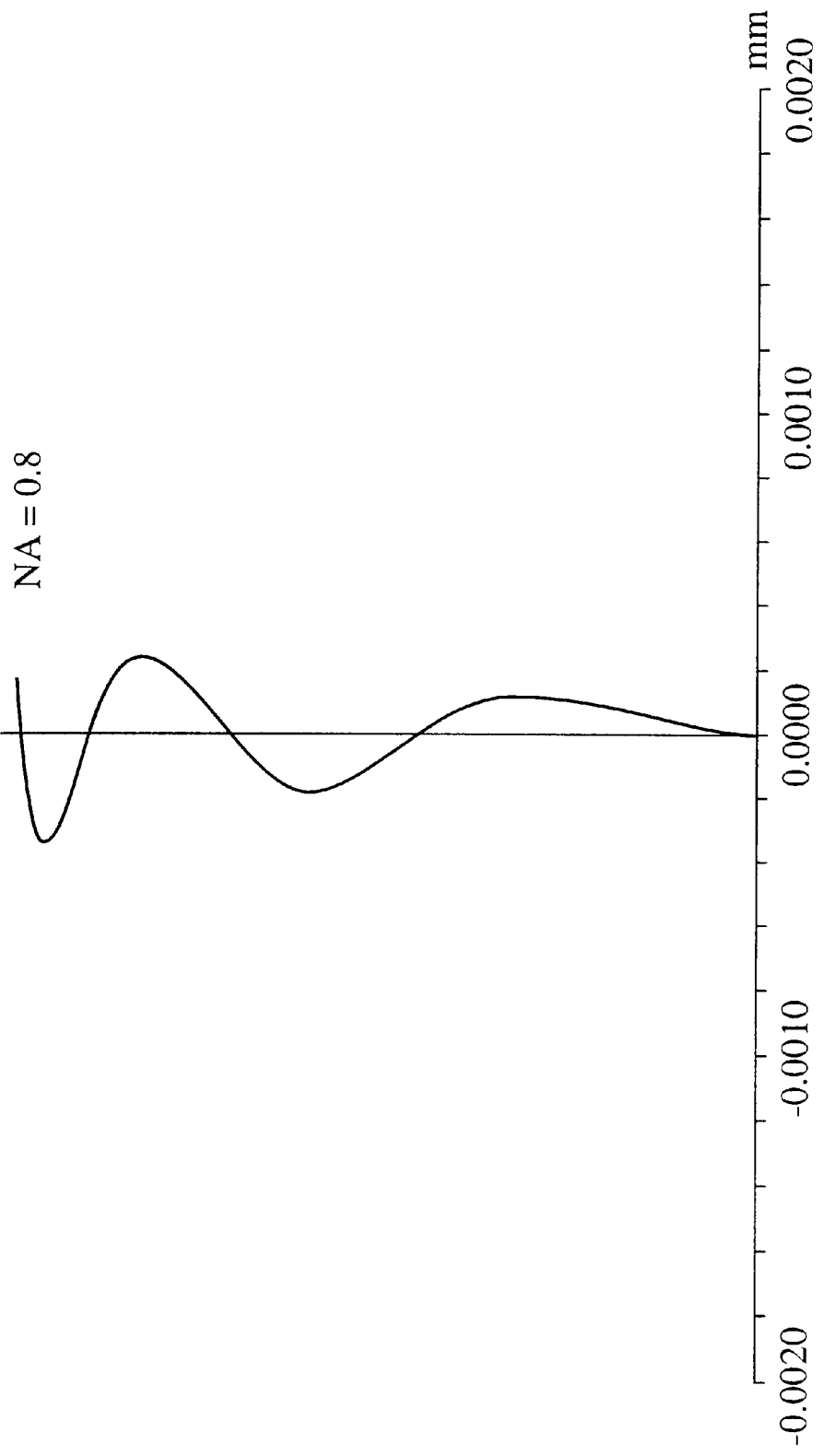
FIG. 31 is a graph showing an offense against the sine condition of the objective of the embodiment 5.
Figure 32:
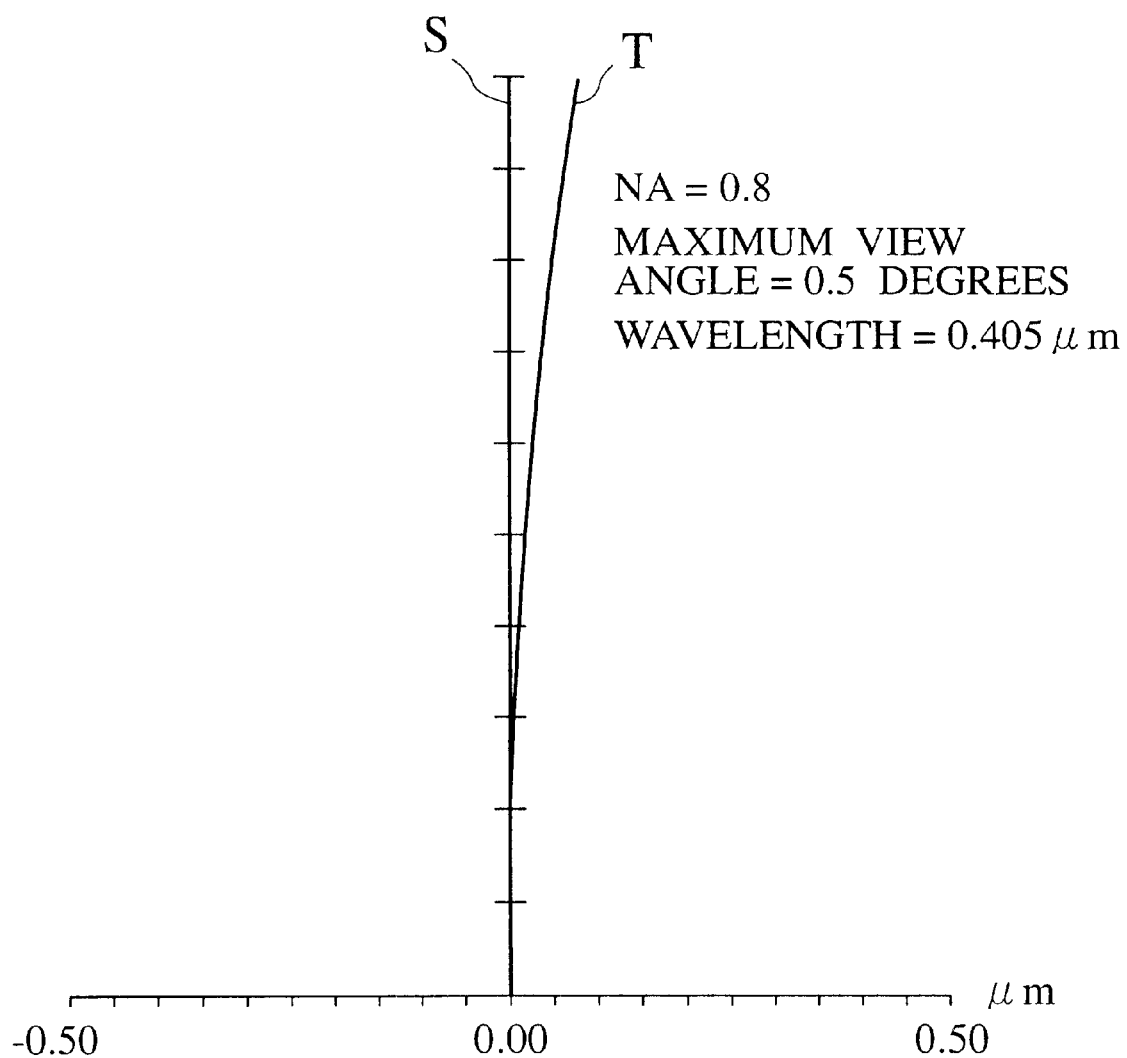
FIG. 32 is a graph showing an astigmatism of the objective of the embodiment 5.

FIG. 30 is a graph showing a longitudinal aberration of the lens $11_{O5}$, FIG. 31 is a graph showing an offense against the sine condition of the lens $11_{O5}$, and FIG. 32 is a graph showing an astigmatism of the lens $11_{O5}$.

The thickness of the lens $11_{05}$ is 1.429 times the focal length thereof. The lens $11_{05}$ is made of glass material having a fixed refractive index. A wavelength change of 5 nm may change the refractive index to 1.7486, to cause an aberration of 0.01 λ on a best image plane. This aberration is small. An axial chromatic aberration is 2.10 μm, which is also small.

Embodiment 6

Figure 33:
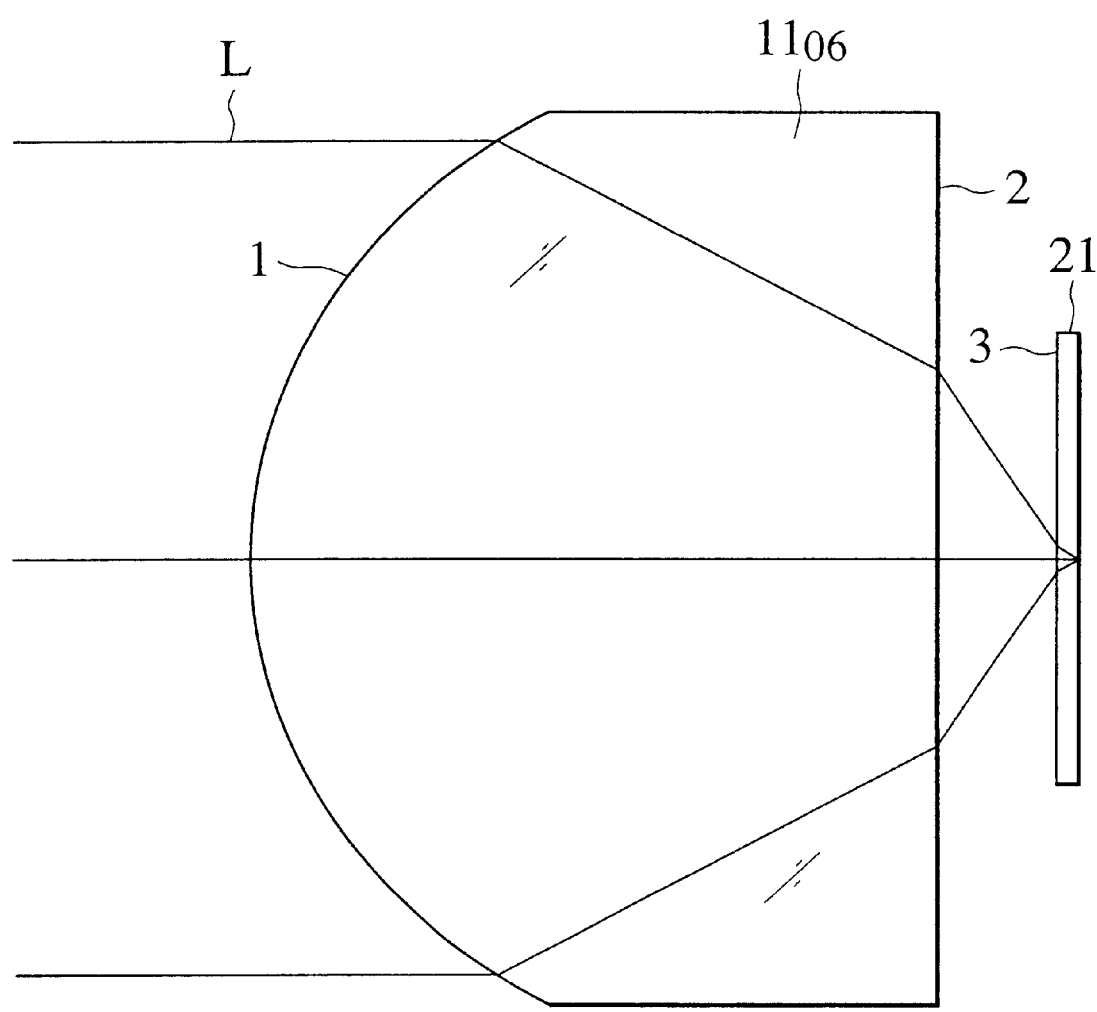
FIG. 33 is a sectional view showing an objective according to an embodiment 6 of the present invention.

FIG. 33 is a sectional view showing an objective according to the embodiment 6 of the present invention. This lens is referred to as the lens $11_{06}$. A light flux L enters the lens $11_{06}$, is refracted by a first surface 1 and a second surface 2 of the lens $11_{06}$, is transmitted through a third surface 3 and transmission layer of an optical disk 21, and is focused on a signal recording plane of the optical disk 21.

Table 23 shows specifications of the lens $11_{06}$.

TABLE 23

| Design wavelength | 405 nm |
|---|---|
| Numerical aperture | 0.85 |
| Focal length | 2.2 mm |
| Entrance pupil diameter | 3.74 mm |
| Disk thickness | 0.1 mm |
| Image magnification | 0 |

Table 24 shows design values for the lens $11_{06}$.

TABLE 24

| Surface No. | Surface shape | Radius | Thickness | Glass material | Conic constant |
|---|---|---|---|---|---|
| 1 | Aspheric | 1.812171 | 3.104 | NBF1 | −0.3371789 |
| 2 | Aspheric | −6.507584 | 0.500289 | — | −845.6516 |
| 3 | — | Infinite | 0.1 | Polycarbonate | — |
| 4 | Image surface | — | — | — | — |

Table 25 shows aspherical coefficients for the first surface of the lens $11_{06}$.

TABLE 25

| Coefficient for $R^4$ | −0.00092006967 |
|---|---|
| Coefficient for $R^6$ | −0.00025706693 |
| Coefficient for $R^8$ | −0.00057872391 |
| Coefficient for $R^{10}$ | 0.0002222827 |
| Coefficient for $R^{12}$ | −5.6787923 × $10^{-5}$ |

Table 26 shows aspherical coefficients for the second surface of the lens $11_{06}$.

TABLE 26

| Coefficient for $R^4$ | 0.061448774 |
|---|---|
| Coefficient for $R^6$ | −0.13995629 |
| Coefficient for $R^8$ | 0.12867014 |
| Coefficient for $R^{10}$ | −0.043733069 |

Table 27 shows refractive indexes of the glass materials.

TABLE 27

| NBF1 | 1.76775590 |
|---|---|
| Polycarbonate | 1.62031432 |

The incident angle of a highest ray on the first surface of the lens $11_{06}$ is 55.0 degrees.

The lens $11_{06}$ is approximately an aplanat that substantially satisfies the condition (1), is slightly unsatisfactory for the condition (2) so that the lens $11_{06}$ may suppress eccentricity aberration more than the lens $11_{04}$, and leaves little error in the condition (3).

The lens $11_{06}$ involves an axial wavefront aberration of 0.006 λ, which is very small and is substantially zero in practical use. The lens shows a wavefront aberration of 0.069 λ for an incident ray of 0.5 degrees in off-axis angle. This value is satisfactory. With respect to a surface-to-surface eccentricity of 5 μm, the lens shows a wavefront aberration of 0.034 λ. This aberration concerning the surface-to-surface eccentricity is critical when manufacturing the lens, and the aberration demonstrated by the lens $11_{06}$ is satisfactorily small.

Figure 34:
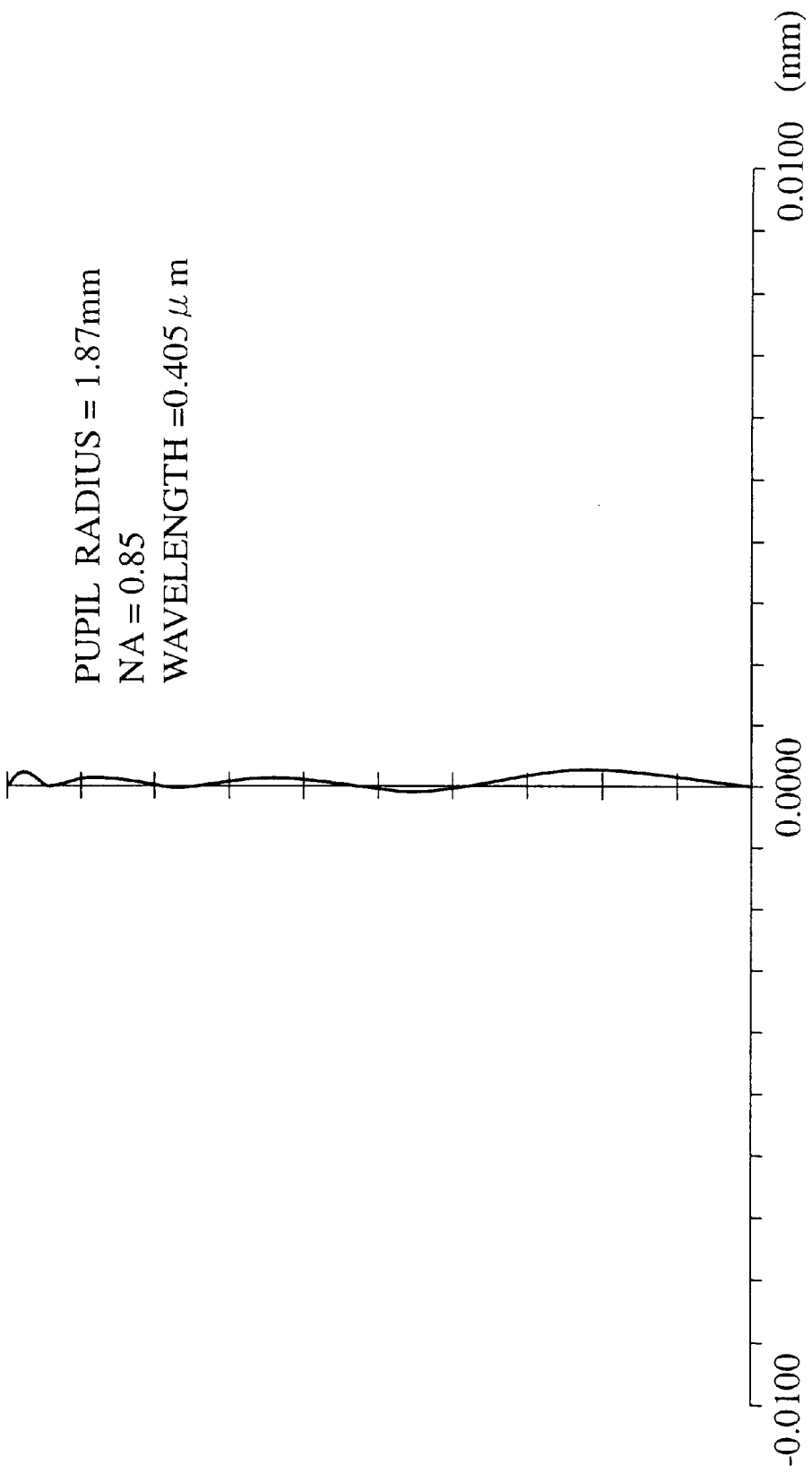
FIG. 34 is a graph showing a longitudinal aberration of the objective of the embodiment 6.
Figure 35:
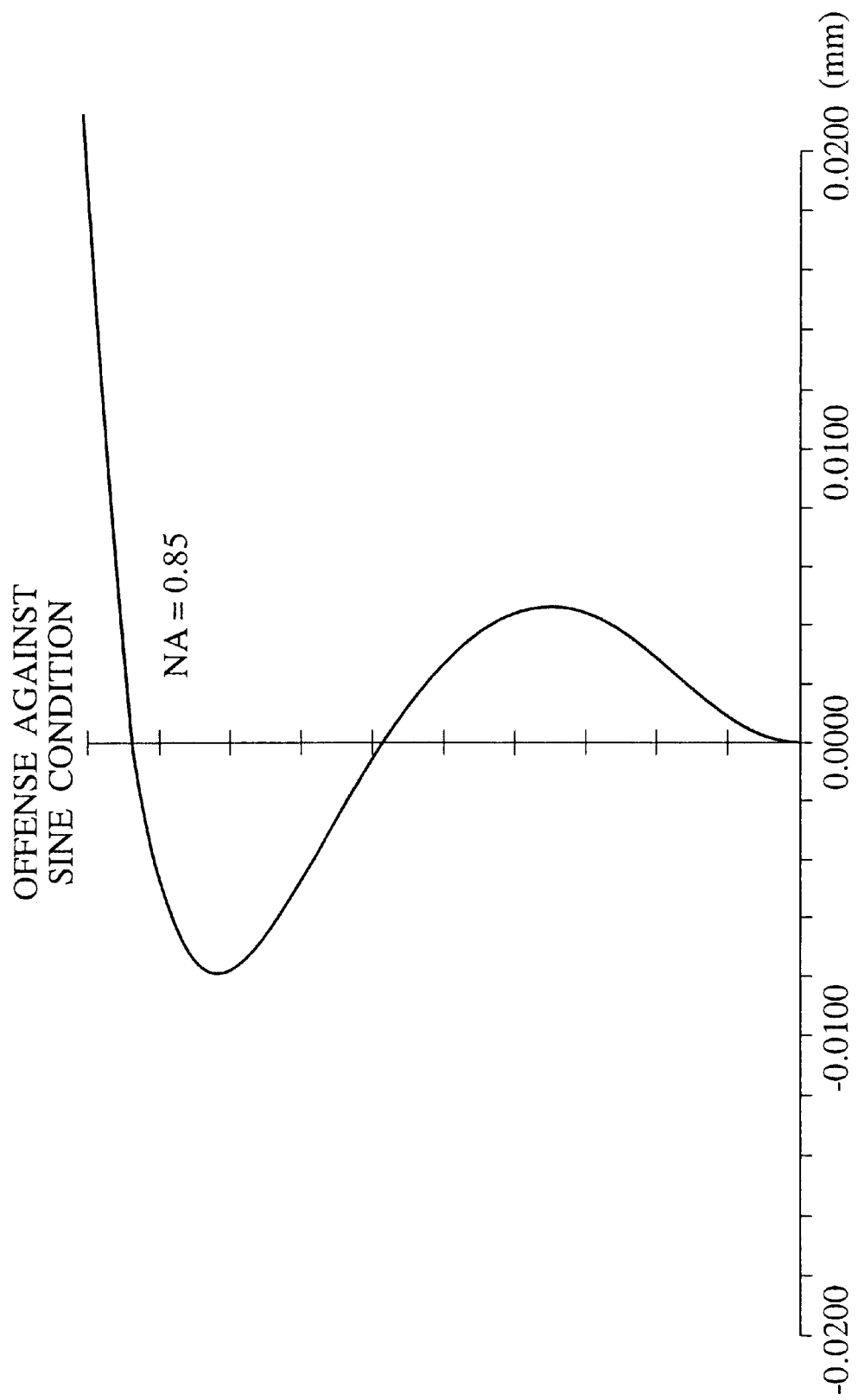
FIG. 35 is a graph showing an offense against the sine condition of the objective of the embodiment 6.
Figure 36:
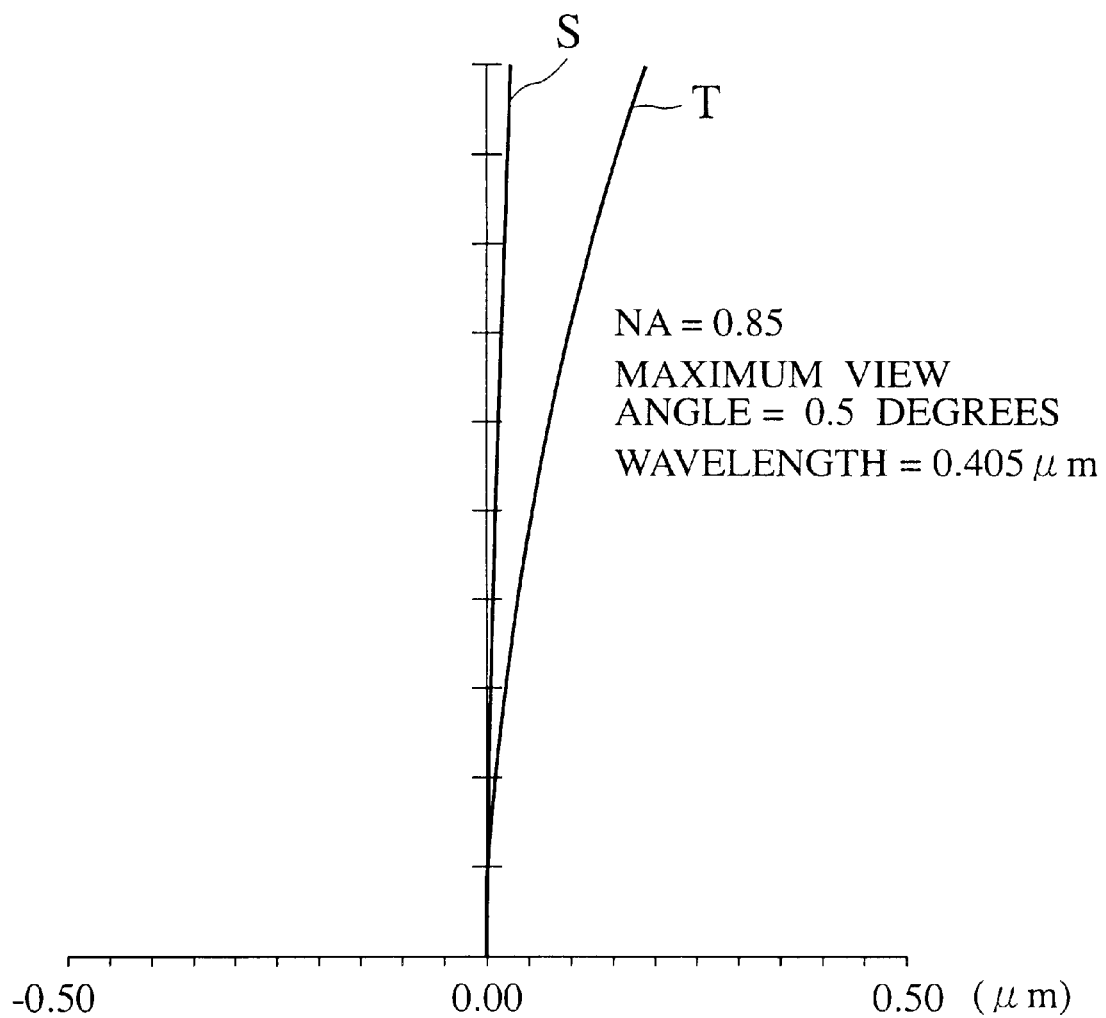
FIG. 36 is a graph showing an astigmatism of the objective of the embodiment 6.

FIG. 34 is a graph showing a longitudinal aberration of the lens $11_{06}$, FIG. 35 is a graph showing an offense against the sine condition of the lens $11_{06}$, and FIG. 36 is a graph showing an astigmatism of the lens $11_{06}$.

The thickness of the lens $11_{06}$ is 1.411 times the focal length thereof. A wavelength change of 5 nm to 410 nm may cause an aberration of 0.029 λ on a best image plane. This aberration is small. An axial chromatic aberration is 2.21 μm, which is also small.

Embodiment 7

Figure 37:
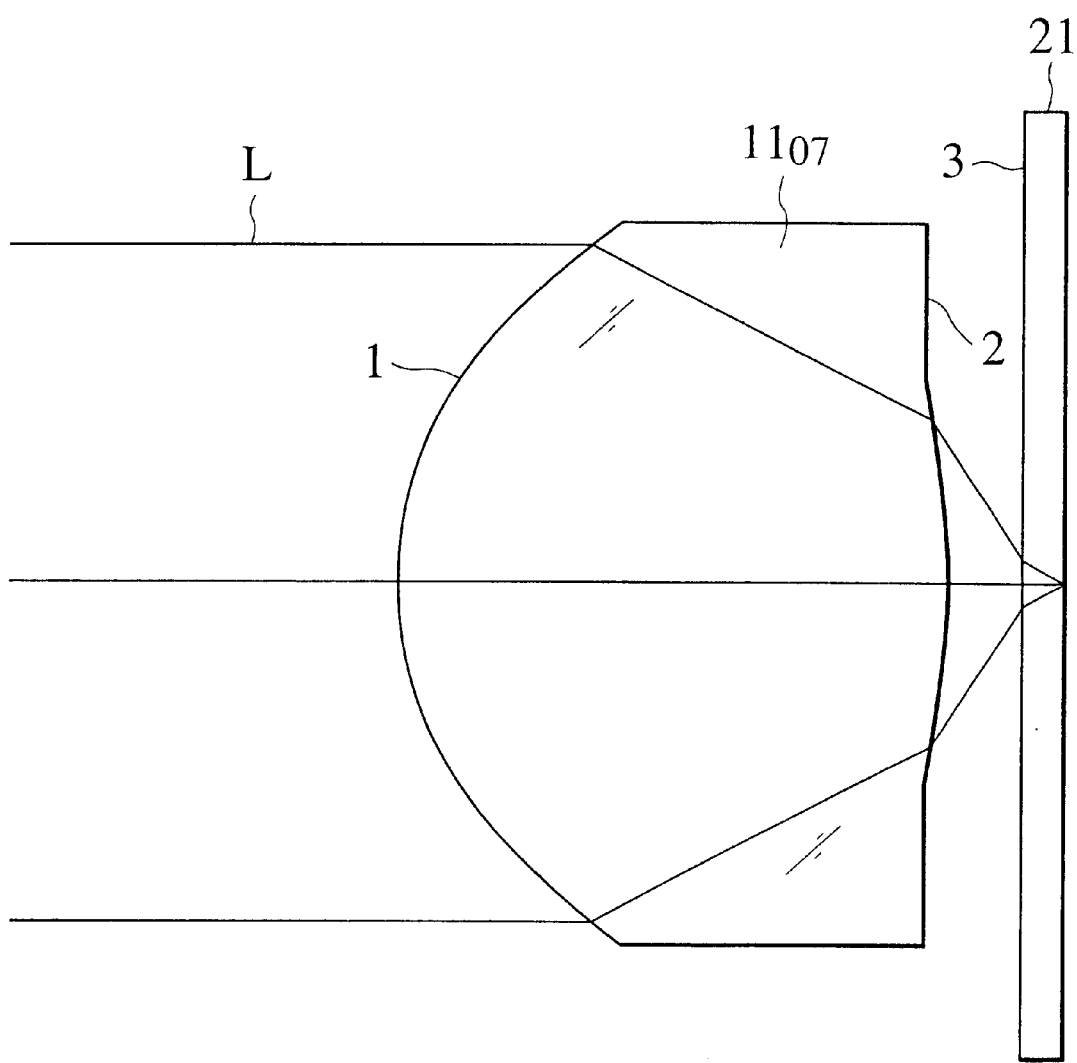
FIG. 37 is a sectional view showing an objective according to an embodiment 7 of the present invention.

FIG. 37 is a sectional view showing an objective according to the embodiment 7 of the present invention. This lens is referred to as the lens $11_{07}$.

A light flux L enters the lens $11_{07}$, is refracted by a first surface 1 and a second surface 2 of the lens $11_{07}$, is transmitted through a third surface 3 and transmission layer of an optical disk 21, and is focused on a signal recording plane of the optical disk 21.

Table 28 shows specifications of the lens $11_{07}$.

TABLE 28

| Wavelength to use | 0.405 mm |
|---|---|
| Numerical aperture | 0.85 |
| Focal length | 0.88 mm |
| Entrance pupil diameter | 1.496 mm |
| Disk thickness | 0.1 mm |
| Image magnification | 0 |

Table 29 shows design values for the lens $11_{07}$.

TABLE 29

| Surface No. | Surface shape | Radius | Thickness | Refractive Index | Conic constant |
|---|---|---|---|---|---|
| 1 | Aspheric | 0.73 | 1.26 | 1.750 | −0.9974081 |
| 2 | Aspheric | −1.791429 | 0.173565 | 1 | −189.377 |
| 3 | — | Infinite | 0.1 | 1.62230752 | — |
| Image surface | — | — | — | — | — |

Table 30 shows aspherical coefficients for the first surface of the lens $11_{07}$.

TABLE 30

| Coefficient for $R^4$ | 0.19868545 |
|---|---|
| Coefficient for $R^6$ | −0.0061548457 |
| Coefficient for $R^8$ | 0.80023321 |
| Coefficient for $R^{10}$ | −2.8911336 |
| Coefficient for $R^{12}$ | 5.5467879 |
| Coefficient for $R^{14}$ | −4.4427687 |

Table 31 shows aspherical coefficients for the second surface of the lens $11_{07}$.

TABLE 31

| Coefficient for $R^4$ | 1.5351846 |
|---|---|
| Coefficient for $R^6$ | −14.829258 |
| Coefficient for $R^8$ | 33.428793 |
| Coefficient for $R^{10}$ | 126.25085 |
| Coefficient for $R^{12}$ | −558.31863 |

According to the lens specifications, a recommended value for R1, or a value for A of the formula (7) is calculated as 0.734 mm. From this recommended value, the design value deviates by 0.5%.

The lens $11_{07}$ is an aplanat that substantially satisfies the conditions (1) and (2) and leaves little error in the condition (3).

The lens $11_{07}$ involves an axial wavefront aberration of 0.002 λ, which is very small and is substantially zero in practical use. The lens shows a wavefront aberration of 0.008 λ for an incident ray of 0.5 degrees in off-axis angle. This value is satisfactory. With respect to a surface-to-surface eccentricity of 3 μm, the lens shows a wavefront aberration of 0.037 λ. This aberration concerning the surface-to-surface eccentricity is critical when manufacturing the lens, and the aberration demonstrated by the lens $11_{07}$ is satisfactorily small.

A highest ray to the lens $11_{07}$, forms an angle u1' in the lens, and this angle provides sin(u1')=0.45. A recommended value for sin(u1') calculated from the lens specifications, i.e., K of the formula (8) is 0.4367. From this recommended value, the design value deviates by 3.0%.

Figure 38:
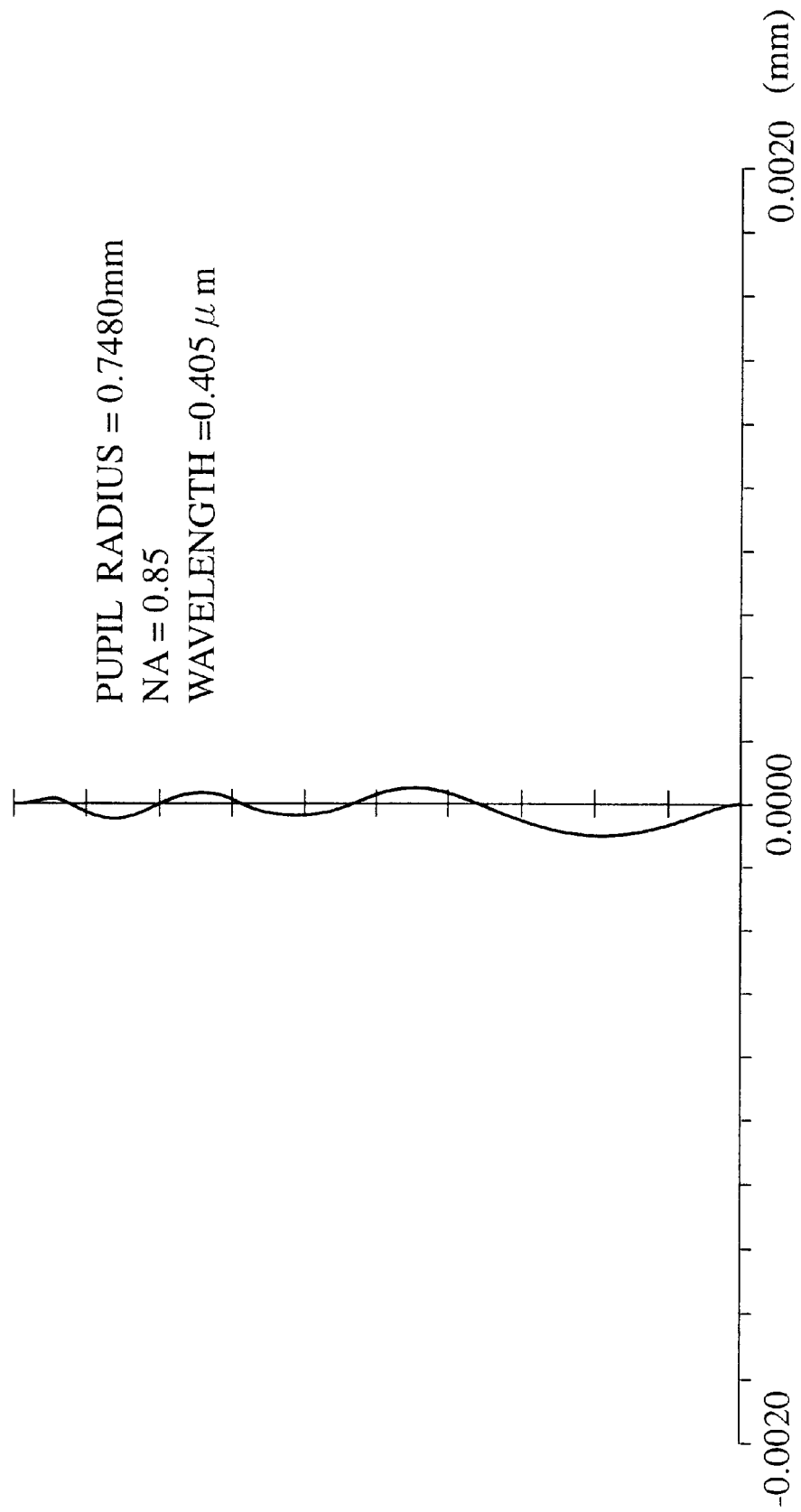
FIG. 38 is a graph showing a longitudinal aberration of the objective of the embodiment 7.
Figure 39:
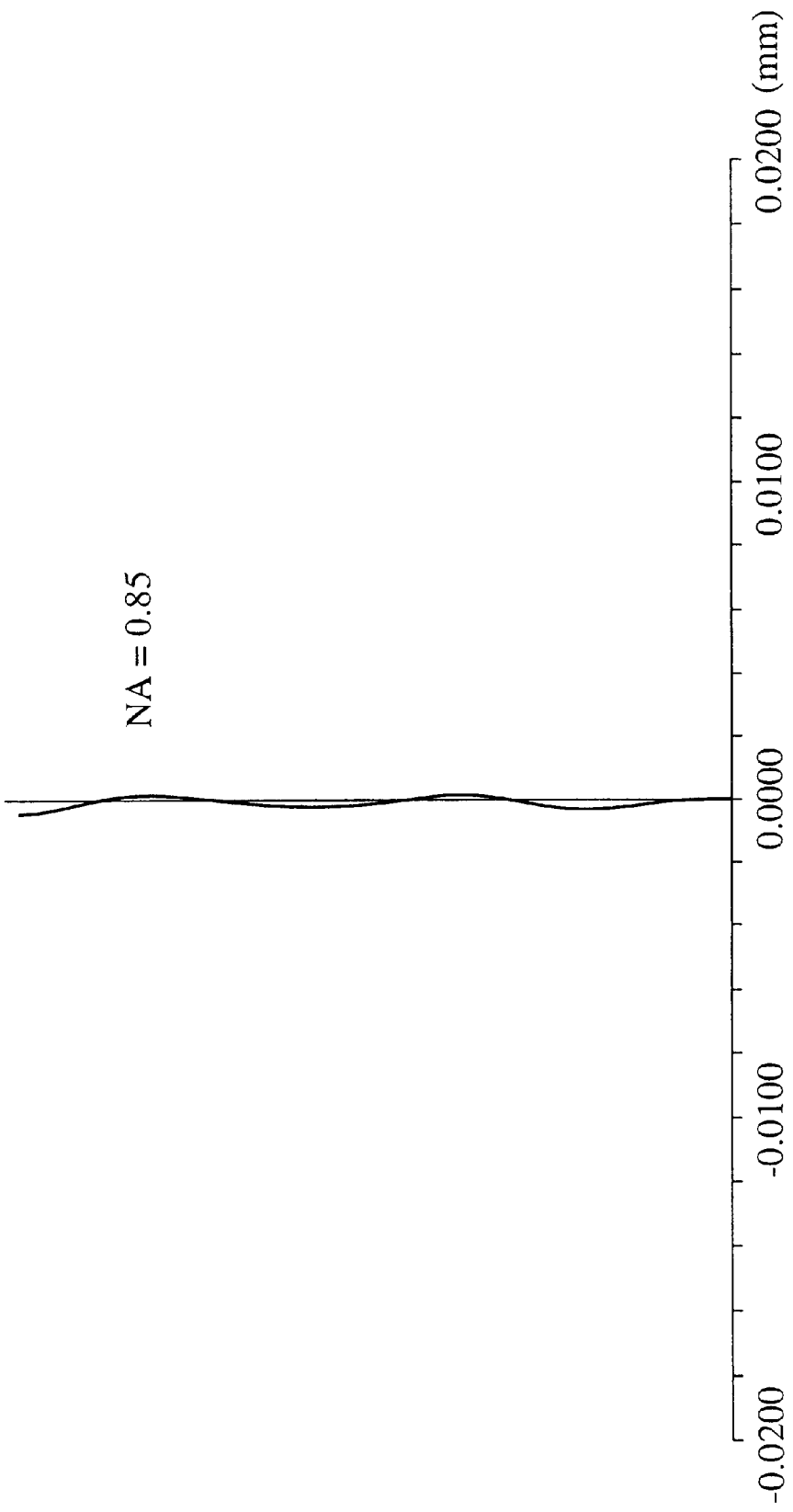
FIG. 39 is a graph showing an offense against the sine condition of the objective of the embodiment 7.
Figure 40:
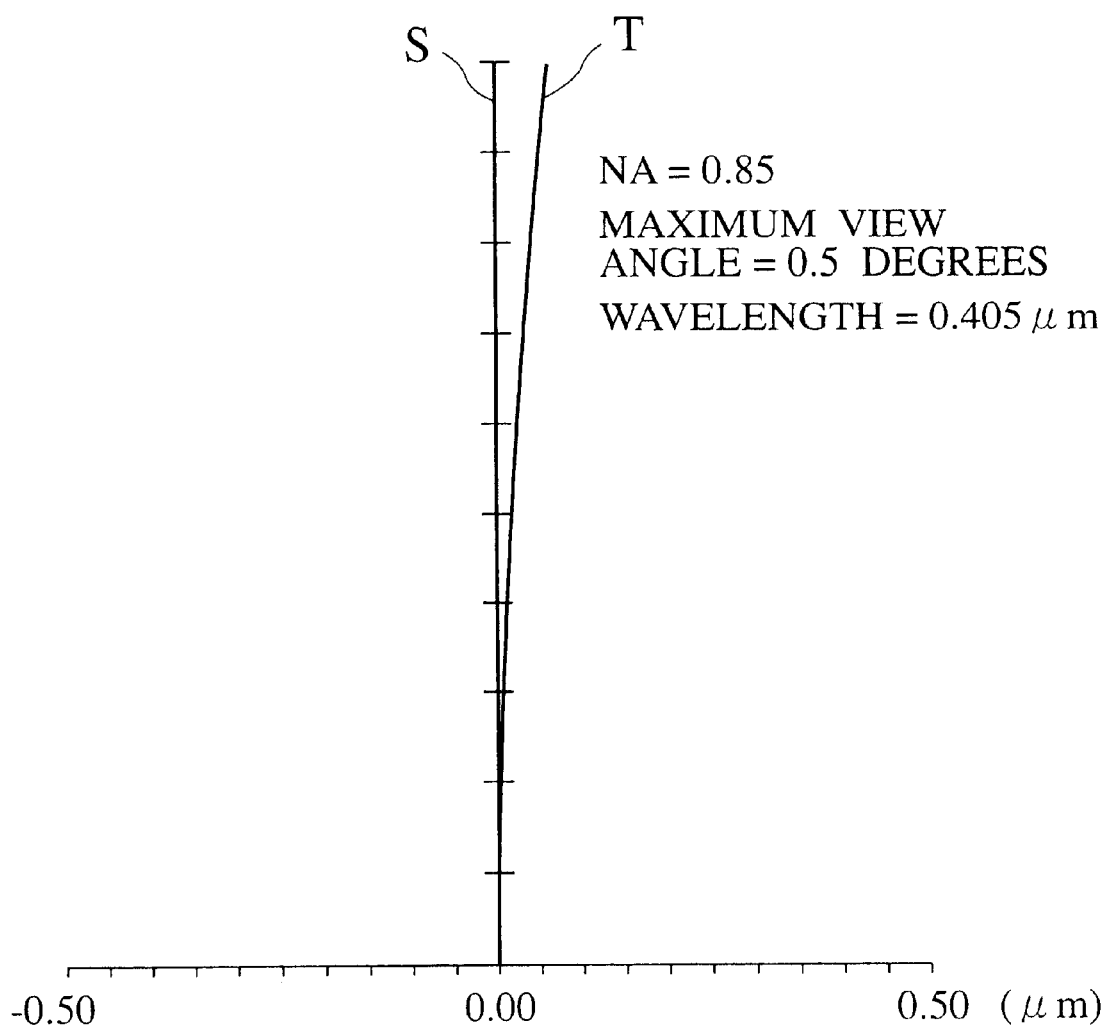
FIG. 40 is a graph showing an astigmatism of the objective of the embodiment 7.

FIG. 38 is a graph showing a longitudinal aberration of the lens $11_{07}$, FIG. 39 is a graph showing an offense against the sine condition of the lens $11_{07}$, and FIG. 40 is a graph showing an astigmatism of the lens $11_{07}$.

A working distance of the lens $11_{07}$ is 0.1735 mm, which is sufficiently larger than a preferable working distance of 0.125 mm for a disk of 25 mm radius.

Embodiment 8

Figure 41:
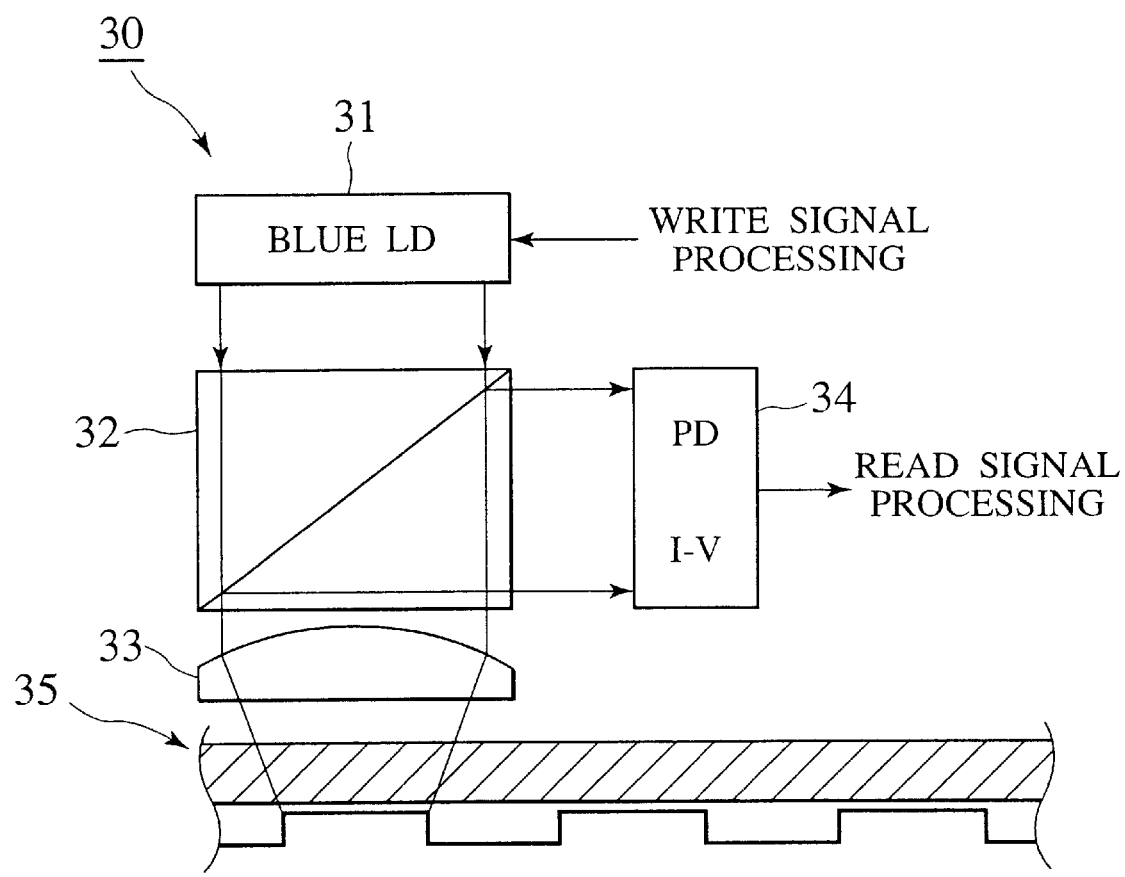
FIG. 41 shows an optical pickup according to an embodiment 8 of the present invention.

FIG. 41 shows an optical pickup according to the embodiment 8 of the present invention. The optical pickup 30 includes a blue laser diode (LD) 31 serving as a laser source, a beam splitter 32, an objective 33, and a photodetector (PD) and current-voltage converter (I-V) 34.

The blue LD 31 emits a blue laser beam of, for example, about 405 nm in wavelength. The beam splitter 32 separates the beam traveling from the blue LD 32 to an optical disk 35 from a beam traveling from the optical disk 35 to the PD and I-V 34. The objective 33 is any one of the lenses of the above embodiments. The PD and I-V 34 converts incident light into a current and into a voltage.

The optical pickup 30 is capable of writing signals (information) to the optical disk 35. Namely, the blue LD 31 emits a blue beam modulated by a write signal. The modulated blue beam is passed through the beam splitter 32 and objective 33 and is focused on the optical disk 35. On the optical disk 35, the information is written to a recording plane according to the intensity of the blue beam from the optical pickup 30. For example, the information is recorded as pits or phase changes in lands or grooves on the optical disk 35.

The optical pickup 30 is also capable of reading a signal from the optical disk 35. Namely, the blue LD 31 emits a beam of predetermined intensity. The beam is passed through the beam splitter 32 and objective 33 and is focused on the recording plane of the optical disk 35, which reflects the beam. The reflected beam from the optical disk 35 is passed through the objective 33 and beam splitter 32 and is received by the PD and I-V 34, which converts the received beam into a voltage. In this way, a signal recorded as a pit in a land or groove on the recording plane of the optical disk 35 is provided as a voltage.

Embodiment 9

Figure 42:
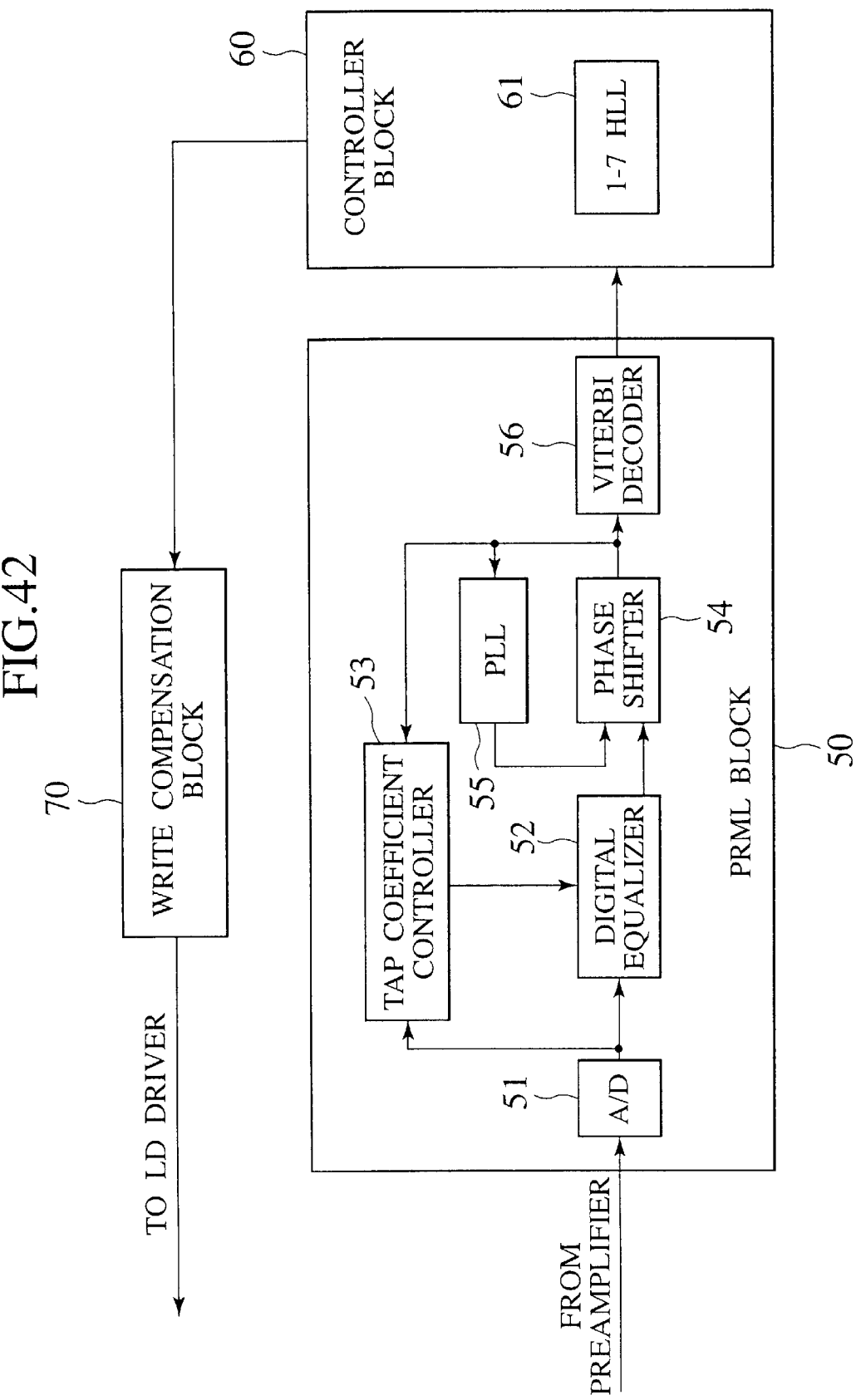
FIG. 42 is a block diagram showing an optical disk writer-reader or an optical disk reader according to an embodiment 9 of the present invention.

FIG. 42 is a block diagram showing an optical disk writer-reader or an optical disk reader according to the embodiment 9 of the present invention.

The optical disk writer-reader includes a PRML (partial response maximum likelihood) block 50, a controller block 60, a write compensation block 70, and the optical pickup 30 of FIG. 41. According to the embodiment 9, the optical disk writer-reader employs a 1–7RLL (run length limit) signal modulation method.

The PRML block 50 includes an A/D converter 51, a digital equalizer 52, a tap coefficient controller 53, a phase shifter 54, a PLL 55, and a Viterbi decoder 56. The controller block 60 includes a 1–7RLL processing unit 61.

The PRML block 50 receives a signal from the optical pickup 30 through a preamplifier and carries out a PRML signal process on the received signal. The controller block 60 receives a signal from the Viterbi decoder 56 of the PRML block 50, and the 1–7RLL processing unit 61 processes the received signal. The write compensation block 70 receives a signal from the controller block 60, and according to the received signal, drives the blue LD 31 of the optical pickup 30 through an LD driver.

In this way, the optical disk writer-reader receives a signal read by the optical pickup 30 from the optical disk 35, decodes the received signal, and provides the decoded signal. In addition, the optical disk writer-reader receives an input signal, encodes and modulates the received signal, and writes the modulated signal to the optical disk 35 through the optical pickup 30. The write block of the optical disk writer-reader may be omitted, to provide an optical disk reader.

Although the embodiments have used concrete values to explain the objectives for optical disks, these values are not intended to limit the present invention. The present invention is applicable to a variety of objectives for optical disks without departing from the scope of the present invention. The beam splitter mentioned above may be a polarized beam splitter.

Optical disks applicable to the present invention may have transmission layers of 0.01 mm to 0.3 mm thick. The objectives according to the present invention may be made of optical glass such as NBF 1 and may have refractive indexes of 1.5 to 2.0.

The objectives according to the present invention may be formed through optional manufacturing methods, such as a direct forming method to cut or grind a glass material, a glass forming method, a sol-gel glass forming method, and a method to form a resin aspherical layer on a glass or plastic spherical lens material.

As explained above, the present invention is capable of providing an objective for an optical disk, made of a single double-sided aspherical lens having a numerical aperture equal to or greater than 0.75 and capable of minimizing axial aberration, off-axis aberration, surface-to-surface eccentricity aberration, and chromatic aberration. Also provided are an optical pickup employing the objective and an optical disk writer-reader and an optical disk reader each employing the optical pickup.

The entire contents of Japanese Patent Applications P2001-289992 (filed Sep. 21, 2001), P2001-290001 (filed Sep. 21, 2001), P2002-118318 (filed Apr. 19, 2002), P2002-118489 (filed Apr. 19, 2002), P2002-197990 (filed Jul. 5, 2002) and P2002-197996 (filed Jul. 5, 2002) are incorporated herein by reference.

Although the invention has been described above by reference to certain embodiments of the invention, the invention is not limited to the embodiments described above. Modifications and variations of the embodiments described above will occur to those skilled in the art, in light of the above teachings. The scope of the invention is defined with reference to the following claims.

What is claimed is:

1. An objective for an optical disk comprising a single lens, wherein the objective has first and second aspherical surfaces, a numerical aperture (NA) of the objective is equal to or greater than 0.75 and a radius of curvature R1 at a vertex of the first surface is defined as follows:

$$0.95 \cdot A < R1 < 1.05 \cdot A,$$

$$A = B/C,$$

$$B = 0.85 f(n-1) \text{ and}$$

$$C = n \ (0.60866 - 0.11 \cdot t/f - 0.1272 \cdot d/f)(0.83 + 0.2 \cdot NA)$$

where n is a refractive index of the objective, f is a focal length of the objective, t is a thickness along optical axis through the center of the objective and d is the thickness of a transmission layer of the optical disk.

2. The objective of claim 1, wherein the thickness t is equal to or greater than the focal length f.

3. The objective of claim 1, wherein the objective has an image magnification of 0.

4. The objective of claim 1, wherein incident rays on the objective from a light source have a wavelength equal to of less than 450 nm.

5. An optical pickup comprising:
the objective of claim 1;
a laser source; and
a photodetector.

6. The optical pickup of claim 5, wherein a working distance of the objective depends on the diameter of an optical disk irradiated with a laser beam emitted from the laser source and is defined as follows:

working distance>0.005×optical disk radius.

7. An optical disk writer-reader comprising:
the optical pickup of claim 5; and
a write-read unit to write and read information to and from an optical disk through the pickup.

8. An optical disk reader comprising:
the optical pickup of claim 5; and
a read unit to read information from an optical disk through the optical pickup.

9. An objective for an optical disk comprising a single lens, wherein the objective has first and second aspherical surfaces, a numerical aperture (NA) of the objective is equal to or greater than 0.75 and an angle u1' between a highest ray passing through the objective and an optical axis satisfies the following condition:

$$0.94 \cdot K < \sin \ (u1') < 1.06 \cdot K \text{ and}$$

$$K = (0.60866 - 0.11 \cdot t/f - 0.1272 \cdot d/f)(0.83 + 0.2NA) \cdot NA/0.85$$

where f is a focal length of the objective, t is a thickness along optical axis through center of the objective and d is the thickness of a transmission layer of the optical disk.

10. The objective of claim 9, wherein the thickness t is equal to or greater than the focal length f.

11. The objective of claim 9, wherein the objective has an image magnification of 0.

12. The objective of claim 9, wherein incident rays on the objective from a light source have a wavelength equal to of less than 450 nm.

13. An optical pickup comprising:
the objective of claim 9;
a laser source; and
a photodetector.

14. The optical pickup of claim 13, wherein a working distance of the objective depends on the diameter of an optical disk irradiated with a laser beam emitted from the laser source and is defined as follows:

working distance>0.005×optical disk radius.

15. An optical disk writer-reader comprising:
the optical pickup of claim 13; and
a write-read unit to write and read information to and from an optical disk through the pickup.

16. An optical disk reader comprising:
the optical pickup of claim 13, and
a read unit to read information from an optical disk through the optical pickup.

17. An objective for an optical disk comprising a single lens, wherein the lens has first and second aspherical surfaces, a numerical aperture (NA) of the objective is equal to or greater than 0.75 and an angle between a normal to the first surface at a point where a highest ray enters, the first surface and an optical axis is equal to or less than 57 degrees.

18. The objective of claim 17, wherein the thickness t is equal to or greater than the focal length f.

19. The objective of claim 17, wherein the objective has an image magnification of 0.

20. The objective of claim 17, wherein
incident rays on the objective from a light source have a wavelength equal to of less than 450 nm.

21. An optical pickup comprising:
the objective of claim 17;
a laser source; and
a photodetector.

22. The optical pickup of claim 21, wherein a working distance of the objective depends on the diameter of an optical disk irradiated with a laser beam emitted from the laser source and is defined as follows:

working distance>0.005×optical disk radius.

23. An optical disk writer-reader comprising:

the optical pickup of claim 21; and a write-read unit to write and read information to and from an optical disk through the pickup.

24. An optical disk reader, comprising:

the optical pickup of claim 21; and a read unit to read information from an optical disk through the optical pickup.

25. An objective for an optical disk comprising a single lens, wherein the objective has first and second aspherical surfaces, a numerical aperture (NA) of the objective is equal to or greater than 0.75 and an angle θ between a normal to the first surface at a point where a highest ray enters the and an optical axis satisfies the following condition:

$$\theta < 57 - 47.3 \cdot (0.85 - NA) \text{(degrees)}.$$

26. The objective of claim 25, wherein the thickness t is equal to or greater than the focal length f.

27. The objective of claim 25, wherein the objective has an image magnification of 0.

28. The objective of claim 25, wherein incident rays on the objective from a light source have a wavelength equal of less than 450 nm.

29. An optical pickup comprising: the objective of claim 25;

a laser source; and a photodetector.

30. The optical pickup of claim 23, wherein a working distance of the objective depends on the diameter of an optical disk irradiated with a laser beam emitted from the laser source and is defined as follows:

$$\text{working distance} > 0.005 \times \text{optical disk radius}.$$

31. An optical disk writer-reader comprising:

the optical pickup of claim 29; and a write-read unit to write and read information to and from an optical disk through the pickup.

32. An optical disk reader comprising:

the optical pickup of claim 21; and a read unit to read information from an optical disk through the optical pickup.

* * * * *

UNITED STATES PATENT AND TRADEMARK OFFICE
CERTIFICATE OF CORRECTION

PATENT NO. : 6,636,366 B1
DATED : October 21, 2003
INVENTOR(S) : Itonaga

It is certified that error appears in the above-identified patent and that said Letters Patent is hereby corrected as shown below:

Column 32,
Line 23, change "of" to -- or --.
Line 49, delete ",".
Line 57, change "of" to -- or --.

Column 33,
Line 13, change "the and" to -- the first surface and --.

Column 34,
Line 3, change "of" to -- or --.
Line 8, change "23" to -- 29 --.
Line 20, change "21" to -- 29 --.

Signed and Sealed this

Twenty-seventh Day of January, 2004

JON W. DUDAS
*Acting Director of the United States Patent and Trademark Office*